(12) United States Patent
Nam et al.

(10) Patent No.: US 10,096,143 B2
(45) Date of Patent: Oct. 9, 2018

(54) DEVICE AND METHOD OF MANAGING USER INFORMATION BASED ON IMAGE

(71) Applicant: SAMSUNG ELECTRONICS CO., LTD., Suwon-si (KR)

(72) Inventors: Ji-in Nam, Seoul (KR); Min-jeong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 14/929,841

(22) Filed: Nov. 2, 2015

(65) Prior Publication Data
US 2016/0125635 A1    May 5, 2016

(30) Foreign Application Priority Data

Oct. 31, 2014  (KR) .......................... 10-2014-0150635
May 20, 2015  (KR) .......................... 10-2015-0070566

(51) Int. Cl.
*G06F 3/0481* (2013.01)
*G06T 13/40* (2011.01)
(Continued)

(52) U.S. Cl.
CPC .............. *G06T 13/40* (2013.01); *A63F 13/58* (2014.09); *A63F 13/65* (2014.09); *A63F 13/825* (2014.09);
(Continued)

(58) Field of Classification Search
CPC ...... G06F 3/048; G06F 3/0481; G06F 3/0482; G06F 3/0484; G06Q 10/06; G06Q 10/109; G06Q 10/1093; G06Q 10/1095
See application file for complete search history.

(56) References Cited

U.S. PATENT DOCUMENTS 7,865,840 B2 *  1/2011  Matsuzawa ......... G06F 15/0225
                                                        715/808
2009/0059729 A1  3/2009  Olayinka et al.
(Continued)

FOREIGN PATENT DOCUMENTS

KR         10-0715972 B1    5/2007
KR    10-2009-0107602 A    10/2009
(Continued)

OTHER PUBLICATIONS

Communication dated Feb. 15, 2016, issued by the International Searching Authority in counterpart International Application No. PCT/KR2015/011388 (PCT/ISA/210 & PCT/ISA/237).
(Continued)

*Primary Examiner* — Xiomar L Bautista
(74) *Attorney, Agent, or Firm* — Sughrue Mion, PLLC

(57) ABSTRACT

A device and a method of managing user information are provided. The device includes a display and a controller. The controller controls the display to display an avatar-based image according to user schedule information, change the avatar-based image according to a user input indicating a request to change the avatar-based image, and update the user schedule information according to the changed avatar-based image. The method includes displaying, on a display of a device, an avatar-based image according to user schedule information, changing the avatar-based image according to a user input indicating a request to change the avatar-based image, and updating the user schedule information according to the changed avatar-based image.

31 Claims, 85 Drawing Sheets

(51) Int. Cl.
  *G06F 3/0482* (2013.01)
  *G06T 13/80* (2011.01)
  *G06F 3/0484* (2013.01)
  *A63F 13/65* (2014.01)
  *A63F 13/58* (2014.01)
  *A63F 13/825* (2014.01)

(52) U.S. Cl.
  CPC .......... *G06F 3/0481* (2013.01); *G06F 3/0482* (2013.01); *G06F 3/04845* (2013.01); *G06T 13/80* (2013.01); *A63F 2300/5553* (2013.01); *G06T 2200/24* (2013.01)

(56) References Cited

U.S. PATENT DOCUMENTS

| | | | |
|---|---|---|---|
| 2009/0144639 A1* | 6/2009 | Nims | A63B 24/0059 715/757 |
| 2009/0300525 A1* | 12/2009 | Jolliff | H04M 1/72544 715/764 |
| 2010/0218101 A1* | 8/2010 | O'Shaughnessy | G06Q 10/00 715/733 |
| 2010/0279741 A1 | 11/2010 | Park | |
| 2011/0004835 A1* | 1/2011 | Yanchar | G06Q 10/109 715/763 |
| 2011/0239143 A1* | 9/2011 | Ye | G06F 3/048 715/764 |
| 2013/0290905 A1 | 10/2013 | LuVogt et al. | |
| 2014/0164972 A1 | 6/2014 | Lee | |

FOREIGN PATENT DOCUMENTS

| | | |
|---|---|---|
| KR | 10-2011-0012482 A | 2/2011 |
| WO | 2008108965 A1 | 9/2008 |
| WO | 2009073607 A2 | 6/2009 |
| WO | 2013152455 A1 | 10/2013 |

OTHER PUBLICATIONS

Communication dated Mar. 21, 2016, issued by the European Patent Office in counterpart European Application No. 15191948.7.

* cited by examiner

FIG. 3

| Subject | | Predicate | Object |
|---|---|---|---|
| Class | Resource | | |
| Person | User_1 | GENDER | FEMALE |
| | | trip schedule (hastripschedule) | FIRST TRIP PLACE (Place 1) |
| | | | SECOND TRIP PLACE (Place 2) |
| | | | THIRD TRIP PLACE (Place 3) |
| | | | FOURTH TRIP PLACE (Place 4) |
| | | | FIFTH TRIP PLACE (Place 5) |
| | | trip preparation (hastrippreparation) | FIRST PREPARATION (Preparation 1) |
| | | | SECOND PREPARATION (Preparation 2) |
| | | | THIRD PREPARATION (Preparation 3) |
| | | | FOURTH PREPARATION (Preparation 4) |

FIG. 4

| Object | Object image |
|---|---|
| FEMALE | FEMALE AVATAR |
| FIRST TRIP PLACE (Place 1) | FIRST PLACE PHOTO |
| SECOND TRIP PLACE (Place 2) | SECOND PLACE PHOTO |
| THIRD TRIP PLACE (Place 3) | THIRD PLACE PHOTO |
| FOURTH TRIP PLACE (Place 4) | FOURTH PLACE PHOTO |
| FIFTH TRIP PLACE (Place 5) | FIFTH PLACE PHOTO |
| FIRST PREPARATION (Preparation 1) | FIRST PREPARATION DRAWING |
| SECOND PREPARATION (Preparation 2) | SECOND PREPARATION DRAWING |
| THIRD PREPARATION (Preparation 3) | THIRD PREPARATION DRAWING |
| FOURTH PREPARATION (Preparation 4) | FOURTH PREPARATION PHOTO |

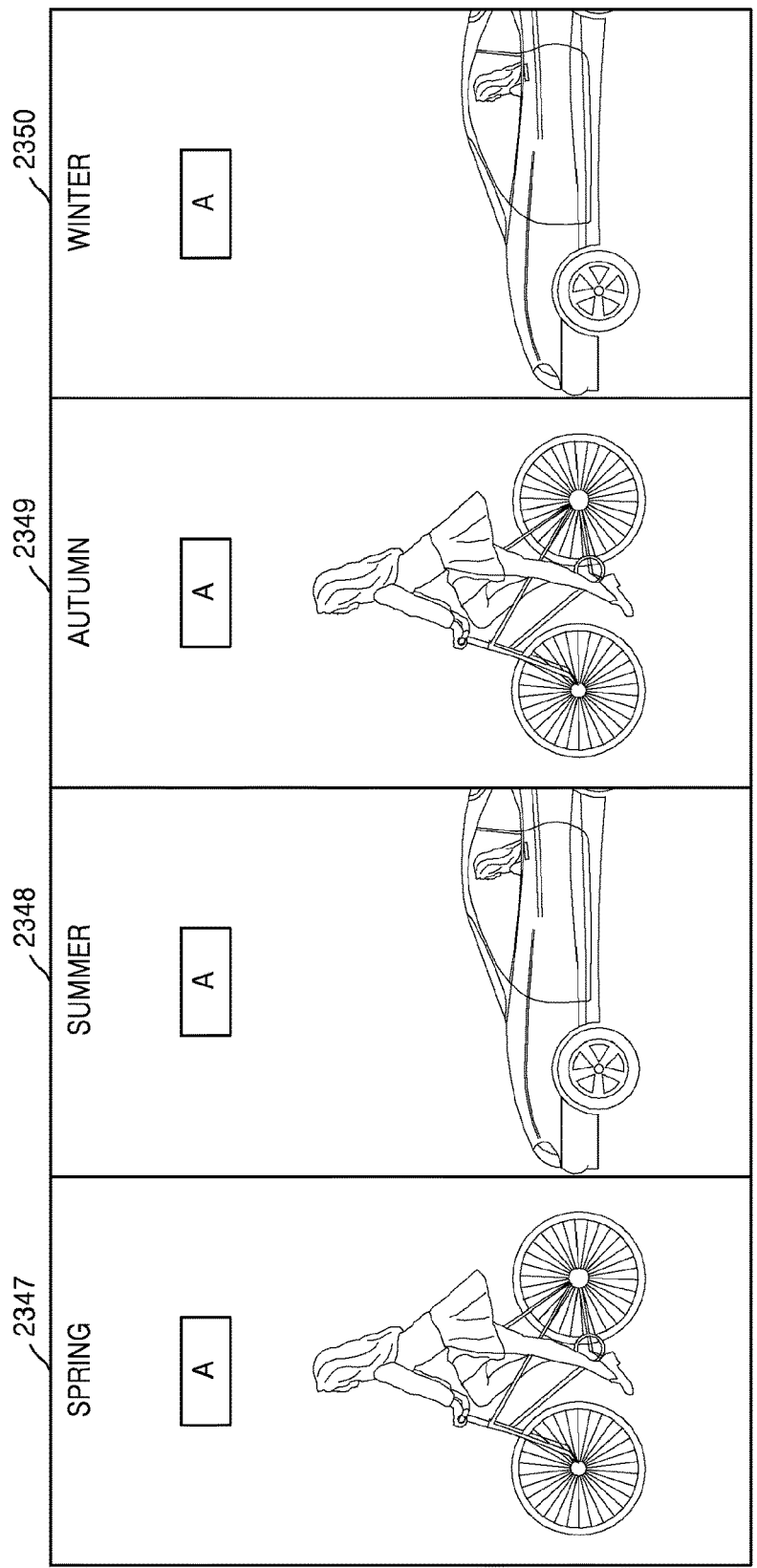

FIG. 24A

| Subject(2401) | | Predicate (2402) | Object (2403) |
|---|---|---|---|
| Class (2404) | Resource (2405) | | |
| Person | User_1 | Name | A |
| | | Gender | FEMALE |
| | | hasHobby | Violin |

2400

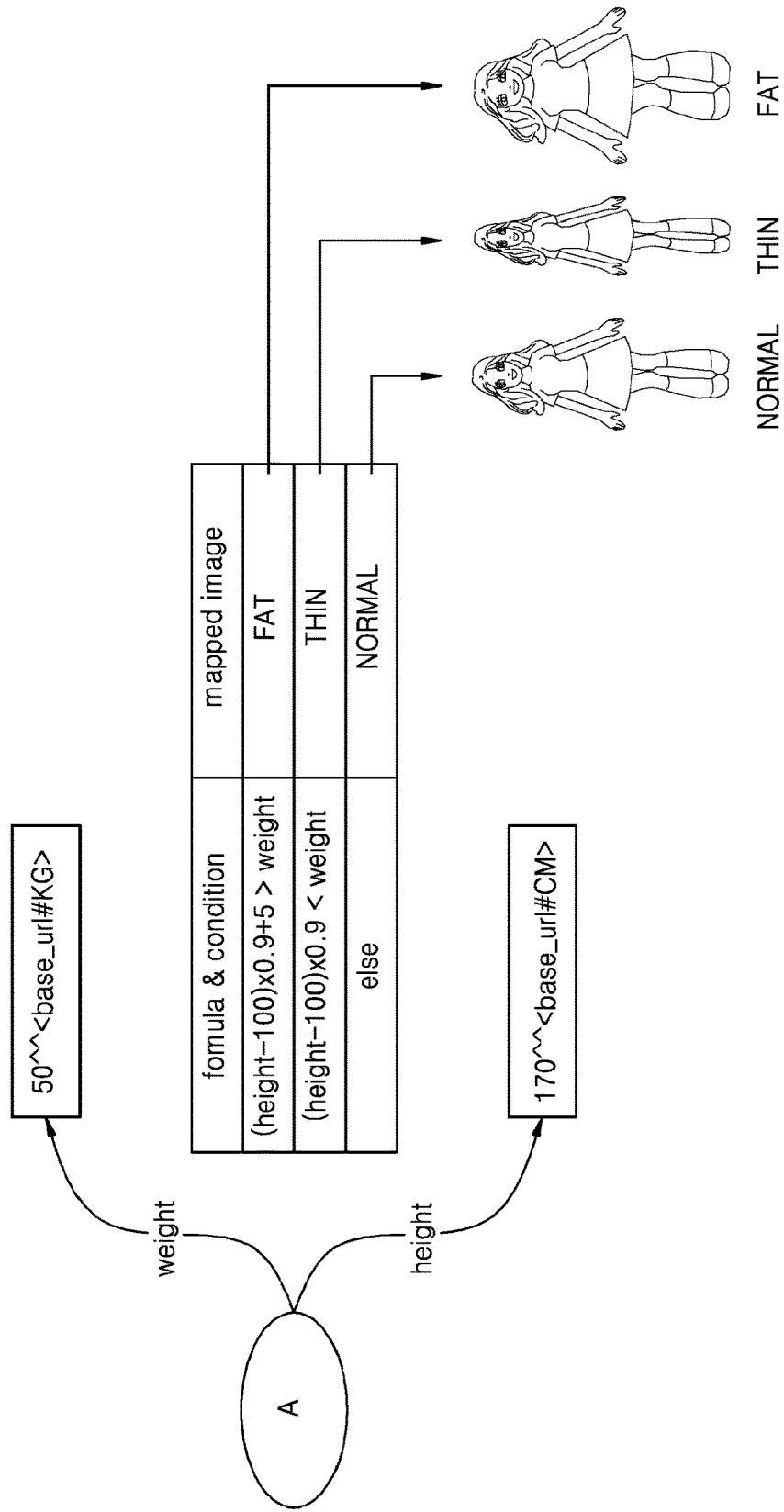

FIG. 25
| Object Image | Object Identification |
|---|---|
|  | MALE<br>(0000 0001) |
|  | FEMALE<br>(0000 0010) |
| 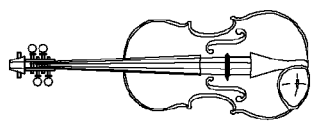 | Violin<br>(0000 0011) |
| 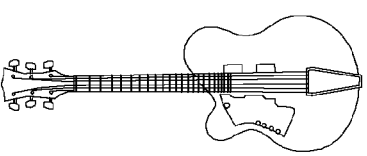 | Guitar<br>(0000 0100) |

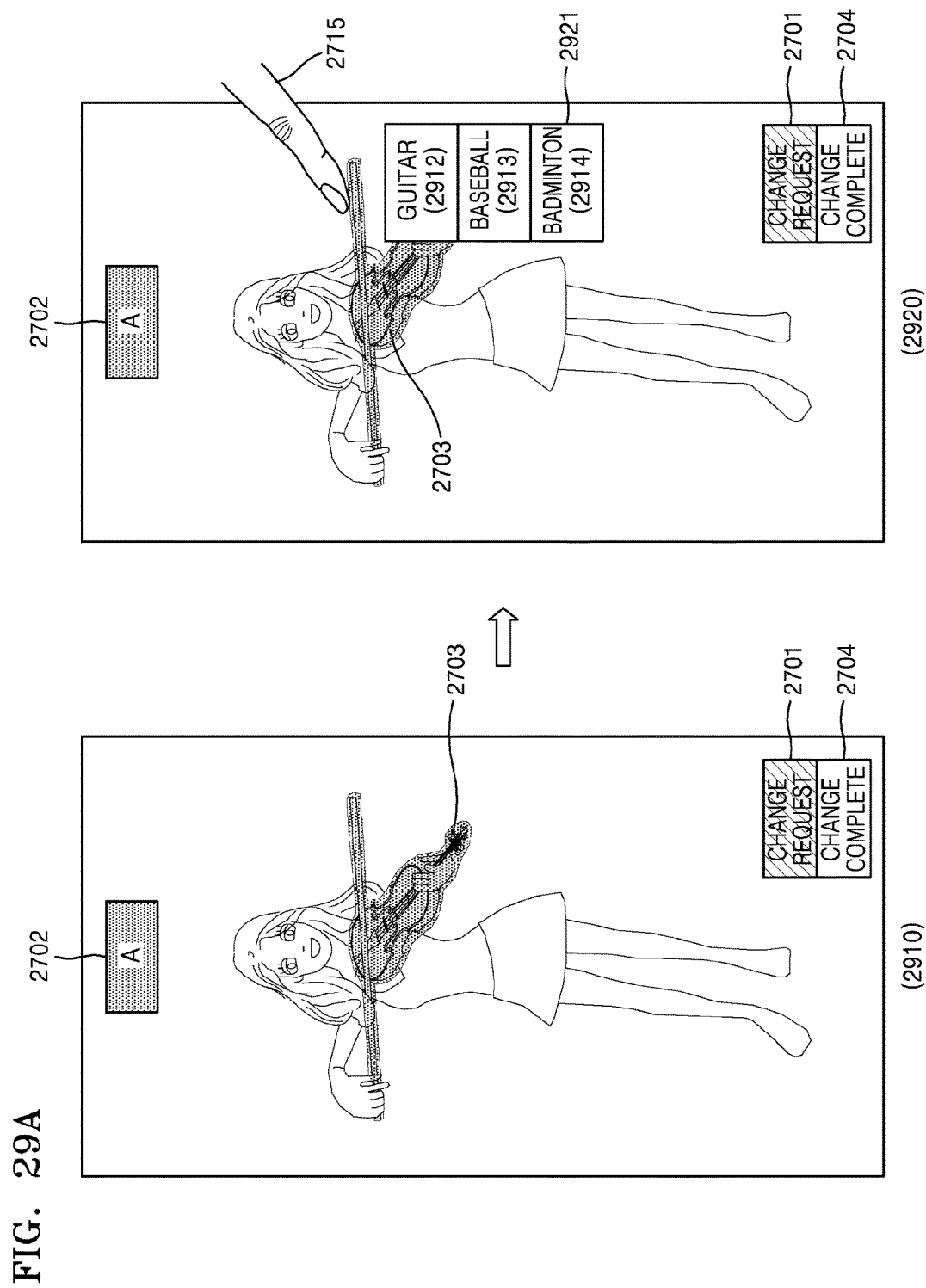

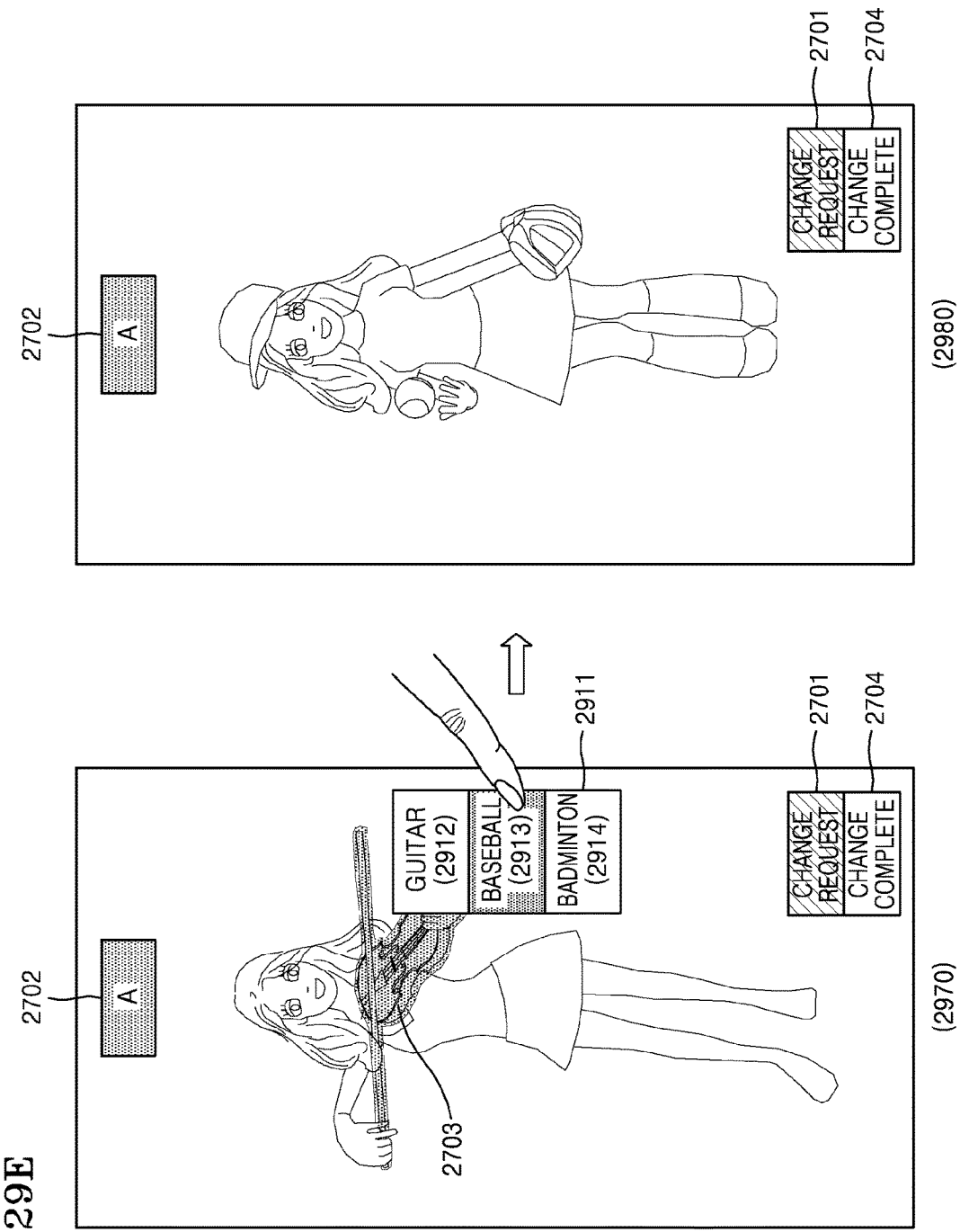

FIG. 32

| Subject(2401) | | Predicate (2402) | Object (2403) |
|---|---|---|---|
| Class (2404) | Resource (2405) | | |
| Person | User_1 | Name | A |
| | | Gender | FEMALE |
| | | hasHobby | Guitar |

| BEFORE UPDATE(3810) | AFTER UPDATE(3820) |
|---|---|
| DATE : NOV. 1, 2014 (SAT.)<br>11:00 AM<br>PLACE : SEOUL ART CENTER<br><br>CONDUCTOR : XXXX<br>BAND : BBBB<br>ACCOMPANIED PERFORMANCE :<br>VIOLIN<br><br>PROGRAM<br><br>PART 1 :<br><br>SCHUMANN, PRELUDE OF "DIE BRAUT VON MESSINA" IN C MINOR<br>SIBELIUS, VIOLIN CONCERTO IN D MINOR<br><br>PART 2 :<br><br>ROBERT SCHUMANN, SYMPHONY NO. 4 IN D MINOR<br>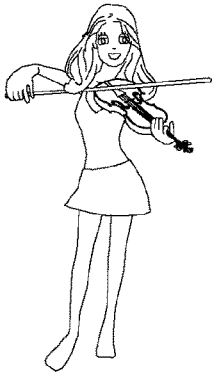 | DATE : NOV. 2, 2014 (SUN.)<br>07:30 PM<br>PLACE : KOREA CULTURAL HOUSE<br><br>GUITAR : CCC<br><br>PROGRAM<br><br>PART 1 :<br><br>DUET<br>■ Spring has come<br>■ Waltz of flowers in The Nutcracker<br><br>SOLO<br>■ Fantasia Original<br>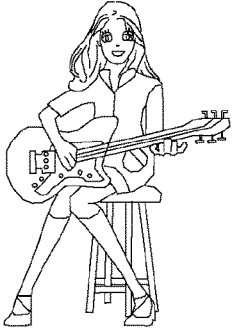 |

DEVICE AND METHOD OF MANAGING USER INFORMATION BASED ON IMAGE

CROSS-REFERENCE TO RELATED APPLICATION

This application claims priority from Korean Patent Application No. 10-2014-0150635, filed on Oct. 31, 2014, and Korean Patent Application No. 10-2015-0070566, filed on May 20, 2015, in the Korean Intellectual Property Office, the disclosures of which are incorporated by reference herein in their entirety.

BACKGROUND

1. Field

The present disclosure relates to devices and methods of managing user information, and more particularly, to a device and a method of managing user information based on an image indicating user information.

2. Description of the Related Art

As communication technologies are being developed and smart devices are becoming more widely used, various types of user information may be collected. The user information is information related to a user, such as user profile information and/or life log information of the user. The life log information of the user may include user schedule information or user health information, but is not limited thereto.

The user information may be collected by using a user input, a sensing function of a device, a detecting function of a device, and/or a data analyzing function of a device, but a method of collecting the user information is not limited thereto.

Technologies for effectively managing the user information collected as such are required.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

It is an aspect to provide devices and methods of effectively managing user information by easily changing, adding and/or checking user information based on an image indicating the user information.

It is another aspect to provide devices and methods of effectively managing user information by easily checking and using a providable service based on an image indicating user information.

Additional aspects will be set forth in part in the description which follows and, in part, will be apparent from the description, or may be learned by practice of the presented exemplary embodiments.

According to an aspect of an exemplary embodiment, there is provided a device for managing user information, the device comprising a display configured to display an avatar-based image (i.e. an image based on a graphical representation of a user and/or their characteristics); and a controller configured to control the display such that the display displays the avatar-based image according to user schedule information (i.e. the avatar-based image includes pictures, text or other forms of information on past, present or future event or activity information associated with the user), change the avatar-based image according to a user input indicating a request to change the avatar-based image, and update the user schedule information according to the changed avatar-based image.

The device may comprise a user input module configured to receive a user input requesting user information of a certain period, wherein the controller controls the display to display a plurality of avatar-based images according to the user information of the certain (i.e. predetermined) period in response to the user input, and the plurality of avatar-based images are determined for and correspond respectively to a plurality of different periods that comprise (i.e. form at least part of) the certain period.

The controller may control the display to display a plurality of avatar-based images, the device may further comprise a user input module configured to receive a user input requesting user information of a certain period, the controller may control the display to display the plurality of avatar-based images according to the user information of the certain period in response to the user input, and the plurality of avatar-based images may be determined per theme item (i.e. an item associated with an activity or event) included in the user information of the certain period.

The device may further comprise a user input module configured to receive a user input requesting to display changeable information related to the avatar-based image, wherein, in response to the user input, the controller controls the display to distinguishably display (i.e. visually differentiate between) a changeable region and an unchangeable region (i.e. regions that may or may not be changed in response to user input) in the avatar-based image.

The controller may check an offering period (i.e. a period of time for which an avatar-based image is to be displayed by the device) that is set for the avatar-based image, and control the display to not display the avatar-based image when the offering period has expired.

The controller may control the display to display the avatar-based image according to health information of a user, the device may further comprise a user input module configured to receive a user input indicating a medical information request, and the controller may control the display to display medical information related to the health information in response to the user input, and upon receiving, through the user input module, a user input about medical information selected based on the displayed medical information, updates the user schedule information according to the selected medical information.

The device may further comprise a user input module configured to receive a user input indicating information to be added to the avatar-based image, wherein the controller controls the display to display an input window for receiving an input of the information to be added, and the controller adds an image corresponding to the information received through the input window to the avatar-based image, and updates the user schedule information according to the avatar-based image including the added image.

The controller may control the display to display the avatar-based image according to future hope information (i.e. an ambition, long-term plan, or longer-term schedule) of the user, the device may further include a user input module configured to receive a user input requesting information related to the future hope information, and the controller may control the display to display the information related to the future hope information according to the user input, and updates the user schedule information according to information selected from the information related to the future hope information.

The controller may control the display to display a plurality of avatar-based images according to usage history information of the device, the device may further include a user input module configured to receive a user input requesting usage history information per usage period of the device, and the controller may control the display to display the plurality of avatar-based images in response to the user input.

The controller may control the display to display the avatar-based image according to user information registered in social media, the device may further comprise a user input module for receiving a user input requesting to change the avatar-based image, and the controller may change the avatar-based image in response to the user input, and update the user information registered in the social media according to the changed avatar-based image.

According to another aspect of an exemplary embodiment, there is provided a method of managing user information, wherein the method is performed by a device, the method comprising displaying, on a display of the device, an avatar-based image according to user schedule information; changing the avatar-based image according to a user input indicating a request to change the avatar-based image; and updating the user schedule information according to the changed avatar-based image.

The displaying may comprise displaying a plurality of avatar-based images according to user information of a certain period, wherein the plurality of avatar-based images are determined for and correspond respectively to a plurality of different periods that comprise the certain period.

The displaying may comprise displaying a plurality of avatar-based images according to user information of a certain period, wherein the plurality of avatar-based images are determined per theme item included in the user information of the certain period.

The method may further comprise, in response to a user input requesting to display changeable information, distinguishably displaying a changeable region and an unchangeable region in the avatar-based image.

The method may further comprise checking an offering period that is set for the avatar-based image; and when the offering period has expired, controlling the display to not display the avatar-based image.

The method may further comprise displaying, on the display, the avatar-based image according to health information of a user; providing medical information related to the health information according to a user input indicating a medical information request; and updating the user schedule information according to medical information selected based on the provided medical information.

The method may further comprise displaying, on the display, an input window for receiving information to be added to the avatar-based image upon receiving a user input indicating the information to be added; adding an image corresponding to information received through the input window to the avatar-based image; and updating the user schedule information according to the avatar-based image including the added image.

The method may further comprise displaying the avatar-based image according to future hope information of a user; providing information related to the future hope information according to a user input requesting the information related to the future hope information; and updating the user schedule information according to information selected from the information related to the future hope information.

The method may further comprise displaying a plurality of avatar-based images according to usage history per usage period of the device according to a user input requesting the usage history information.

The method may further comprise displaying the avatar-based image according to user information registered in social media; changing the avatar-based image according to a user input requesting to change the avatar-based image; and updating the user information registered in the social media according to the changed avatar-based image.

According to another aspect, a computer program comprising instructions arranged, when executed, to implement a method and/or apparatus in accordance with any one of the above-described aspects is provided. A further aspect provides machine-readable storage storing such a program.

According to another aspect of an exemplary embodiment, there is provided a method of visually managing and displaying user information, the method comprising displaying, on a display of a device, an avatar-based image that is modified according to user information; monitoring the device for a user input requesting a change to the avatar-based image; receiving an input of the change to the avatar-based image; displaying the changed avatar-based image; and updating the user information according to the changed avatar-based image.

The user information may be user schedule information.

The avatar-based image that is displayed may comprise a plurality of images, each depicting a different type of user schedule information.

The displaying the avatar-based image may comprise displaying a plurality of avatar-based images, each avatar-based image being modified according to user schedule information corresponding to a different time period.

The different time periods may comprise weekend and weekdays.

The different time periods may comprise different days of a workweek.

The user information may comprises user health information.

The user health information may be received from an external device.

The user information may comprises usage information of the device.

It will be appreciated that that, although described as separate aspects of the present disclosure, the aspects set out above may be combined in any combination. For example, the user input module may be configured to receive user input requesting the display of changeable information and user information of a certain period. Likewise, the controller may be configured to display a plurality of avatar-based images according to user information of the certain period and distinguishably display a changeable and an unchangeable region of one or more avatar-based images. Consequently, the user input module and controller may both receive and respond to a range and/or combination of user inputs.

It will be appreciated from the following description that, in certain aspects, features concerning the graphic design of user interfaces are combined with interaction steps or means to achieve a technical effect.

It will also be appreciated that certain aspects aim to achieve a technical effect of lowering a burden (e.g. a cognitive, operative, operational, operating, or manipulative burden) of a user when performing certain computer or device interactions. For example, via the presentation and use of avatar-based images, information may be visually provided to a user of a device and may be changed by the user of the device is an efficient and intuitive manner.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 illustrates an example of user modeling information about user schedule information generated by a device, according to an exemplary embodiment;

FIG. 4 is a table for describing a relationship between a plurality of pieces of object information and a plurality of object images, which are stored in a device, according to an exemplary embodiment;

FIGS. 23A through 23F are diagrams for describing avatar-based images displayed by a device based on user information, according to exemplary embodiments;

FIG. 24A illustrates an example of user modeling information regarding user information, according to an exemplary embodiment;

FIG. 24C is a diagram for describing a display size of an object included in an avatar-based image, according to an exemplary embodiment;

FIG. 25 illustrates an example of mapping information between an object image and object identification (ID) information, according to an exemplary embodiment;

FIGS. 29A through 29F illustrate examples of changing an object based on candidate objects provided by a device, according to exemplary embodiments;

FIG. 32 illustrates an example of user modeling information updated by a device, according to an exemplary embodiment;

FIG. 38 illustrates an example of a device providing answer information according to received question information, according to an exemplary embodiment;

DETAILED DESCRIPTION

Figure 1:
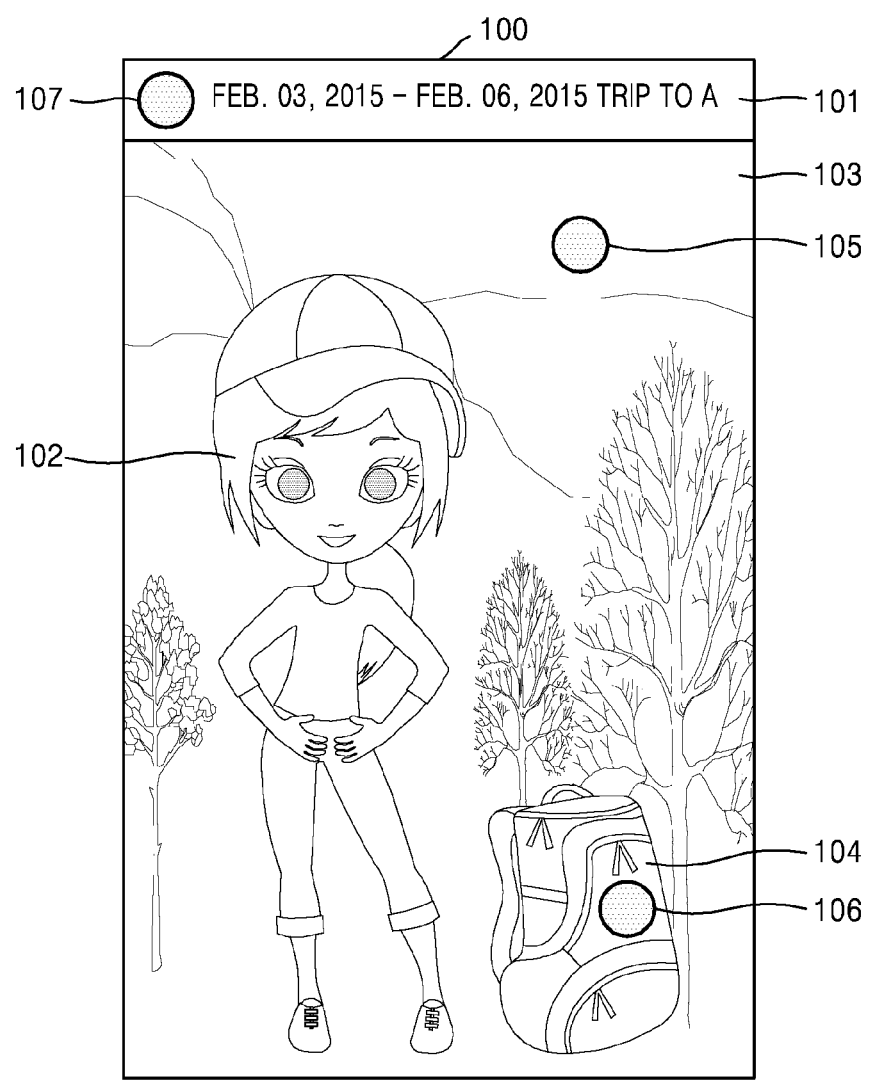
FIG. 1 illustrates an example of a device displaying an avatar-based image according to trip schedule information of a user, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. In the description of the present disclosure, certain detailed explanations of related art are omitted when it is deemed that such explanations may unnecessarily obscure the essence of the inventive concept.

While such terms as "first", "second", etc., may be used to describe various components, such components must not be limited to the above terms. The above terms are used only to distinguish one component from another.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms used herein have to be defined based on the meaning of the terms together with the description throughout the specification.

An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Throughout the description and claims of this specification, the words "comprise" and "contain" and variations of the words, for example "comprising" and "comprises", means "including but not limited to", and is not intended to (and does not) exclude other moieties, additives, components, integers or steps.

As used herein, the term "and/or" includes any and all combinations of one or more of the associated listed items. Expressions such as "at least one of," when preceding a list of elements, modify the entire list of elements and do not modify the individual elements of the list.

Throughout the description and claims of this specification, the singular encompasses the plural unless the context otherwise requires. In particular, where the indefinite article is used, the specification is to be understood as contemplating plurality as well as singularity, unless the context requires otherwise.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

Features, integers, characteristics, compounds, chemical moieties or groups described in conjunction with a particular aspect, embodiment or example are to be understood to be applicable to any other aspect, embodiment or example described herein unless incompatible therewith.

According to an exemplary embodiment, user information may include user profile information.

The user profile information may include information about a gender of a user. The user profile information may include information about a name of a user. The user profile information may include information about an age of a user. The user profile information may include information about a nationality of a user.

Also, the user profile information may include information about a region a user is currently living. The user profile information may include information about a company name a user is working for. The user profile information may include information about a location of a company a user is working for. The user profile information may include information about a hobby of a user.

Also, the user profile information may include information about a place a user was born. The user profile information may include information about an occupation of a user. The user profile information may include information about a family of a user, such as information about whether the user has parents and a child. The user profile information may include information about a pet of a user, such as information about whether the user owns a pet and about a type of a pet. The user profile information may include information about an interest of a user, such as classic guitars, a sport, soccer, economics, trips, games, and books. However, the user profile information according to an exemplary embodiment is not limited thereto.

Also, the user profile information may be referred to as user profile information (hereinafter, also referred to as social media profile information) registered in social media, such as Facebook, Twitter, a Blog, YouTube, or LinkedIn.

The social media profile information may include a keyword, a photograph, a place, a time, and/or an event (for example, a photo exhibition, an art exhibition, a baseball game, a soccer game, a concert, or a play), which are detected by analyzing context, vocabulary, an image, and/or a tag posted by a user, but is not limited thereto.

The user information according to an exemplary embodiment may include user information (for example, membership information, game level information, product information, usage information, and/or quest information in a game) registered in a website (for example, Naver, Yahoo, or Google).

The user information according to an exemplary embodiment may include user information registered in each application installed in a device. The application installed in a device may be, for example, a schedule application, a game application, a service center application, a membership application, a customer center application, a market application, a life log managing application, a map application, or a future hope information managing application (for example, a bucket list managing application or a wish list managing application), but is not limited thereto.

According to an exemplary embodiment, the user information may include information obtained by a device based on data generated or input/output according to interaction between a device and a user.

The information obtained by a device may include search history information. The information obtained by a device may include mail history information. The information obtained by a device may include message history information, wherein a message may be a short message, a multi message, or a voice message. The information obtained by a device may include browsing history information.

Also, the information obtained by a device may include social media usage history information (or social network service (SNS) history information). The information obtained by a device may include phone call history information. The information obtained by a device may include album history information. The information obtained by a device may include network history information. The information obtained by a device may include content history information. However, the information obtained by a device is not limited thereto.

The search history information may include at least one piece of information obtained while a search application installed in a device is executed, for example, a list of search words (or query languages), the number of times each search word was searched for, a searched date, and/or a number of search results.

The mail history information may include at least one piece of information obtained while a mail application installed in a device is executed, for example, a list of transmitted and received mails, the number of transmitted and received mails, the number of deleted mails, a list of senders, the number of transmitted mails per sender, a list of recipients, the number of received mails per recipient, and/or dates of transmitted and received mails.

The message history information may include at least one piece of information obtained while a message application installed in a device is executed, such as a list of transmitted and received messages, the number of transmitted and received messages, the number of deleted messages, a list of senders, the number of transmitted messages per sender, a list of recipients, the number of received messages per recipient, and/or dates of transmitted and received messages.

The browsing history information may include at least one piece of information obtained while a browsing application installed in a device is executed, such as a list of uniform resource locators (URLs), the number of times each URL was accessed, or URL link information.

The social media usage history information may include at least one piece of information obtained while a social media service application installed in a device is executed, such as a number of postings and/or a number of comments. For example, the social media usage history information may include history information (for example, a list of keywords, the number of times each keyword was generated, a list of places, the number of times each place was visited, activities of a user based on an SNS according to times, and/or the number of times each event was viewed) based on at least one of a keyword, a photograph, a place, a time and/or an event (for example, a photo exhibition, an art exhibition, a baseball game, a soccer game, a concert, or a play), which are detected by analyzing at least one of context, vocabulary, an image, and/or a tag posted by a user.

The phone call history information may include at least one piece of information obtained while a phone call application installed in a device is executed, such as the number of times a video call was made, duration of a video call, a target of a video call, the number of times a video call was made to each target, duration of a video call per target, the number of times a voice call was made, duration of a voice call, a target of a voice call, the number of times a voice call was made to each target, and/or duration of a voice call per target.

The album history information may include at least one piece of information about a still image and/or a moving image obtained while a camera application installed in a device is executed, such as a place at which the photograph or video was taken, photographed or videoed target information (for example, a person, an object, or an animal), and/or a date/time at which the photograph or video was taken.

The network history information may include at least one piece of network connection information of a device. The network connection information may include, for example, information on whether Wi-Fi network is connected, the number of times Wi-Fi was accessed, a name of an accessed Wi-Fi device, information about a Wi-Fi network, information on whether Bluetooth network is connected, the number of times Bluetooth was accessed, a name of an accessed Bluetooth device, data usage, information on whether near field communication (NFC) is contacted, the number of times NFC was contacted, details of using NFC, details of accessing a beacon, or/and details of accessing Zigbee, but the network connection information according to an exemplary embodiment is not limited thereto.

The content history information may include content generated by using a device and information about the content. The content history information may include content shared with another device and information about the content. The content history information may include content transmitted to another device and information about the content.

Also, the content history information may include content received from another device and information about the content. The content history information according to an exemplary embodiment is not limited thereto. For example, information about content included in content history information may include a date when content was generated, a data amount of content, a search keyword for content, a name of a device that generated content, a name of a device that transmitted content, or a name of a device that received content.

According to an exemplary embodiment, the user information may include device configuration information set in a device. Device configuration information may include, for example, a name of a device, account information, a backup account, and/or a name of an external device (or a peripheral device), but device configuration information according to an exemplary embodiment is not limited thereto.

According to an exemplary embodiment, the user information may be stored in a device. According to an exemplary embodiment, the user information may be received from at least one external device connected to a device. The at least one external device may include a wearable device, such as a smart watch or smart glasses. The at least one external device may include an appcessory. The at least one external device may include a medical device. The at least one external device may include a vehicle. The at least one external device may include a server, such as a question and answer (QA) server or a game server. The at least one external device may include an Internet of things (IoT) network-based device (hereinafter, referred to as an IoT device). The at least one external device may include an IoT network-based sensor (hereinafter, referred to as an IoT sensor). The at least one external device may include a device, such as a game console.

The user information received from the at least one external device may include a value sensed (or measured) by the at least one external device. The user information received from the at least one external device may include information collected by the at least one external device. Information collected by the at least one external device may include information detected or analyzed by the at least one external device. However, the user information received from the at least one external device is not limited thereto.

The value sensed by the at least one external device may include health information of a user. The value sensed by the at least one external device may include activity information of a user. However, the value sensed by the at least one external device is not limited thereto.

The health information of a user may include information about exercise hours. The health information of a user may include information about a heart rate during exercise duration. The health information of a user may include information about a pulse oximetry during exercise duration. The health information of a user may include information about calorie consumption during exercise duration. The health information of a user may include information about a moved distance of the user during exercise duration.

Also, the health information of a user may include information about a skin temperature of the user during exercise duration. The health information of a user may include information about the number of steps taken by the user in one period of time, such as in one day. The health information of a user may include information about a galvanic skin response of the user during exercise duration. The health information of a user may include information about duration of sleep of the user. The health information of a user may include information about sleep patterns of the user. The health information of a user may include information about a blood-sugar level of the user.

Also, the health information of a user may include information sensed or measured by a medical device, such as information about body composition, a vascular age, blood pressure, a meridian system, and/or pulses.

The activity information of a user may include information indicating walking. The activity information of a user may include information indicating running. The activity information of a user may include information indicating staying at one place. The activity information of a user may include information indicating sleeping.

Also, the activity information of a user may include information indicating a transport, such as a car, a bus, a train, an airplane, or a ship. The activity information of a user may include information about a time the user stayed at one place. The activity information of a user may include information about a place the user often visits.

Also, the activity information of a user may include information about a person the user frequently sees. The activity information of a user may include information about a meeting in which the user participated. The activity information of a user may include information about a gathering in which the user participated. However, the activity information of a user according to an exemplary embodiment is not limited thereto. The activity information of a user may include a part of the health information described above, such as exercise hours.

The information collected by the at least one external device may include information collected by a server, but is not limited thereto. The information collected by the server may include information in which a question of a user and a search result are mapped to each other. The information collected by the server may include information obtained by the device described above, such as a game level or an exercise level. The information collected by the server is not limited thereto.

According to an exemplary embodiment, the user information may include physical information of a user. Also, the user information may include mind information of a user. The user information may include social information of a user. The user information may include schedule information of a user. The user information may include future hope information of a user, such as bucket list or wish list information. The user information may include information about usage history information per usage period of a device.

The physical information of a user may include information about a face, such as a face shape, an eye color, a nose shape, a mouth shape, an eye shape, and/or an eyebrow shape. The physical information of a user may include information about a height of the user. The physical information of a user may include information about a hair style of the user, such as short hair, long hair, curly hair, straight hair, or wavy hair. The physical information of a user may include face information of the user. The physical information of a user may include weight information of the user. According to an exemplary embodiment, the physical information of a user is not limited thereto. The physical information of a user may include, for example, information about a gender and/or an age of the user.

The mind information of a user (such as features of a user's personality for example) may include information about a taste of the user, such as taste in food. The mind information of a user may include information about tendency of the user, such as tendency information of the user based on bookmark information, frequently executed application information, application execution time information, book purchase record information, video rental record information (or video on demand (VOD) download information), magazine subscription information, music download information, and/or product purchase list information.

Also, the mind information of a user may include information about a preference of the user, such as preference information based on website search list information and/or hobby information. The mind information of a user may include information about feelings of the user, such as information indicating joy, sadness, fear, anger, surprise, greeting, or disgust. The mind information of a user is not limited thereto. For example, the mind information of a user may include information about interests described above.

The social information of a user may include information about an academic background of the user. The social information of a user may include information about a job of the user. The social information of a user may include information about a job description of the user. The social information of a user may include information about a gathering of the user. According to an exemplary embodiment, the social information of a user is not limited thereto.

The schedule information of a user may include information input by the user by using a schedule application but is not limited thereto. The schedule information of a user may include information about the past, present, and future of the user. The schedule information of a user may include user information based on at least one of time, day, month, year, and season.

The schedule information of a user may be classified based on theme items. Examples of a theme item include at least one of a trip, a company, study, a bike, a meeting, a date, a movie, an exercise, shopping, a hospital, beauty care, eating, a game, a gathering, hiking, a night life, a birthday party, a performance, or/and a business trip. According to an exemplary embodiment, the theme item is not limited thereto.

The user information may include all or a part of user information managed by personal information management software (PIMS). The user information may include at least one of all or a part of information included in life log information of a user.

The user information may be expressed in a form of user modeling information or user personal information such that purposes (for example, providing a user customized service) of a device, an external device, or a service provider are effectively performed.

The user information may be expressed in an avatar-based image in a 2-dimensional (2D) or 3D model. The user information may be expressed in a virtual image or a virtual self-graphic icon.

Hereinafter, one or more exemplary embodiments will be described in detail with reference to accompanying drawings.

FIG. 1 illustrates an example of a device 100 displaying an avatar-based image according to trip schedule information of a user and displaying information indicating a changeable image from the avatar-based image, according to an exemplary embodiment.

Referring to FIG. 1, a device 100 may display an avatar-based image according to the trip schedule information of the user. The avatar-based image shown in FIG. 1 includes duration information 101 about dates of a trip, an avatar 102 indicating the user, a photo 103 of a trip, a picture 104 of a bag, information 105 indicating that the photo 103 is a changeable image, information 106 indicating that the picture 104 of the bag is a changeable image, and information 107 indicating that the duration information 101 is a changeable image. That is, as shown in FIG. 1, the information 105 through 107 indicating a changeable image may be a circle with a texture located therein at various positions on the display screen of the device 100. However, this is only an example.

The avatar-based image according to the trip schedule information is not limited to that shown in FIG. 1. For example, the avatar-based image may include a drawing, a photo, or text regarding a plurality of trip preparations. The avatar-based image may omit the duration information 101. The avatar-based image may further include information indicating that the avatar 102 is a changeable image.

The device 100 may indicate the information 105 through 107 of FIG. 1 via another method. For example, the device 100 may change brightness of a changeable image in a uniform or variable period. Alternatively, the device 100 may highlight a changeable image.

The device 100 may display information differently to indicate a changeable image according to images. For example, the device 100 may change brightness of the photo 103 in a uniform or variable period, highlight the picture 104 of the bag, and periodically flicker the duration information 101.

Figure 2:
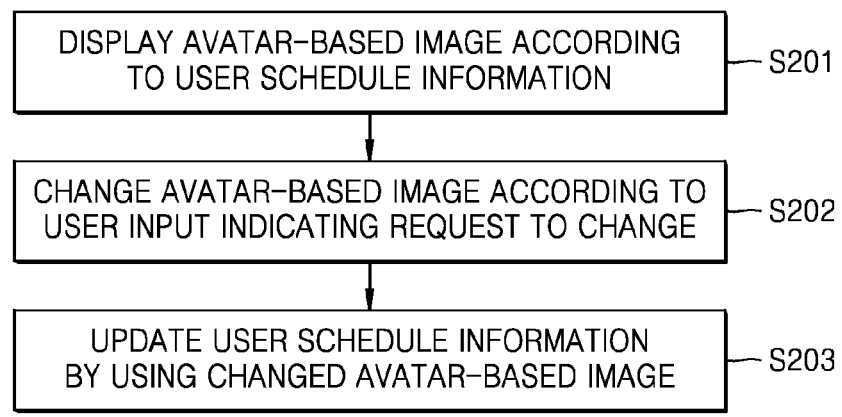
FIG. 2 is a flowchart of a method of managing user information, wherein a device changes user information by using an avatar-based image according to user schedule information, according to an exemplary embodiment.

FIG. 2 is a flowchart of a method of managing user information, wherein the device 100 displays an avatar-based image according to user schedule information and updates the user schedule information by changing the avatar-based image, according to an exemplary embodiment.

In operation S201, the device 100 displays an avatar-based image according to user schedule information. The user schedule information may be information stored in a schedule application installed in the device 100, but is not limited thereto. For example, the user schedule information may be received from an external device connected to the device 100.

The device 100 may generate the avatar-based image according to ontology-based user modeling information. Ontology may describe a relationship between words, between a word and a concept, or between concepts in a formal language.

The formal language may include, for example, a language such as hasHobby, hasSize, isA, or Cause, but the formal language according to an exemplary embodiment is not limited thereto. hasHobby is a formal language indicating that a relationship between words is a hobby. hasSize is a formal language indicating that a relationship between words is a size. isA is a formal language indicating an inclusion relation between words. Cause is a formal language indicating a cause-and-effect relationship between words. For example, "need a rest due to overwork" may be expressed in (overwork, rest) by using Cause.

The user modeling information may be generated by an external device connectable to the device 100.

FIG. 3 illustrates an example of user modeling information about user schedule information generated by the device 100, according to an exemplary embodiment.

The user modeling information of FIG. 3 is generated using resource description framework (RDF) data modeling. The device 100 may generate the user modeling information according to an ontology web language (OWL) or semantic web rule language (SWRL).

Referring to FIG. 3, the user modeling information includes a subject field, a predicate field, and an object field. The subject field is a field related to a subject of user information. In FIG. 3, a subject of the user information is a first user User_1. Here, it is shown that the first user User_1 is a person by using a class and a resource. The resource defines an instance of the class.

The predicate field of FIG. 3 is a formal language field indicating a relationship between words included in the subject field and the object field. Referring to FIG. 3, the formal language included in the predicate field includes a formal language about a gender, a formal language about a trip schedule, and a formal language about trip preparations. However, the formal language included in the predicate field according to an exemplary embodiment is not limited thereto. For example, the formal language about a trip schedule may be referred to as a formal language about a schedule. The formal language about trip preparations may be referred to as a formal language about preparations or trip check items.

The device 100 may express a female in the object field as a gender of the first user User_1 according to the formal language about a gender. The device 100 may express first through fifth trip places in the object field as trip places (or destinations) of the first user User_1 according to the formal language about a trip schedule. The device 100 may express first through fourth preparations in the object field as trip preparations of the first user User_1 according to the formal language about trip preparations.

The device 100 may generate an avatar-based image by using object information (the female, the first through fifth trip places, and the first through fourth preparations) of the object field included in the user modeling information. The object information of the object field may be used as identification (ID) information for generating the avatar-based image.

In order to generate the avatar-based image, the device 100 may store a plurality of object images. The plurality of object images may be stored in an external device connectable to the device 100.

The plurality of object images may include the number of images corresponding to the number of pieces of the object information included in the object field of FIG. 3. The plurality of object images may include an avatar, a photo, a moving image, a drawing, and/or a character, but are not limited thereto according to an exemplary embodiment.

FIG. 4 is a table for describing a relationship between a plurality of pieces of object information and a plurality of object images, which are stored in the device 100, according to an exemplary embodiment.

Referring to FIG. 4, each piece of object information included in an object field has a corresponding object image. The device 100 may read an object image from a memory of the device 100 by using object information as ID information. When the plurality of pieces of object information and the object images of FIG. 4 stored in an external device connected to the device 100, the device 100 may receive an object image from the external device by using object information.

The device 100 may generate and display an avatar-based image like the one shown in FIG. 1 by combining generated object images. Referring to FIG. 4, the avatar-based image shown in FIG. 1 may be an image generated by combining a female avatar corresponding to the female, an object image corresponding to the first trip place, and an object image corresponding to the first preparation.

Returning to FIG. 2, in operation S202, the device 100 may receive a user input indicating a request to change an avatar-based image displayed as shown in FIG. 1. Examples of the user input may include a touch-based user input, a voice-based user input, and a gesture-based user input, but the user input according to an exemplary embodiment is not limited thereto.

FIGS. 5A through 5E are diagrams for describing an example of the device 100 changing an avatar-based image, according to an exemplary embodiment. In FIGS. 5A through 5E, preparations for a trip are changed.

Figure 5A:
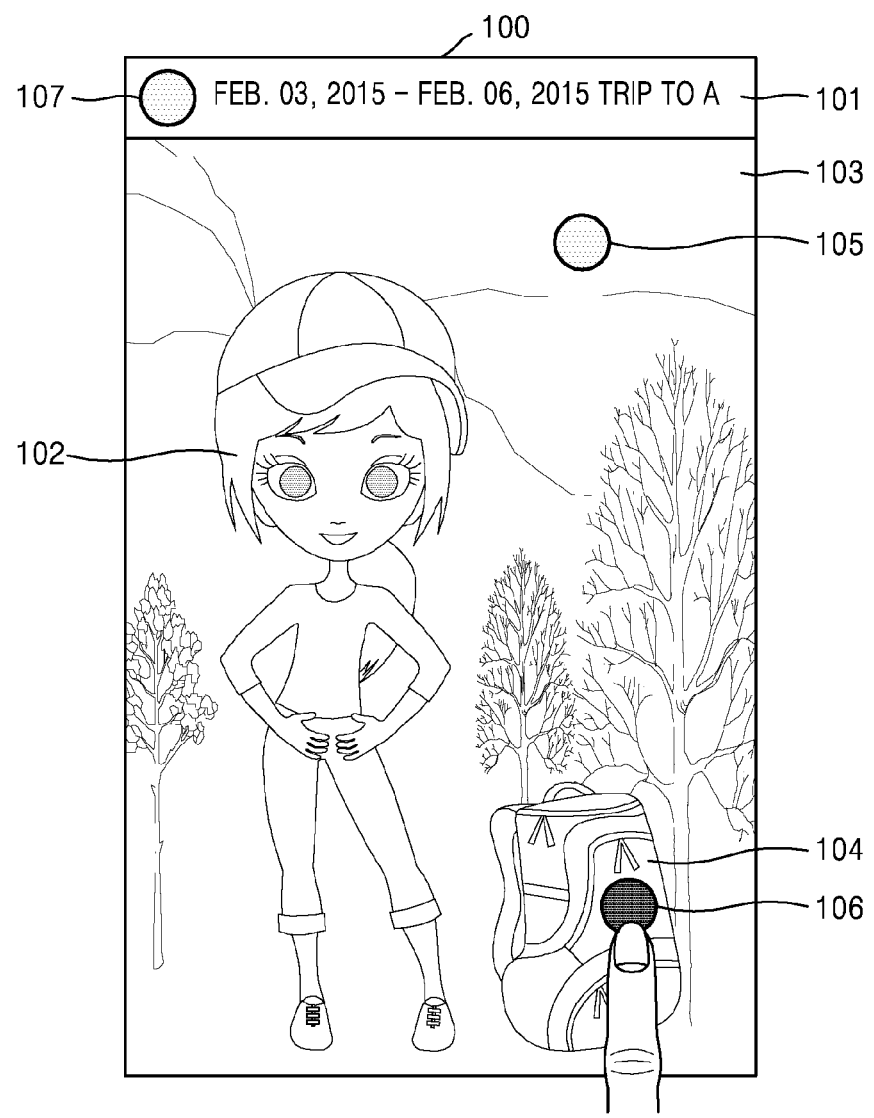
FIGS. 5A through 5E are diagrams for describing an example of a device changing an avatar-based image, according to an exemplary embodiment.
Figure 5B:
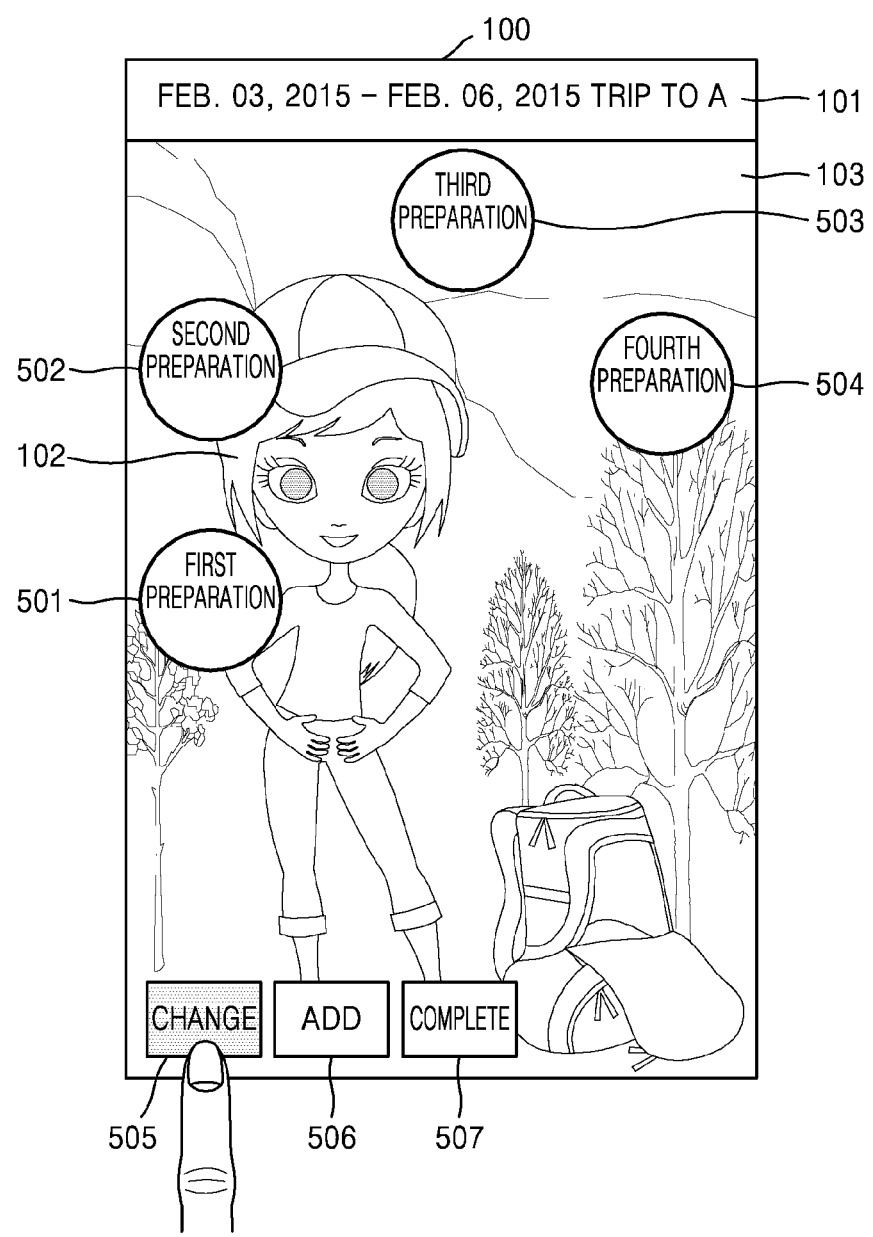

Referring to FIG. 5A, when a user input selecting the information 106 indicating that the picture 104 of the bag is a changeable image is received, the device 100 displays images 501 through 504 respectively regarding first through fourth preparations together with the avatar-based image as shown in FIG. 5B. If the first preparation is the bag, the device 100 may display images 502 through 504 respectively regarding second through fourth preparations. If the first preparation is the bag and the device 100 display images 501 through 504 respectively regarding the first through fourth preparations, the device 100 may display the same image as the picture 104 of the bag, as an image 501 regarding the first preparation. The device 100 may display the image 501 regarding the first preparation with a smaller display size than a display size of the picture 104 of the bag. Also, the device 100 may display a change button 505, an add button 506, and/or a complete button 507.

Figure 5C:
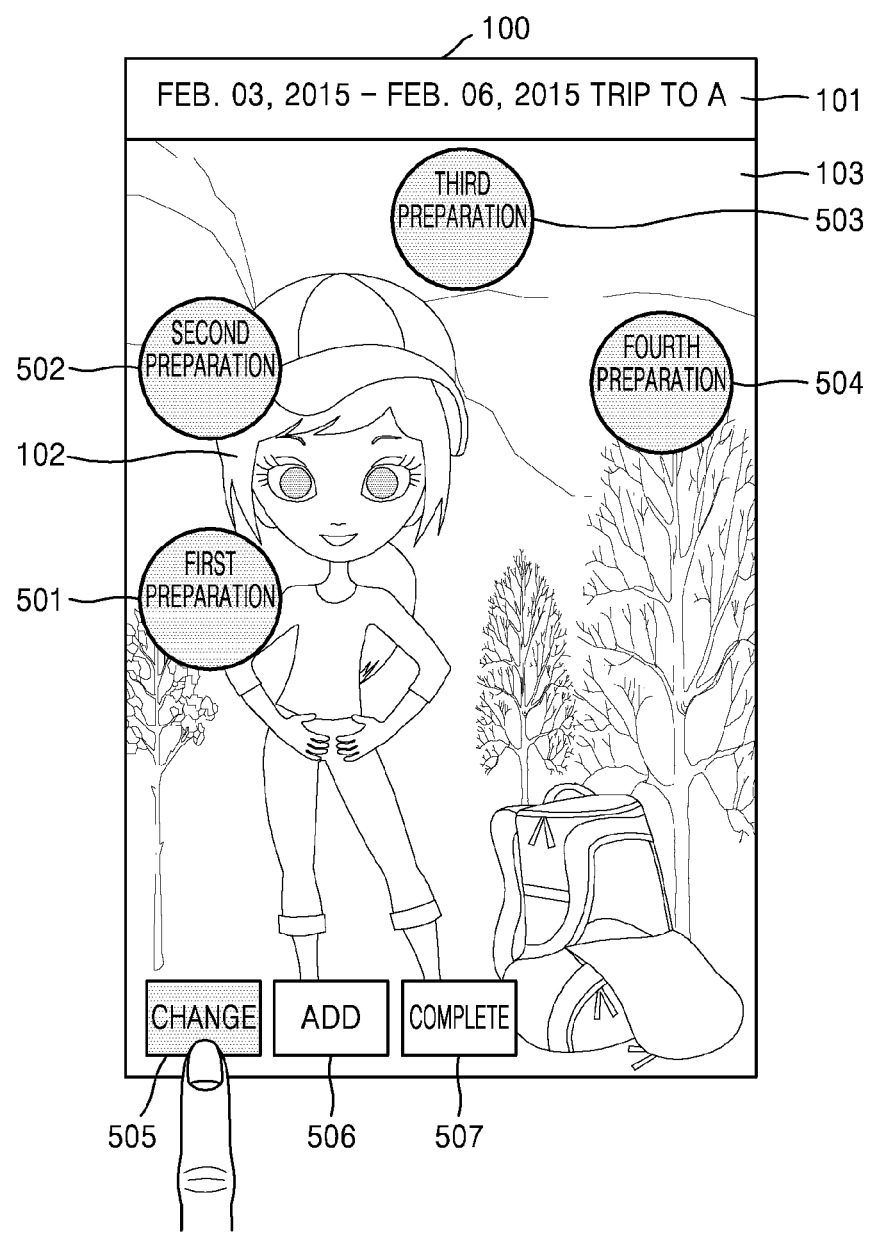

In FIG. 5B, when a user input selecting the change button 505 is received, the device 100 changes display states of the images 501 through 504 respectively regarding the first through fourth preparations as shown in FIG. 5C. Accordingly, the user recognizes that the first through fourth preparations are changeable.

Figure 5D:
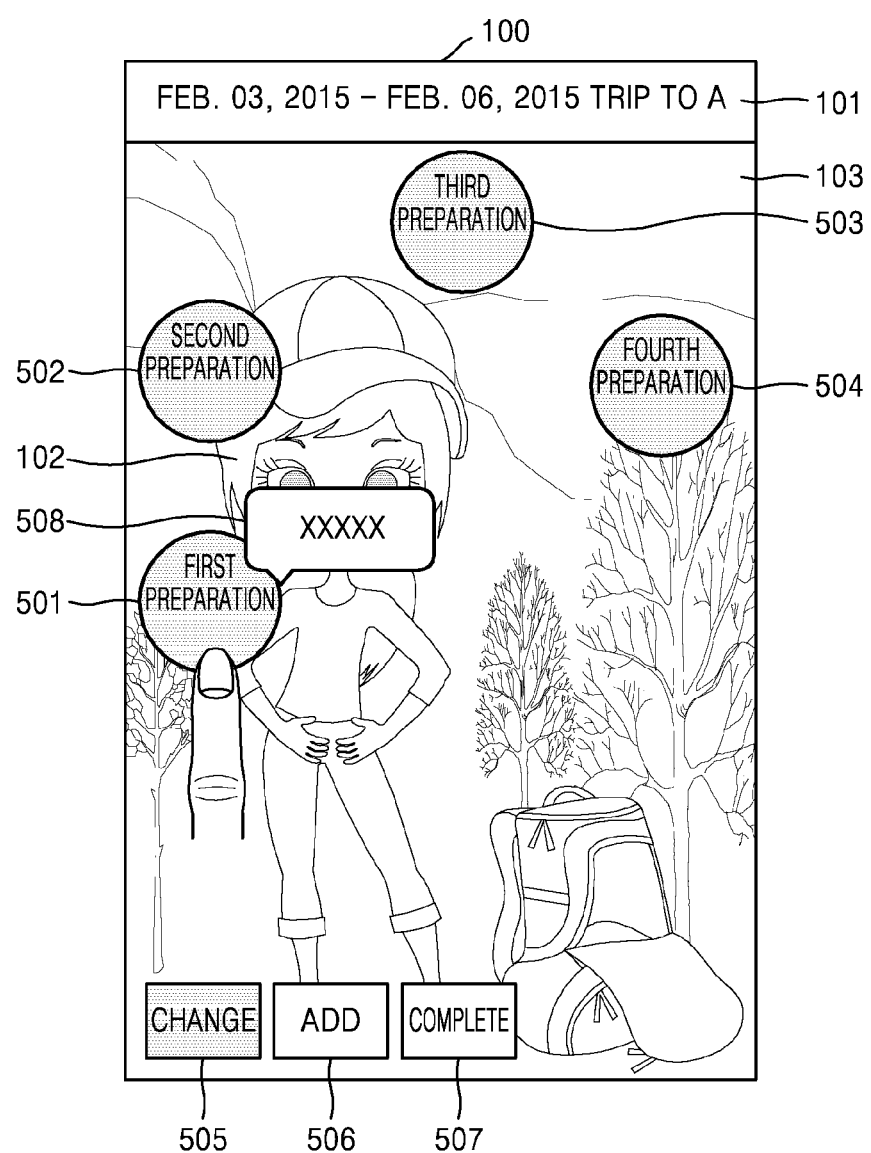

When a user input selecting the image 501 of the first preparation in FIG. 5C is received, the device 100 displays detail information about the first preparation as shown in FIG. 5D.

Referring to FIG. 5D, the detail information about the first preparation may be provided by displaying a popup window 508 near the image 501 of the first preparation, but an exemplary embodiment is not limited thereto. Since the detail information provided through the popup window 508 is detail information about the first preparation, the user may delete or change the first preparation while looking at the detail information through the popup window 508. The device 100 may display the detail information in a different display region instead of in a form of the popup window 508. For example, the detail information may be displayed through a region where the duration information 101 is displayed.

Figure 5E:
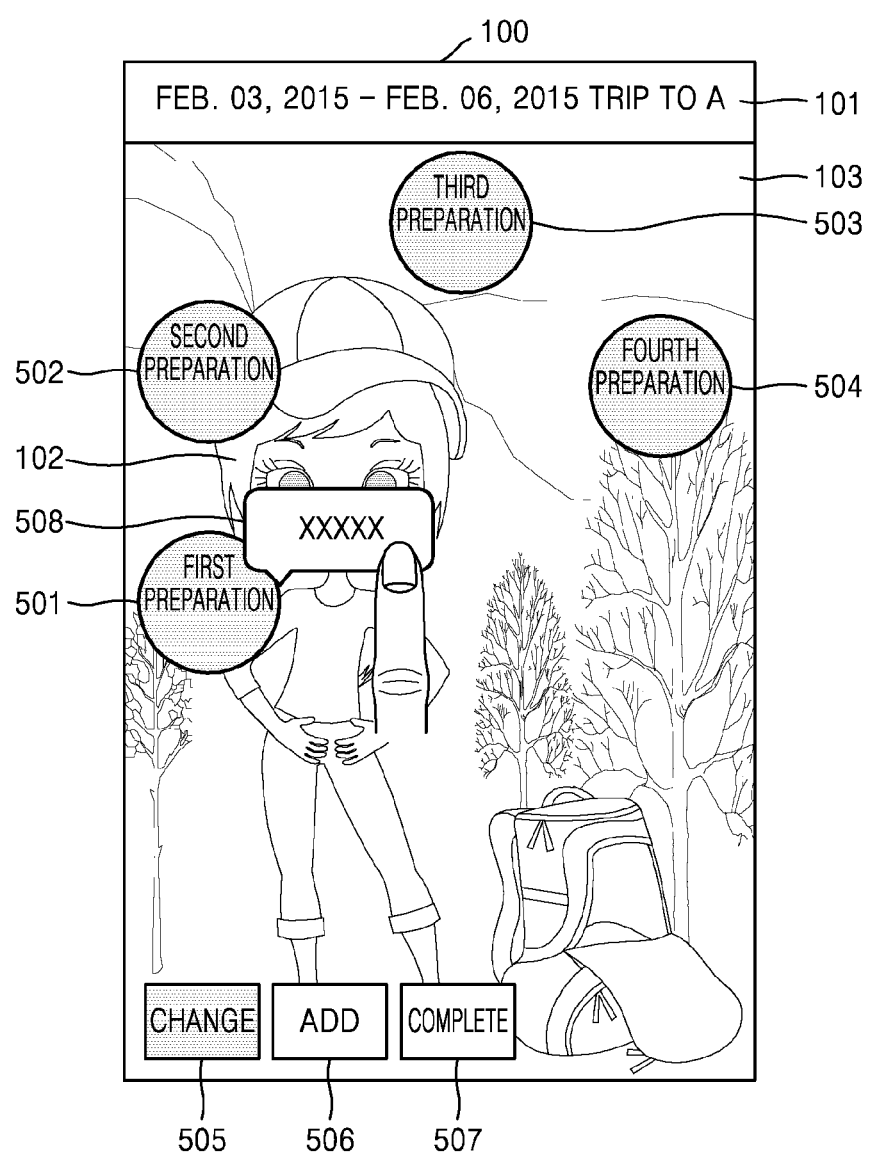

When the user selects the popup window 508 displaying the detail information as shown in FIG. 5E, the device 100 may display further detail information about the first preparation. The device 100 may provide the further detail information by using another page. When the further detail information is provided by using the other page, the device 100 may change a screen of FIG. 5E to a page providing the further detail information.

FIGS. 6A through 6E are diagrams for describing another example of the device 100 changing an avatar-based image, according to an exemplary embodiment. In FIGS. 6A through 6E, a route of a trip is changed.

Figure 6A:
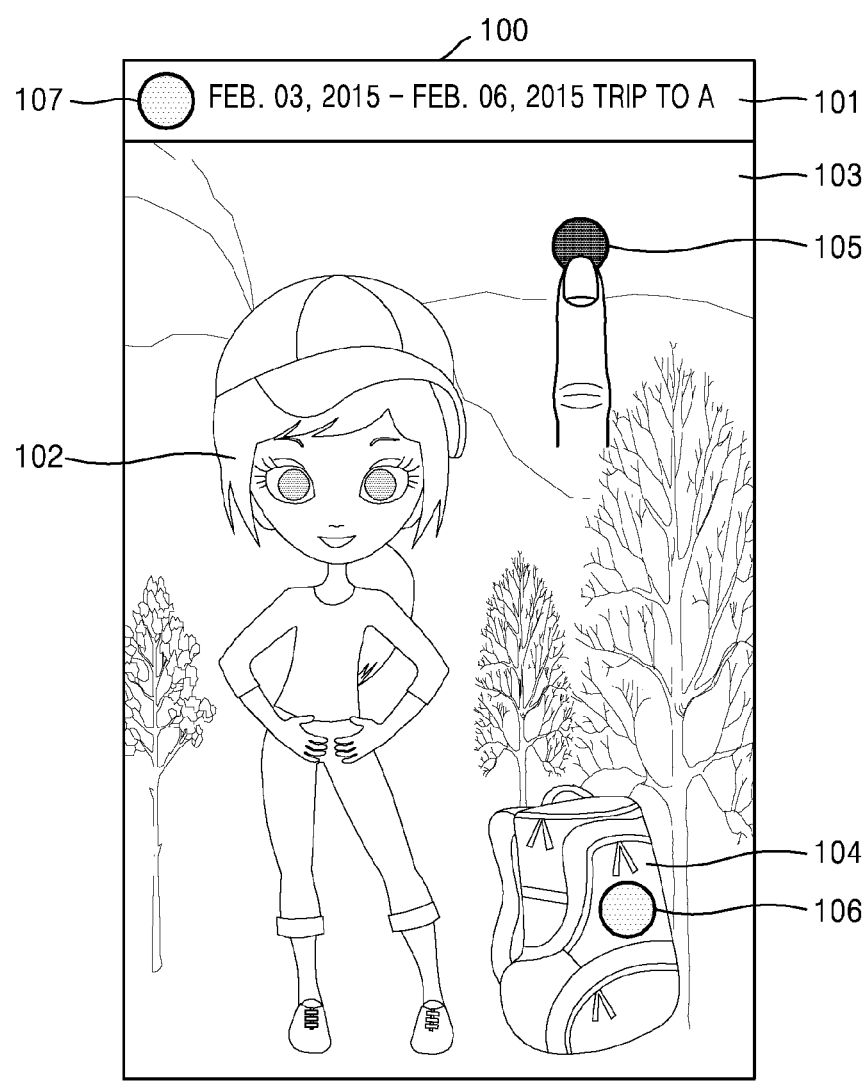
FIGS. 6A through 6E are diagrams for describing another example of a device changing an avatar-based image, according to an exemplary embodiment.

Referring to FIG. 6A, when a user input selecting the information 105 is received, the device 100 displays images 601 through 605 indicating first through fifth trip places and information (for example, arrows) indicating an order of visiting the first through fifth trip places, together with an avatar-based image. The images 601 through 605 may include text information. The text information may include a trip place name. The images 601 through 605 may include a symbol, a mark, an icon, or a thumbnail of a representative image of a trip place.

Figure 6B:
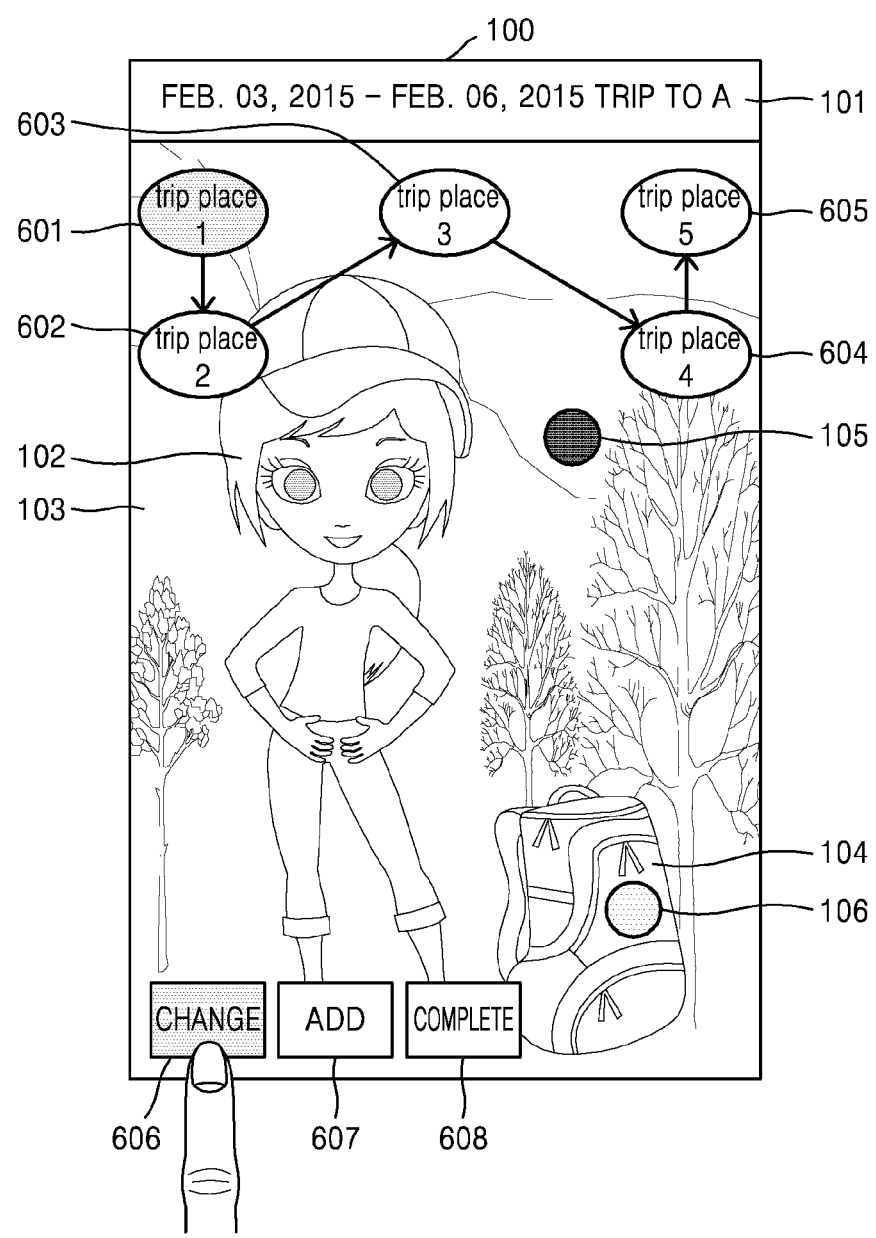

Referring to FIG. 6B, the device 100 displays the image 601 indicating the first trip place in a manner to distinguish the image 601 from the images 602 through 605 indicating the second through fifth trip places such that a user easily recognizes that the photo 103 about a trip place included in the avatar-based image corresponds to the first trip place. For example, in FIG. 6B, the device 100 may highlight the image 601 indicating the first trip place.

The device 100 may display, together with the avatar-based image, a change button 606, an add button 607, and/or a complete button 608. The complete button 608 is a button for receiving a user input completing a change operation and/or an add operation performed on the avatar-based image displayed on the device 100.

Figure 6C:
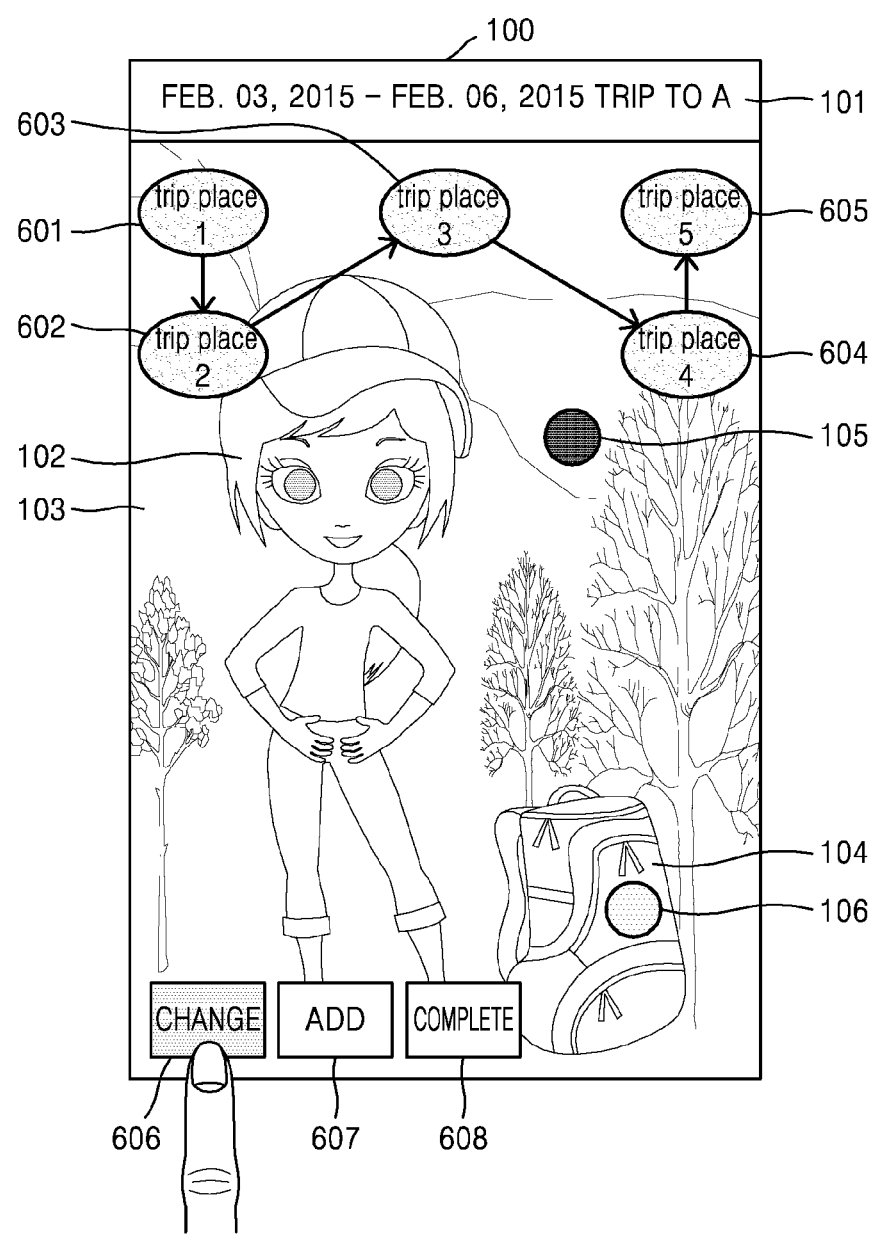

When a user input selecting the change button 606 is received in FIG. 6B, the device 100 changes display states of the images 601 through 605 as shown in FIG. 6C. Accordingly, the user easily recognizes that the images 601 through 605 are changeable.

Figure 6D:
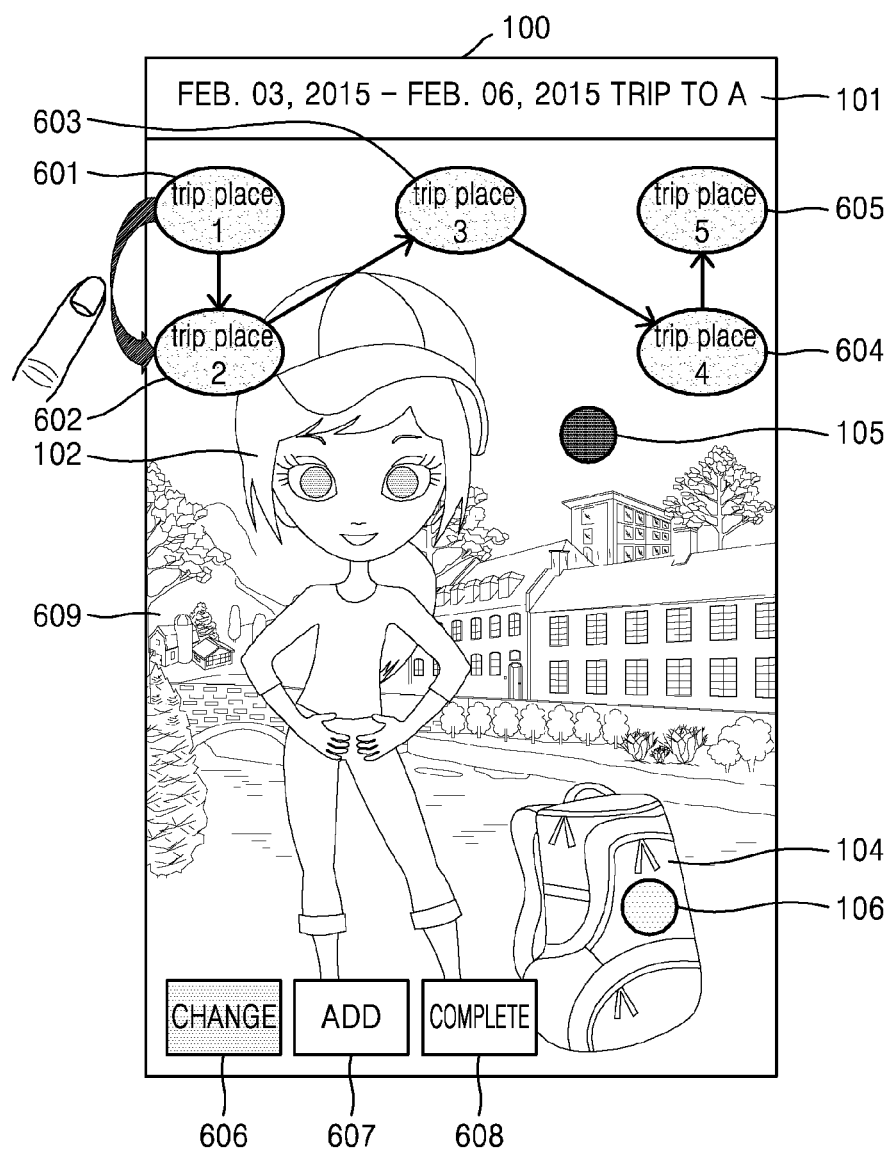
Figure 6E:
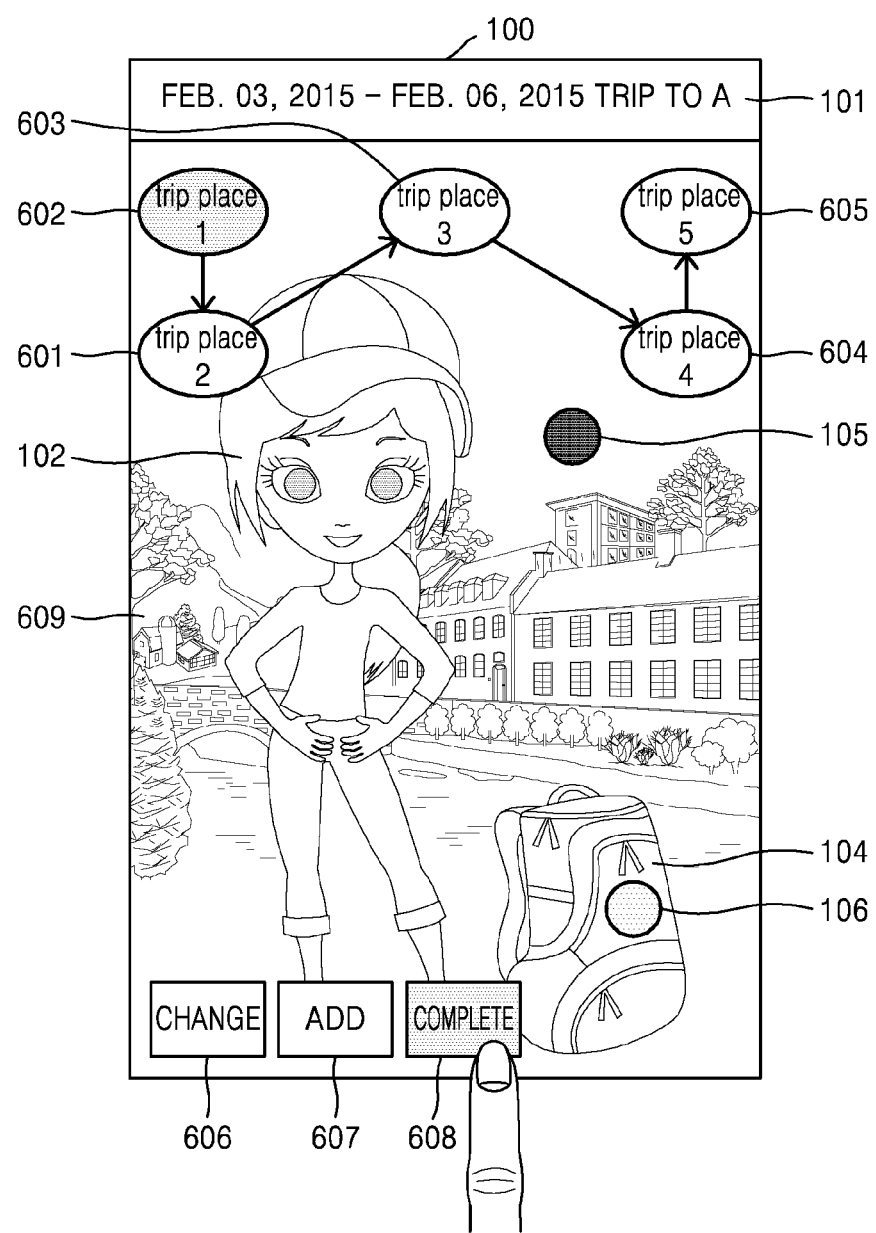

In FIG. 6D, when a user input moving the image 601 to the image 602 is received, the device 100 changes the photo 103 based on the first trip place to a photo 609 based on the second trip place as shown in FIG. 6D while changing an arrangement of the images 601 through 605 as shown in FIG. 6E. Accordingly, the user recognizes that the route is changed such that the second trip place is visited first.

With reference again to FIG. 2, when the user selects the complete button 608 after checking the changed route as shown in FIG. 6E, the device 100 updates the trip schedule information according to the avatar-based image in operation S203, such that the trip schedule information is changed to an order of the original second trip place, the original first trip place, the third trip place, the fourth trip place, and the fifth trip place as shown in FIG. 6E.

Figure 7:
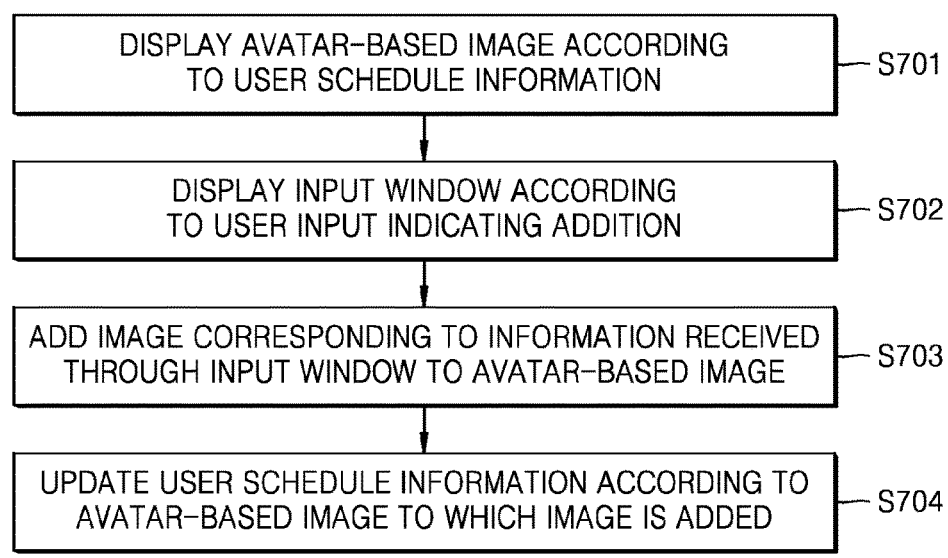
FIG. 7 is a flowchart of a method of managing user information, wherein a device adds user information by using an avatar-based image according to user schedule information, according to an exemplary embodiment.

FIG. 7 is a flowchart of a method of managing user information, wherein the device 100 displays an avatar-based image according to user schedule information, and updates the user schedule information by adding information based on the displayed avatar-based image, according to an exemplary embodiment.

Referring to FIG. 7, in operation S701, the device 100 displays an avatar-based image according to user schedule information. The device 100 may display the avatar-based image according to the user schedule information as described above with reference to operation S201.

In operation S702, when a user input indicating addition is received, the device 100 displays an input window. The device 100 may display the input window as an independent window.

When information is received through the input window, the device 100 adds an image corresponding to the received information to the avatar-based image, in operation S703. For example, when the received information is a passport, the device 100 may add an image corresponding to the passport to the avatar-based image. That is, in the case of a passport, the user may enter the word "passport" through the input window, and may then be prompted to add an image of the passport. For example, the passport image may be received by the user scanning in the passport into the device 100, or may be received by the user taking a picture of the passport with the device 100. Additionally, or alternatively, the device 100 may pre-store images that may correspond to received information. Images that may correspond to the received information may be stored in an external device connectable to the device 100. A search keyword or search ID information may be assigned to each image corresponding to the received information. The device 100 may search for an image corresponding to the received information by using the search keyword or the search ID information. For example, in the case of the passport, the passport image may be stored on an external device and the passport image may be searched for by the device 100.

The device 100 may search for and provide at least one candidate image (or a plurality of candidate images) corresponding to the received information whenever one letter (or one alphabet) is received. For example, at least one candidate image corresponding to the received information when the alphabet "p" is received may be different or the same as at least one candidate image corresponding to the received information when the alphabet "pa" is received. When a signal of selecting one candidate image is received, the device 100 may add the selected candidate image to the avatar-based image.

In operation S704, the device 100 updates the user schedule information according to the avatar-based image to which the image is added.

Figure 8A:
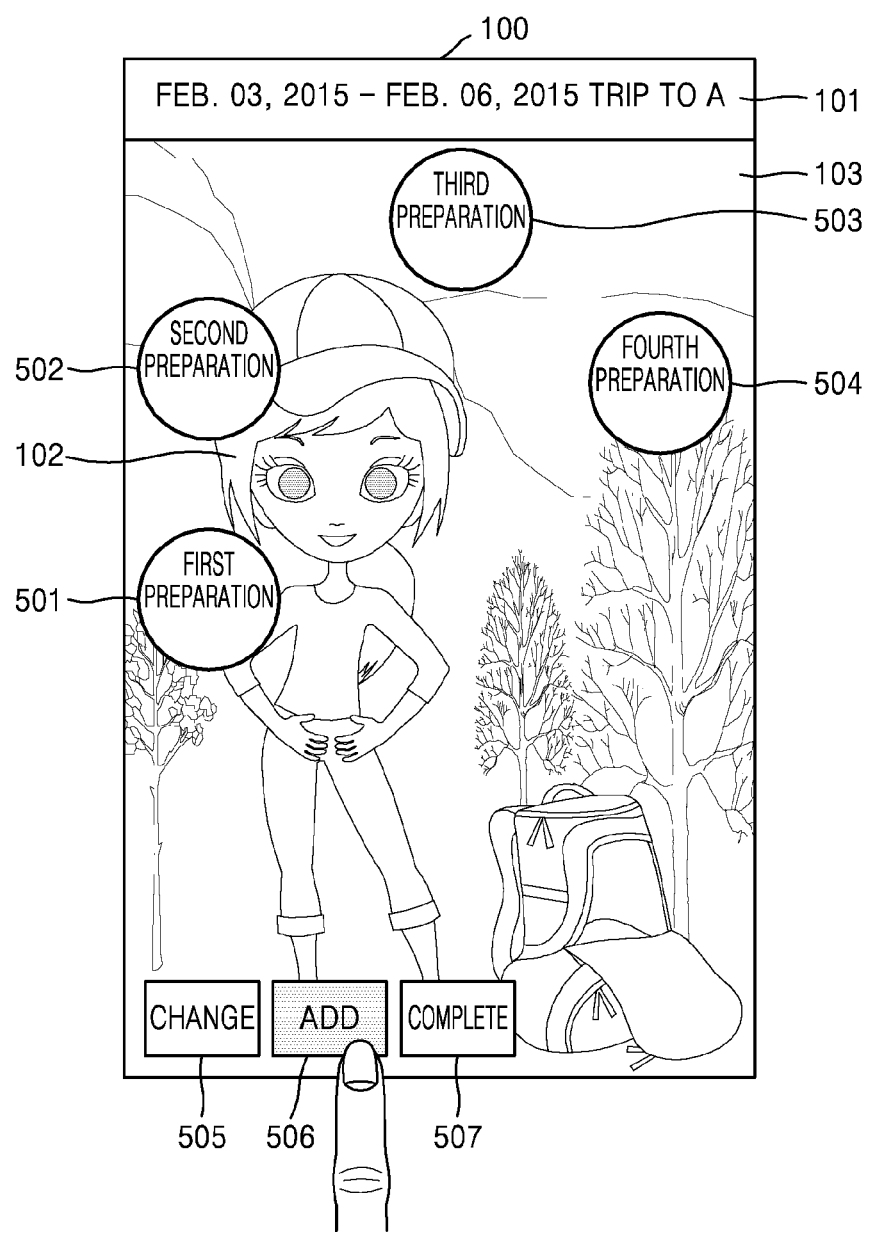
FIGS. 8A through 8C are diagrams for describing another example of a device changing an avatar-based image, according to an exemplary embodiment.
Figure 8B:
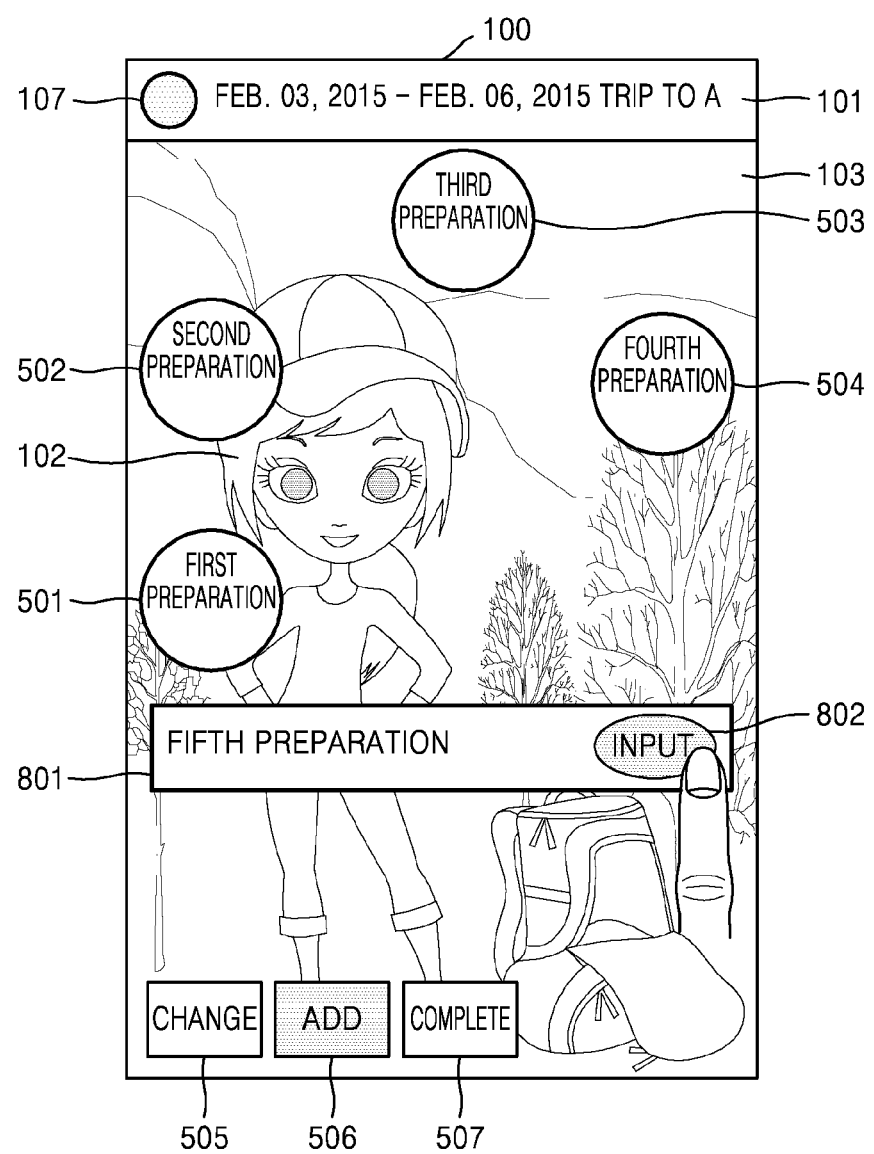
Figure 8C:
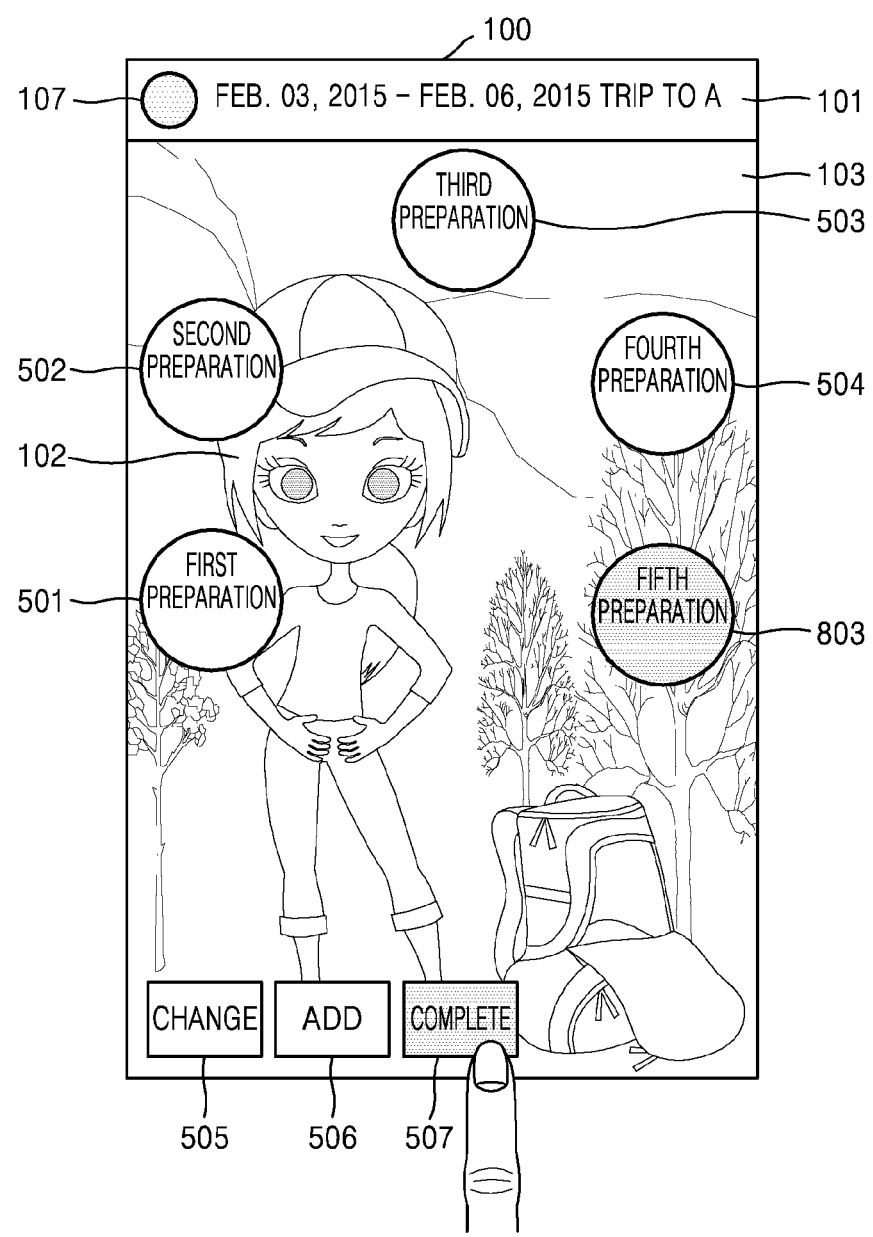

FIGS. 8A through 8C are diagrams for describing another example of the device 100 changing an avatar-based image, according to an exemplary embodiment. In FIGS. 8A through 8C, the device 100 adds a preparation.

When a user input indicating information addition based on the add button 506 is received in FIG. 8A, the device 100 displays an input window 801 as shown in FIG. 8B. When information about a fifth preparation is input through the input window 801 and a user input selecting an input button 802 is received, the device 100 adds an image 803 indicating the fifth preparation to the avatar-based image as shown in FIG. 8C.

The device 100 may display the image 803 distinguishably from the images 501 through 504. Accordingly, the user easily recognizes that the image 803 corresponding to the fifth preparation is added.

When a user input selecting the complete button 507 is received in FIG. 8C, the device 100 updates the user schedule information according to the avatar-based image to which the image 803 is added. Accordingly, the images 501 through 504 corresponding to the first through fourth preparations included in the user schedule information are changed to the images 501 through 504 and 803 corresponding to the first through fifth preparations. Thus, user may then be prompted to input an image for display with the avatar that corresponds to the fifth preparation.

Figure 9:
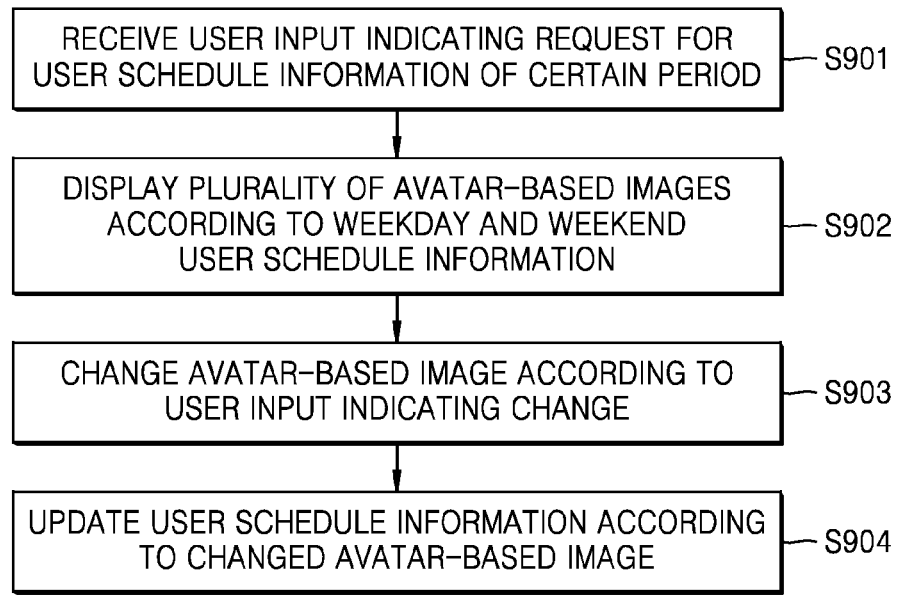
FIG. 9 is a flowchart of a method of managing, by a device, user information based on a plurality of avatar-based images according to user schedule information of a certain period, according to an exemplary embodiment.

FIG. 9 is a flowchart of a method of managing user information, wherein the device 100 displays a plurality of avatar-based images according to user schedule information of a certain period, and updating the user schedule information according to change in at least one of the plurality of avatar-based images, according to an exemplary embodiment.

In operation S901, the device 100 receives a user input indicating a request for user schedule information of a certain period. The certain period may be set based on date information. The certain period may be set based on days. The certain period may be set based on a week unit. The certain period may be set based on time (i.e. a temporal period). However, the certain period according to an exemplary embodiment is not limited thereto.

In operation S902, the device 100 displays a plurality of avatar-based images according to weekday and weekend user schedule information. Here, a weekday and a weekend are a weekday and a weekend included in the certain period. For example, when the certain period is from Feb. 2, 2015 to Feb. 15, 2015, the device 100 may display an avatar-based image according to weekday user schedule information from February 2 to February 6, an avatar-based image according to weekend user schedule information from February 7 to February 8, an avatar-based image according to weekday user schedule information from February 9 to February 13, and an avatar-based image according to weekend user schedule information from February 14 to February 15.

When a user input indicating change is received in operation S903 while the plurality of avatar-based images are displayed, the device 100 changes at least one of the plurality of avatar-based images.

In operation S904, the device 100 may update the user schedule information according to the changed at least one of the plurality of avatar-based images.

Figure 10:
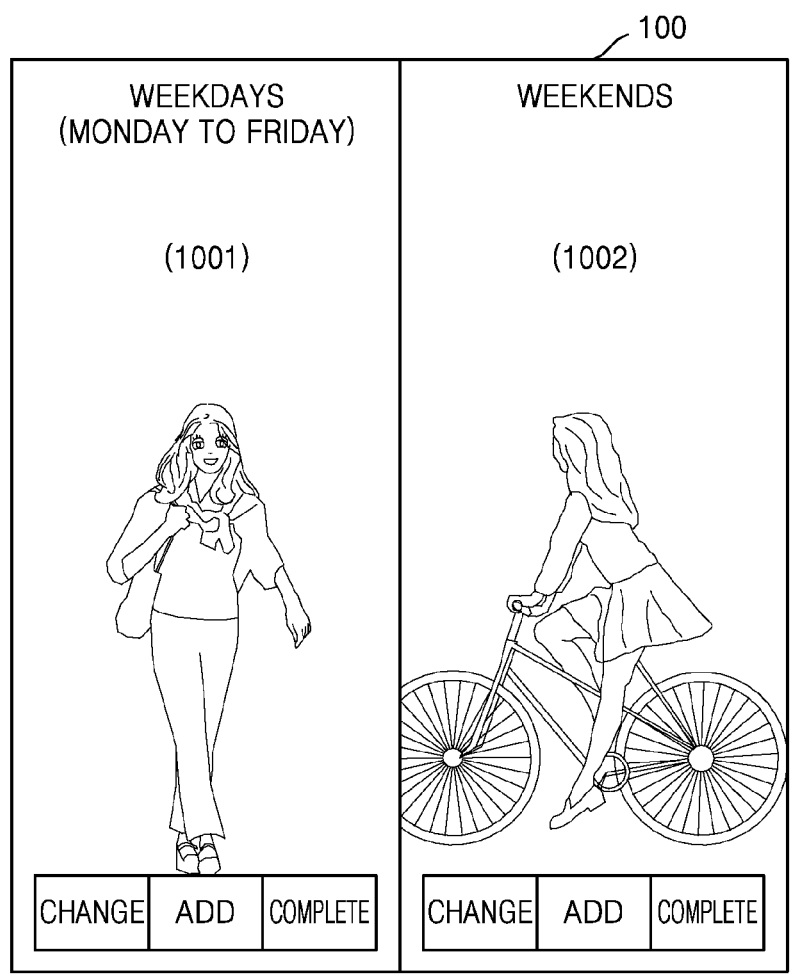
FIG. 10 illustrates an example of a device displaying a plurality of avatar-based images based on weekday user schedule information and weekend user schedule information, according to an exemplary embodiment.

FIG. 10 illustrates an example of the device 100 displaying an avatar-based image 1001 based on weekday user schedule information and an avatar-based image 1002 based on weekend user schedule information, according to an exemplary embodiment.

Figure 11:
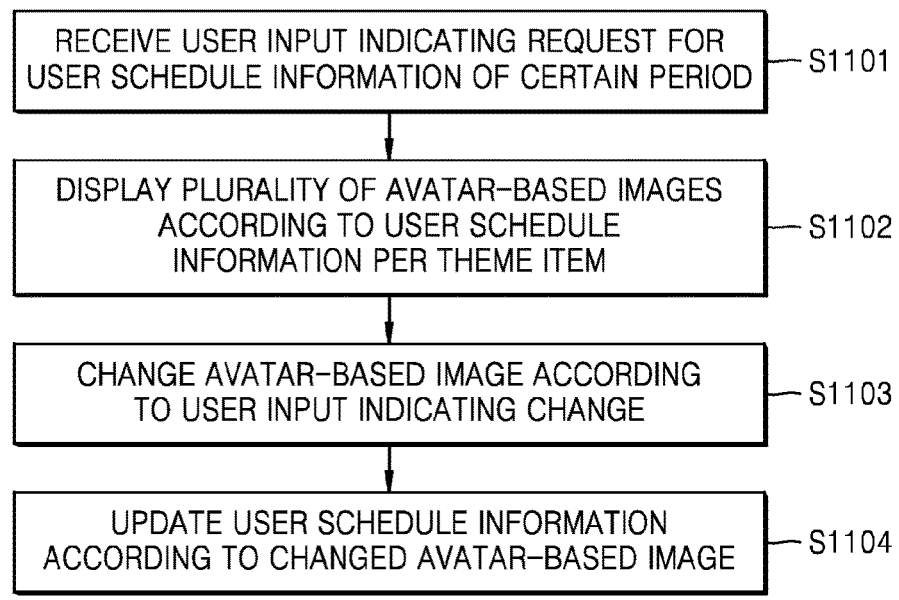
FIG. 11 is a flowchart of a method of managing user information, wherein a device uses a plurality of avatar-based images based on user schedule information per theme item, according to an exemplary embodiment.

FIG. 11 is a flowchart of a method of managing user information, wherein the device 100 displays a plurality of avatar-based images according to user schedule information per theme item based on a request for user schedule information of a certain period, and updates the user schedule information by changing at least one of the plurality of avatar-based images, according to an exemplary embodiment.

Referring to FIG. 11, upon receiving a user input indicating a request for user schedule information of a certain period in operation S1101, the device 100 displays a plurality of avatar-based images according to user schedule information per theme item in operation S1102. Here, the theme item is included in the user schedule information of the certain period.

In operation S1103, the device 100 changes at least one of the plurality of avatar-based images according to a user input indicating a change. In operation S1104, the device 100 updates the user schedule information according to the changed at least one of the plurality of avatar-based images.

Figure 12A:
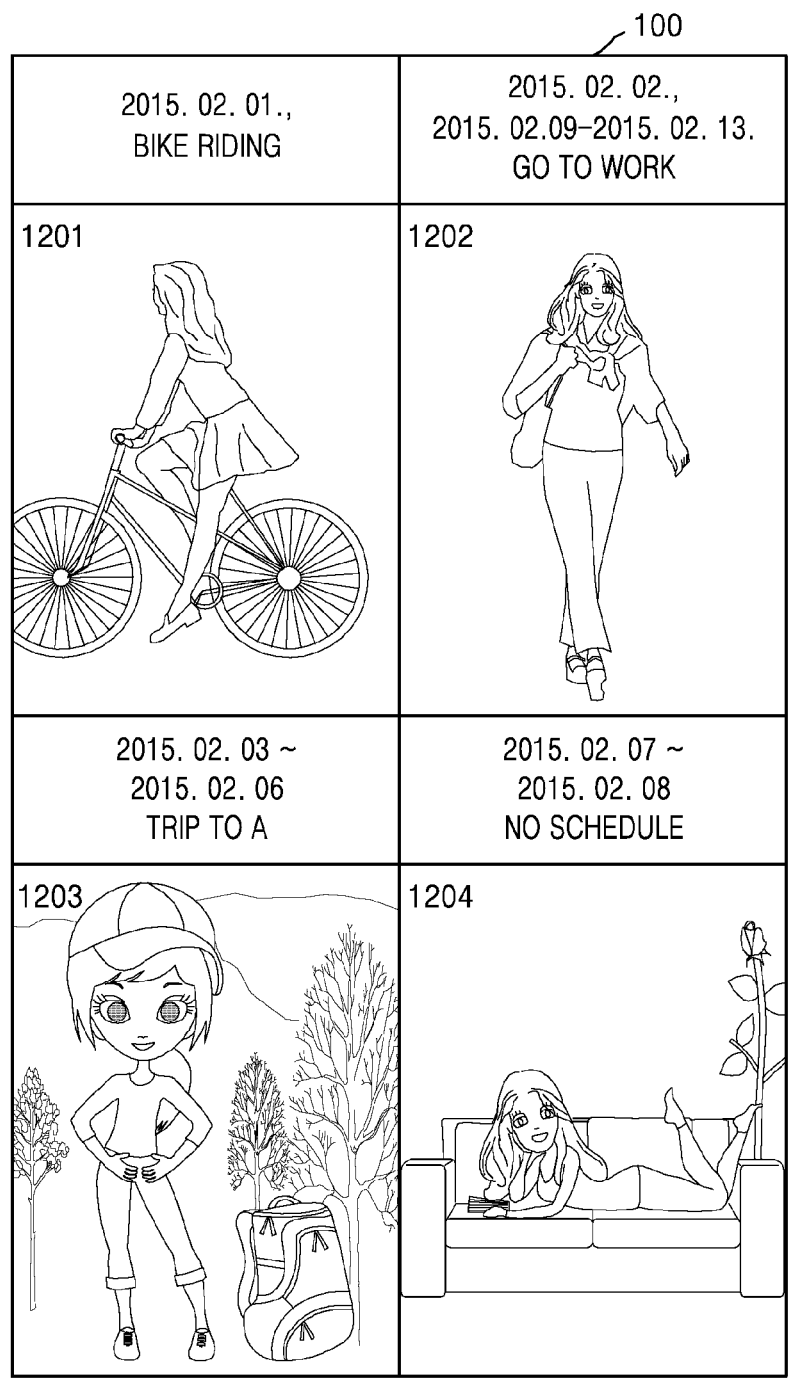
FIGS. 12A through 12C are diagrams for describing an example of changing a plurality of avatar-based images per theme item, according to an exemplary embodiment.
Figure 12B:
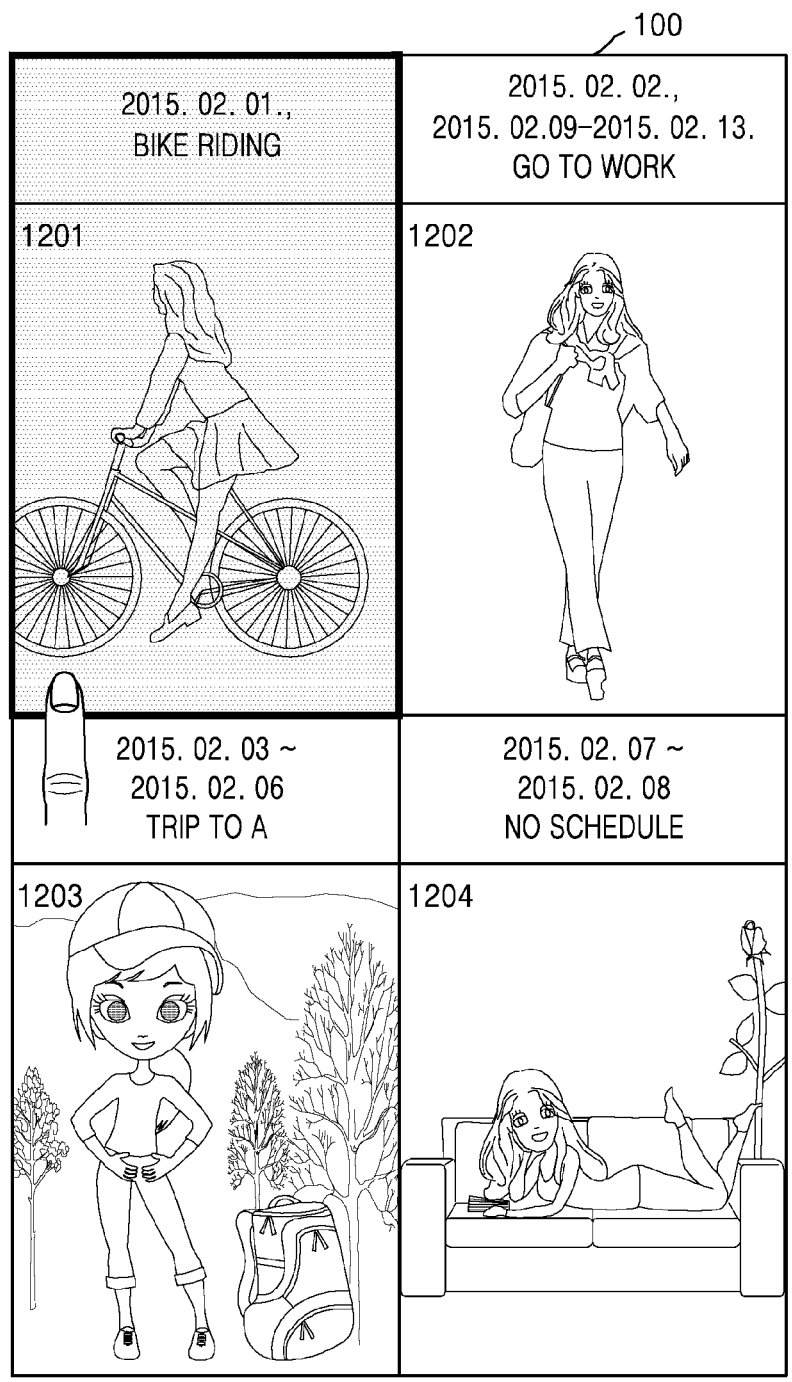
Figure 12C:
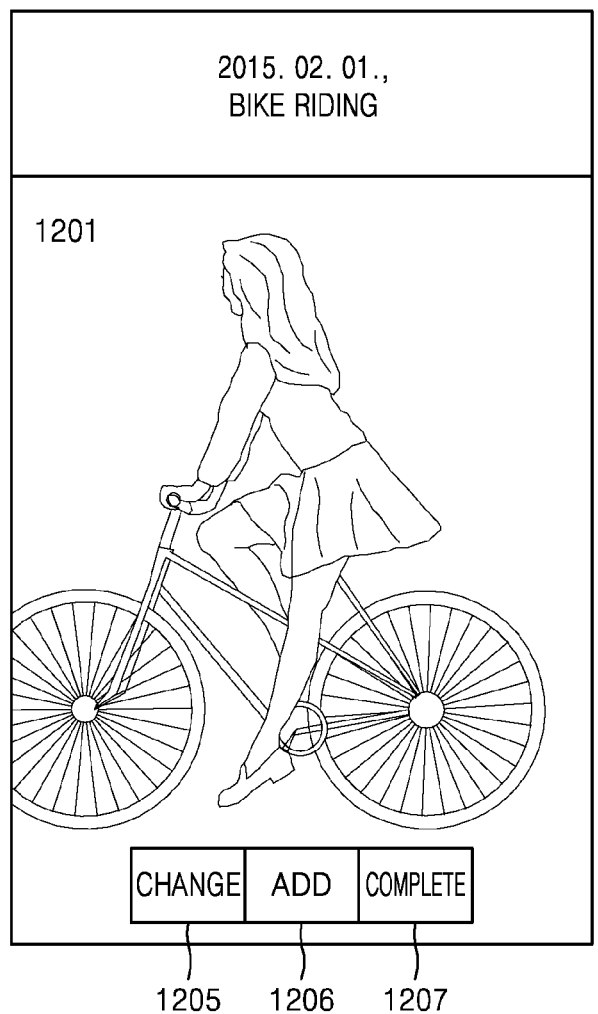

FIGS. 12A through 12C are diagrams for describing an example of displaying a plurality of avatar-based images per theme item included in the user schedule information of the certain period of FIG. 11, and changing at least one of the plurality of avatar-based images, according to an exemplary embodiment.

Referring to FIG. 12A, the device 100 displays a plurality of avatar-based images 1201 through 1204 per theme item from Feb. 1 to Feb. 8, 2015.

When a user input selecting the avatar-based image 1201 is received as shown in FIG. 12B from among the plurality of avatar-based images 1201 through 1204 of FIG. 12A, the device 100 may enlarge and display the avatar-based image 1201 on an entire screen of the device 100 as shown in FIG. 12C.

Referring to FIG. 12C, the avatar-based image 1201 may include a change button 1205, an add button 1206, and/or a complete button 1206. In FIG. 12C, a range of change may include changing bike riding to another theme item (or another user activity) or canceling the bike riding, but the range of change according to an exemplary embodiment is not limited thereto. For example, when the bike riding is changed to no schedule, the device 100 may change the avatar-based image 1201 to the avatar-based image 1204 of FIG. 12A.

A range of options for addition in FIG. 12C may include adding a date theme item with B to the bike riding. In this case, the device 100 may add an image related to B to the avatar-based image 1201. The range of options for addition according to an exemplary embodiment is not limited thereto.

Figure 13:
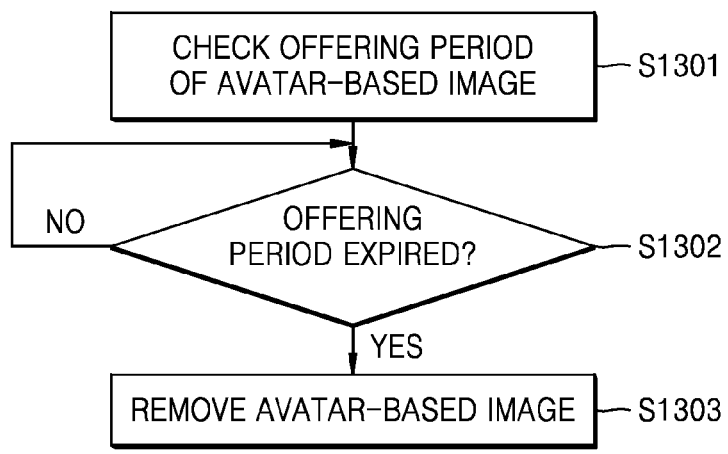
FIG. 13 is a flowchart of a method of managing user information, wherein a device manages a life of an avatar-based image, according to an exemplary embodiment.

FIG. 13 is a flowchart of a method of managing user information, wherein the device 100 manages a life of an avatar-based image, according to an exemplary embodiment.

In operation S1301, when an offering period is set with respect to an avatar-based image, the device 100 checks the offering period. The offering period may be counted based on dates. The offering period may be counted based on time. The offering period may be counted based on the number of times being provided. A basis of counting the offering period is not limited thereto according to an exemplary embodiment.

It is then determined in operation S1302 whether the offering period has expired. When it is determined that the offering period is expired (S1302, YES), the device 100 removes the avatar-based image in operation S1303. The avatar-based image may be removed by deleting the avatar-based image stored in the device 100. The avatar-based image may be stored in an external device connected to the device 100. When the avatar-based image is stored in the external device, the device 100 may transmit a command to delete the avatar-based image to the external device.

Figure 14:
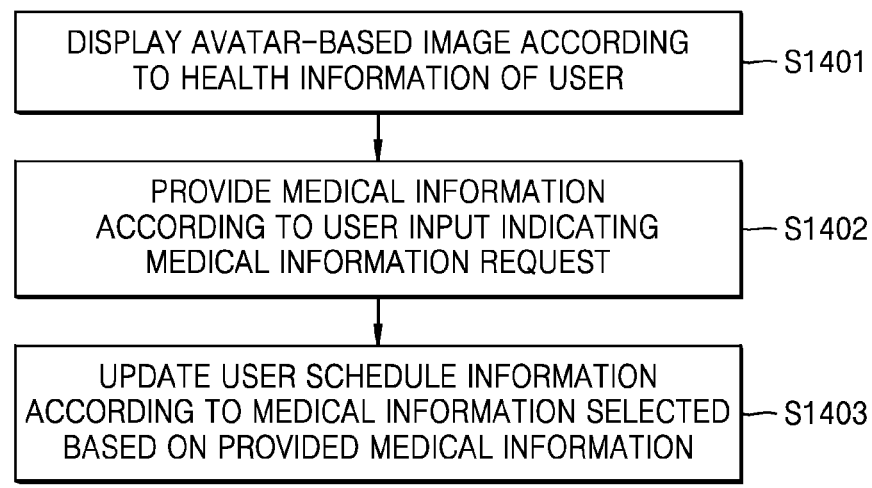
FIG. 14 is a flowchart of a method of managing user information, wherein a device uses an avatar-based image according to health information of a user, according to an exemplary embodiment.

FIG. 14 is a flowchart of a method of managing user information, wherein the device 100 displays an avatar-based image according to health information of a user, and updates user schedule information according to selected medical information, according to an exemplary embodiment.

In operation S1401, the device 100 displays an avatar-based image according to health information of a user. The health information may be received from an external device, but an exemplary embodiment is not limited thereto. The health information may be obtained by executing a health application installed in the device 100.

In operation S1402, the device 100 provides medical information related to the health information according to a user input indicating a medical information request. For example, when the health information indicates that the user has a cold, the device 100 may provide medical information related to a cold.

In operation S1403, the device 100 updates user schedule information according to medical information selected based on the provided medical information.

FIGS. 15A through 15E are diagrams for describing an example of the device 100 displaying an avatar-based image according to health information of a user, providing medical information according to the health information, and updating user schedule information according to selected medical information, according to an exemplary embodiment.

Figure 15A:
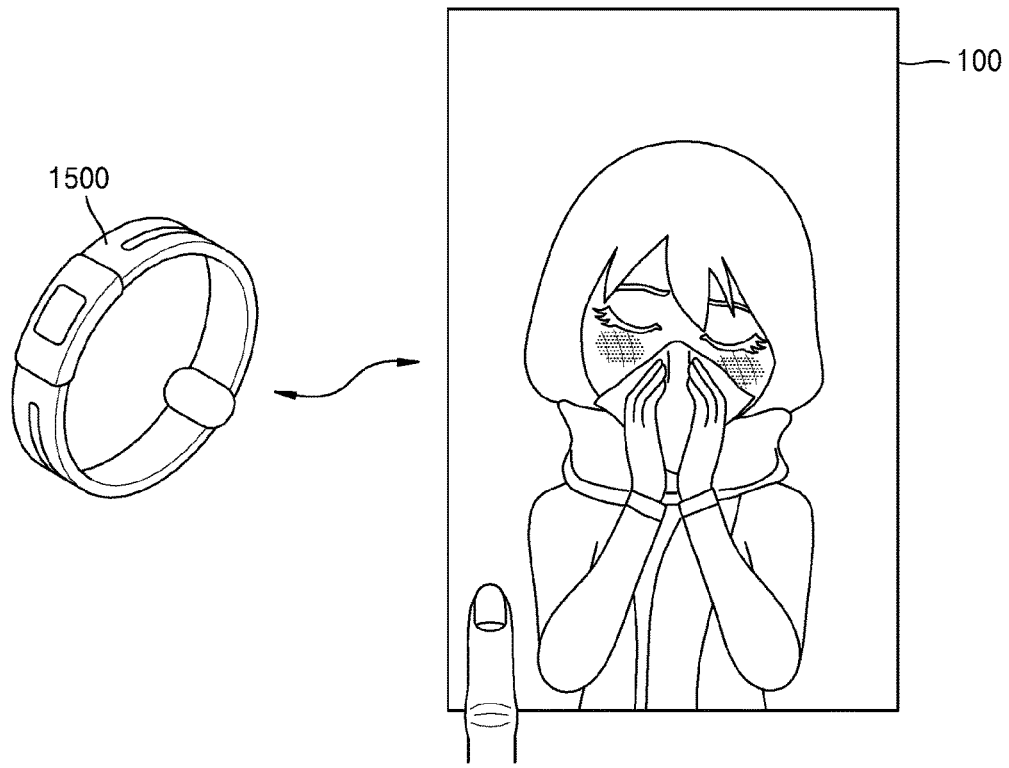
FIGS. 15A through 15E are diagrams for describing an example of updating, by a device, user information by using an avatar-based image according to health information of a user, according to an exemplary embodiment.

In FIG. 15A, the device 100 displays an avatar-based image with a fever and a runny nose according to health information of a user received from a smart bracelet 1500.

Figure 15B:
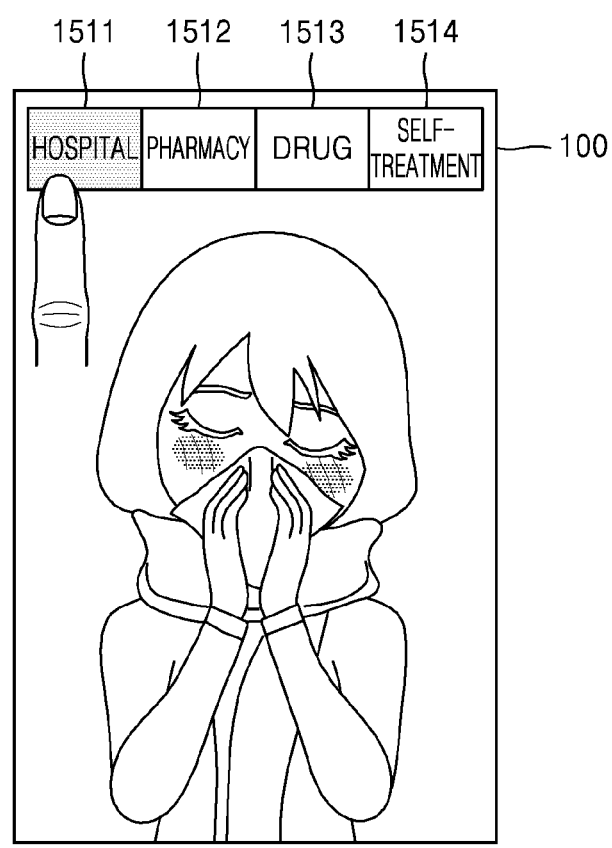

When a user input indicating a medical information request is input, the device 100 provides menu items including a hospital item 1511, a pharmacy item 1512, a drug item 1513, and a self-treatment item 1514 as shown in FIG. 15B. For example, when a user input touching the avatar-based image of FIG. 15A for a threshold period of time is received, the device 100 may provide the menu items of FIG. 15B. The menu items provided according to an exemplary embodiment is not limited thereto.

Figure 15C:
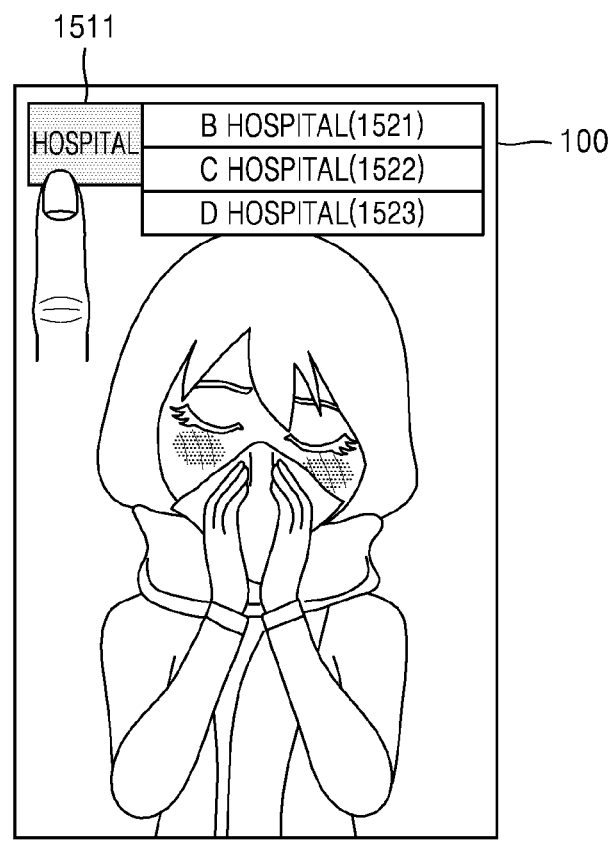

When a user input selecting the hospital item 1511 is received in FIG. 15B, the device 100 provides sub-items of the hospital item 1511, such as a B hospital 1521, a C hospital 1522, and a D hospital 1523, as shown in FIG. 15C. For example, when a user input touching the hospital item 1511 for a threshold period of time is received in FIG. 15B, the device 100 may provide the sub-items of the hospital item 1511, i.e., the B hospital 1521, the C hospital 1522, and the D hospital 1523, as shown in FIG. 15C.

Figure 15D:
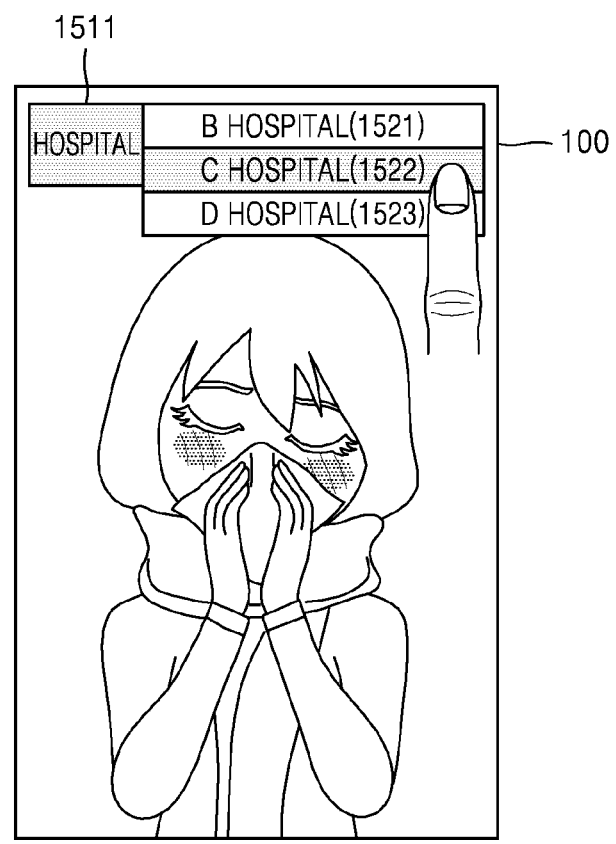
Figure 15E:
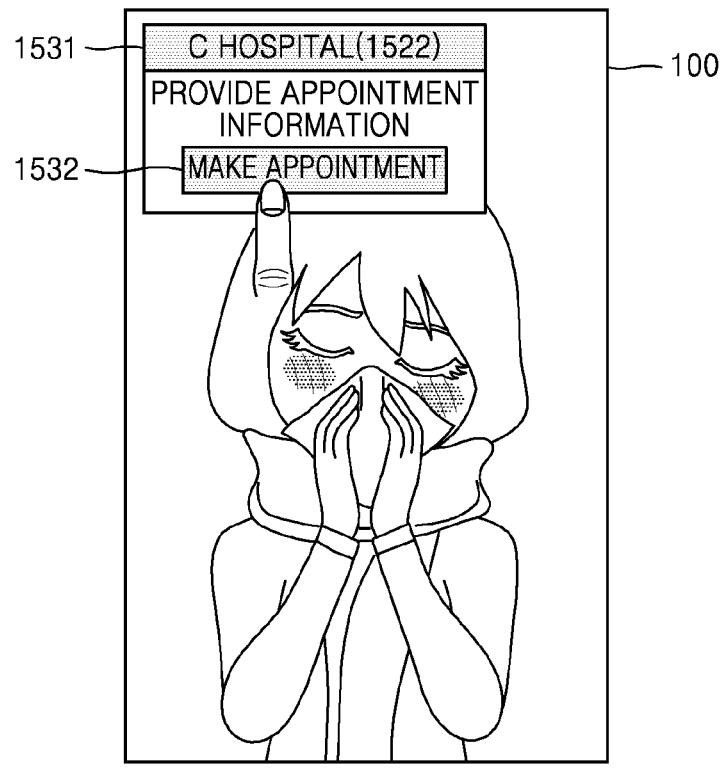

When a user input selecting the C hospital 1522 is received as shown in FIG. 15D, the device 100 provides appointment information regarding the C hospital 1522 as shown in FIG. 15E. For example, when a user input touching the C hospital 1522 for a threshold period of time is received in FIG. 15D, the device 100 may provide the appointment information regarding the C hospital 1522 in FIG. 15E.

When a user input indicating an appointment is received after a user checks the appointment information in FIG. 15E, the device 100 performs a procedure for making an appointment in the C hospital 1522. For example, when a user input touching an appointment button 1532 for a threshold period of time is received after the user checks the appointment information in FIG. 15E, the device 100 may perform the procedure for making an appointment. The procedure is performed by making an appointment in the C hospital 1522 based on the appointment information and user information. Accordingly, a server of the C hospital 1522 may store the appointment information about the user When the procedure is completed, the device 100 updates user schedule information based on the appointment information about the user in the C hospital 1522. Accordingly, the appointment information in the C hospital 1522 may be included (or registered) in the user schedule information stored in the device 100.

Figure 16:
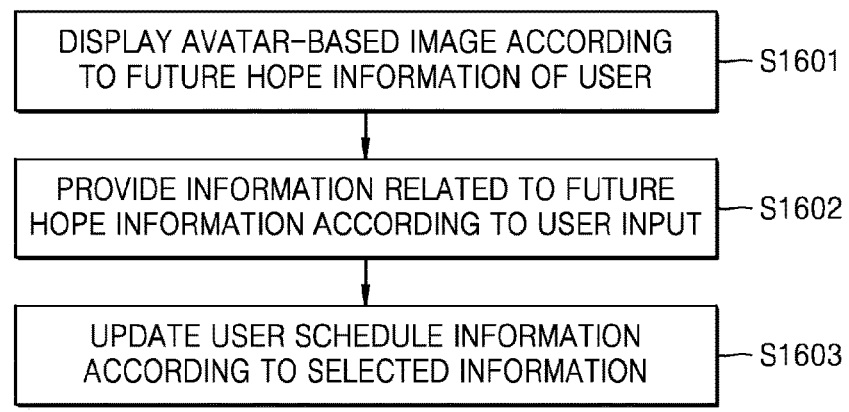
FIG. 16 is a flowchart of a method of managing, by a device, user information based on an avatar-based image according to future hope information of a user, according to an exemplary embodiment.

FIG. 16 is a flowchart of a method of managing user information, wherein the device 100 displays an avatar-based image according to future hope information of a user and updates user schedule information according to information selected from information related to the future hope information, according to an exemplary embodiment.

In operation S1601, the device 100 displays an avatar-based image according to future hope information of a user. The future hope information may indicate future job information of the user, but is not limited thereto according to an exemplary embodiment. For example, the future hope information may include a bucket list or a wish list of the user.

In operation S1602, the device 100 provides information related to the future hope information according to a user input requesting the information related to the future hope information. For example, when a user input touching, with a finger, the avatar-based image for a threshold period of time and then dragging the finger in one direction is received, the device 100 may provide the information related to the future hope information.

In operation S1603, the device 100 updates user schedule information according to information selected from the information related to the future hope information. For example, when a user input touching, with a finger, one piece of the information related to the future hope information for a threshold period of time and then dragging the finger in one direction is received, the device 100 may update the user schedule information according to the touched piece of information related to the future hope information.

FIGS. 17A through 17D are diagrams for describing processes of the device 100 displaying an avatar-based image according to future hope information of a user, providing information related to the future hope information according to a request, and updating user schedule information based on information selected by the user, according to an exemplary embodiment.

Figure 17A:
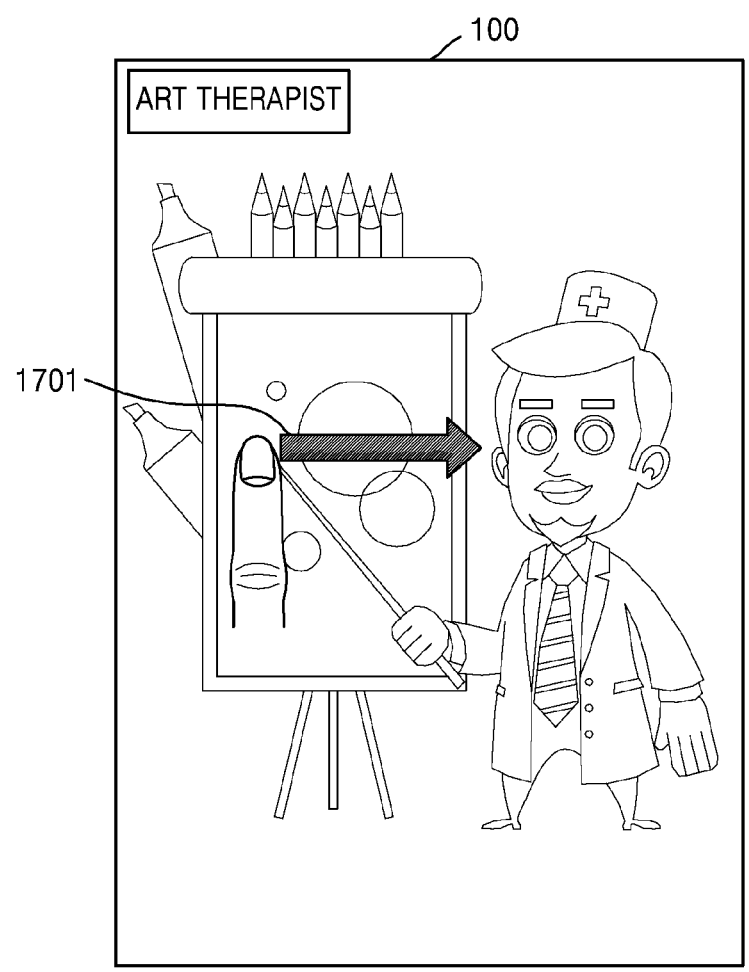
FIGS. 17A through 17D are diagrams for describing processes of updating, by a device, user schedule information based on an avatar-based image according to future hope information of a user, according to an exemplary embodiment.

Referring to FIG. 17A, the device 100 displays an avatar-based image indicating an art therapist according to future hope information of a user.

Figure 17B:
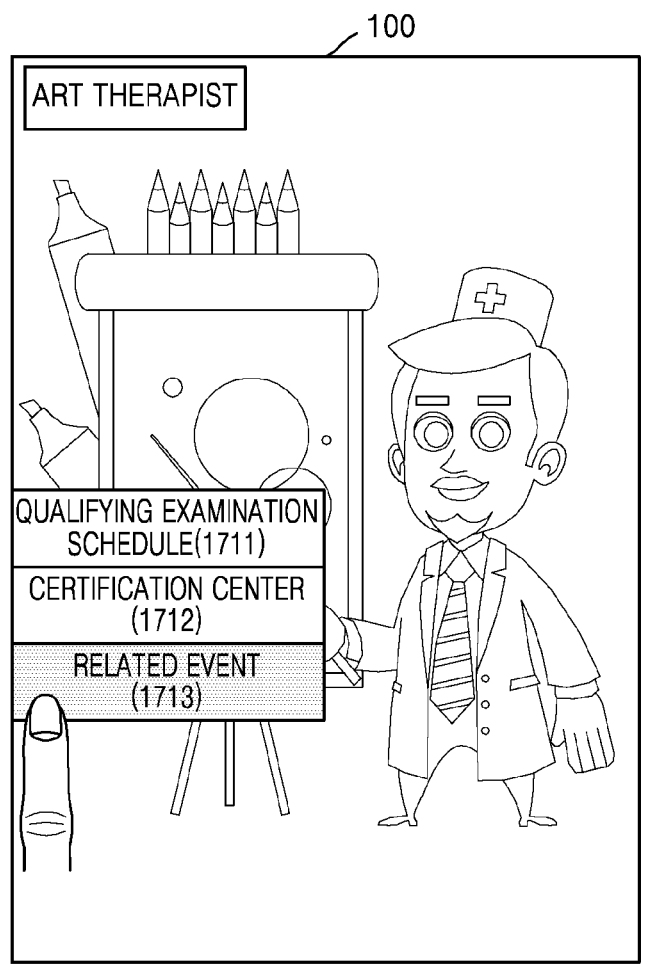

When a user input 1701 of requesting for information related to the future hope information is received as shown in FIG. 17A, the device 100 provides, as the information related to the future hope information, a qualifying examination schedule item 1711, a certification center item 1712, and/or a related event item 1713 as shown in FIG. 17B. For example, when the user input 1701 is received by touching, with a finger, an image displayed in FIG. 17A for a threshold period of time and dragging the finger in one direction, the device 100 provides information related to the future hope information, such as the quality examination schedule item 1711, the certification center item 1712, and/or the related event item 1713, as shown in FIG. 17B.

When a user input selecting the related event item 1713 is received in FIG. 17B, the device 100 provides a first event item 1721, a second event item 1722, and a third event item 1723. For example, when a user input touching the related event item 1713 for a threshold period of time is received in FIG. 17B, the device 100 may provide the first event item 1721, the second event item 1722, and the third event item 1723, which are registered in a sub-layer of the related event item 1713.

Figure 17C:
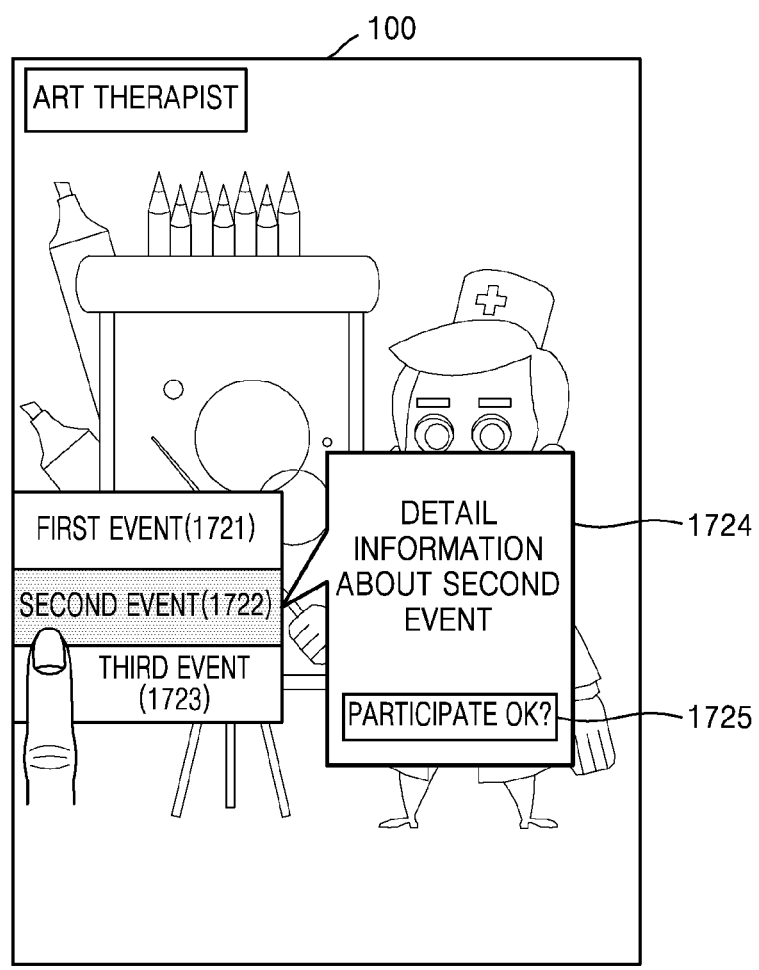

In FIG. 17C, when a user input selecting the second event item 1722 is received, the device 100 provides detail information about the second event item 1722. For example, when a user input touching the second event item 1722 for a threshold period of time is received in FIG. 17C, the device 100 may provide the detail information about the second event item 1722.

The device 100 may provide the detail information about the second event item 1722 by opening a separate window 1724 near the second event item 1722. The separate window 1724 may be displayed as a popup window having a shape of a speech bubble, but is not limited thereto.

Figure 17D:
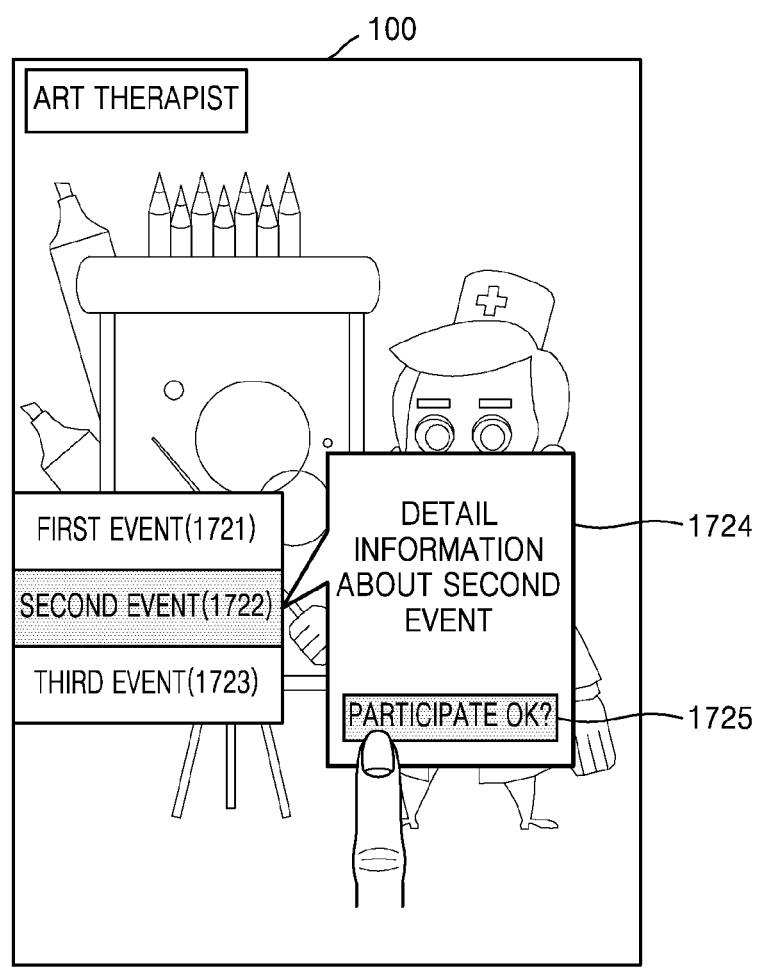

In FIG. 17D, when a user input selecting a participate OK button 1725 included in the separate window 1724 is received, the device 100 updates user schedule information by using information related to the second event item 1722. For example, in FIG. 17D, when a user input touching the participate OK button 1725 included in the separate window 1724 for a threshold period of time is received, the device 100 may update the user schedule information by using the information related to the second event item 1722. Accordingly, the information related to the second event item 1722 is included in the user schedule information.

Figure 18:
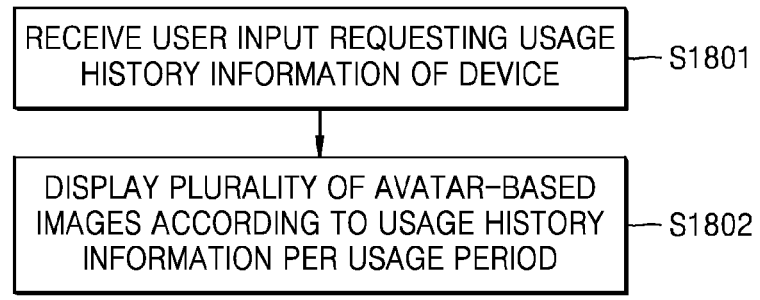
FIG. 18 is a flowchart of a method of managing user information based on a plurality of avatar-based images according to usage history information of a device, according to an exemplary embodiment.

FIG. 18 is a flowchart of a method of managing user information based on a plurality of avatar-based images according to usage history information of the device 100, according to an exemplary embodiment.

When a user input requesting usage history information of the device 100 is received in operation S1801, the device 100 displays a plurality of avatar-based images according to the usage history information per usage period of the device 100 in operation S1802. For example, when a user input indicating selection on a usage history information request item of the device 100 included in menu items provided by the device 100 is received in operation S1801, the device 100 may display a plurality of avatar-based images according to usage history information per usage period in operation S1802. In operation S1801, information specifying a usage period of the device 100 may be received. The information specifying a usage period may be input based on a date, time, and/or a day of the week.

Figure 19A:
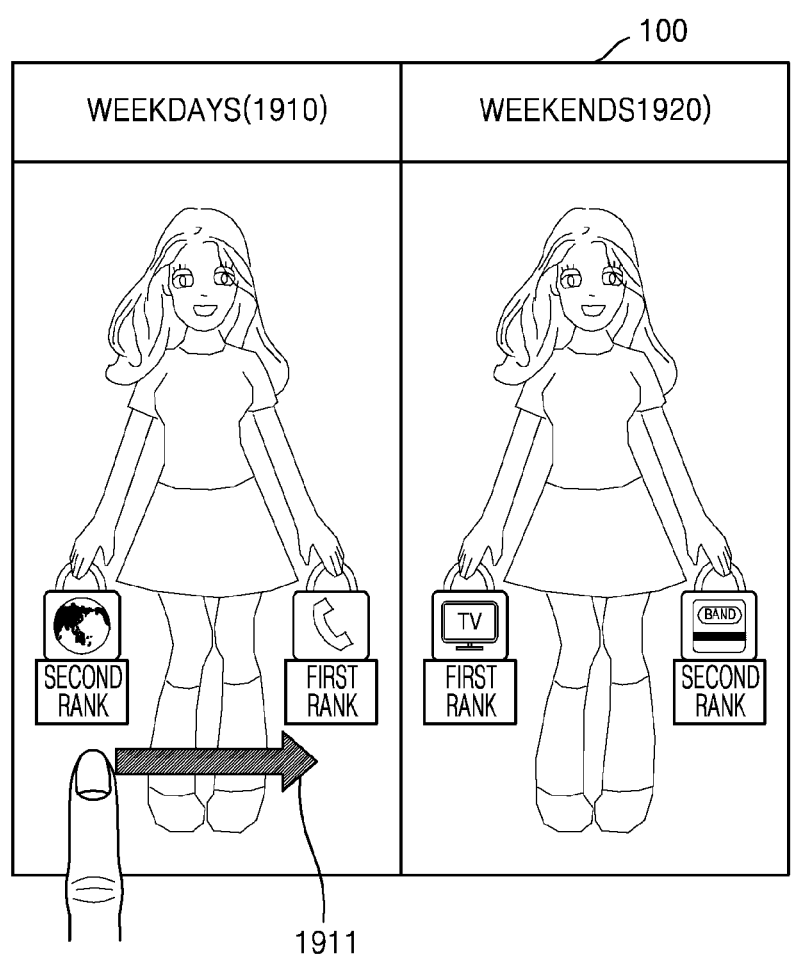
FIGS. 19A and 19B are diagrams for describing an example of providing, by a device, a plurality of avatar-based images according to a usage history information request of the device, according to an exemplary embodiment.
Figure 19B:
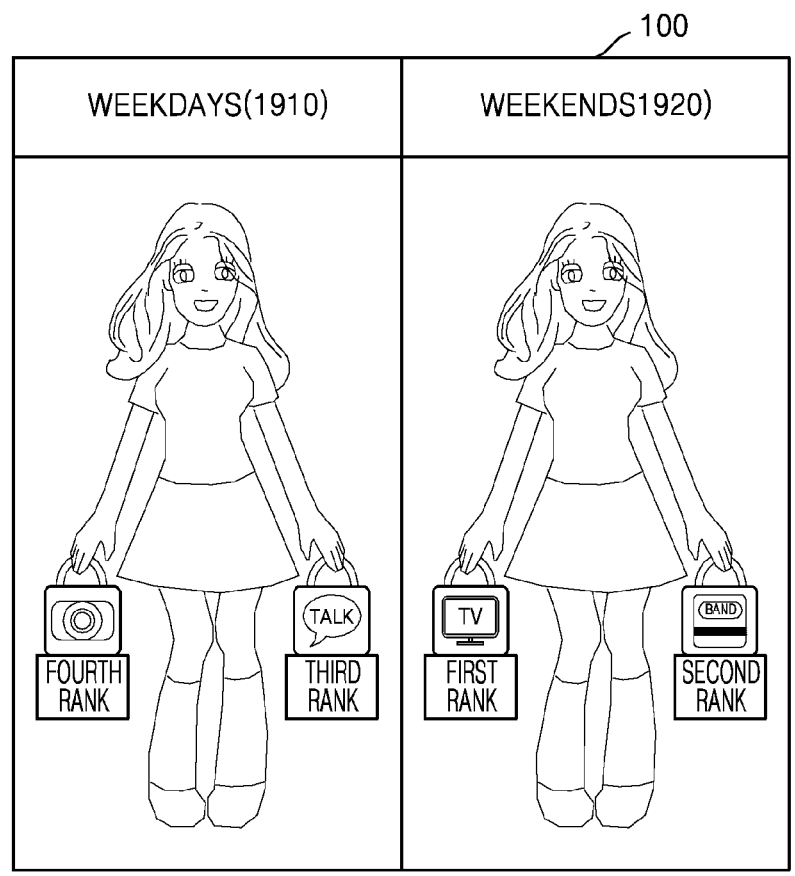

FIGS. 19A and 19B are diagrams for describing an example of providing, by the device 100, usage history information per usage period in a plurality of avatar-based images upon receiving a user input indicating a usage history information request of the device 100, according to an exemplary embodiment.

Referring to FIG. 19A, the device 100 displays a plurality of avatar-based images according to usage history information of the device 100 regarding weekdays 1910 and weekends 1920.

Referring to the weekdays 1910 of FIG. 19A, the device 100 uses a phone call application the most and an Internet application the second most on the weekdays 1910. Referring to the weekends 1920 of FIG. 19A, the device 100 uses a digital television (DTV) application the most and a Band application the second most on the weekends 1920.

In FIG. 19A, when a user input 1911 of requesting for next usage history information of the device 100 on the weekdays 1910 is received, the device 100 may change an avatar-based image of the weekdays 1910 as shown in FIG. 19B based on the next usage history information of the device 100 on the weekdays 1910. Referring to the weekdays 1910 of FIG. 19B, the device 100 uses a Kakao Talk application the third most and a camera application the fourth most on the weekdays 1910.

In FIGS. 19A and 19B, the usage history information of the device 100 is provided based on applications installed in the device 100, but is not limited thereto according to an exemplary embodiment.

Figure 20:
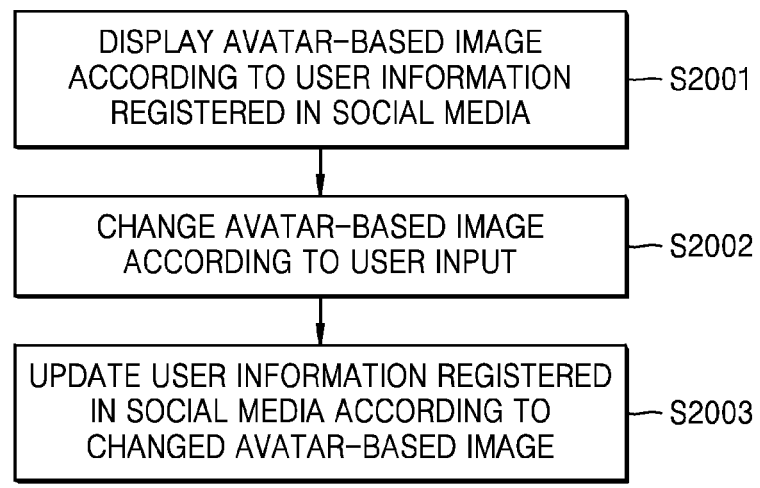
FIG. 20 is a flowchart of a method of managing user information, wherein a device uses an avatar-based image according to the user information registered in social media, according to an exemplary embodiment.

FIG. 20 is a flowchart of a method of managing user information, wherein the device 100 displays an avatar-based image according to user information registered in social media, changes the displayed avatar-based image according to a user input, and updates the user information registered in the social media according to the changed avatar-based image, according to an exemplary embodiment.

In operation S2001, the device 100 displays an avatar-based image according to user information registered in social media. The user information registered in the social media may be received from a social media server connected to the device 100. For example, user information registered in Facebook may be received from a Facebook server connected to the device 100.

The user information registered in the social media may be provided from the social media server according to a request of the device 100, or alternatively, may be automatically provided from the social media server when the device 100 is connected to the social media server. According to an exemplary embodiment, a method of receiving, by the device 100, the user information registered in the social media is not limited thereto.

In operation S2002, the device 100 changes the avatar-based image according to a user input requesting to change the avatar-based image. The avatar-based image may be changed in operation S2002 in the same manner described above with reference to operation S202 of FIG. 2.

In operation S2003, the device 100 may update the user information registered in the social media according to the changed avatar-based image. The device 100 may convert the changed avatar-based image to text information, and request the social media server to update the user information registered in the social media while transmitting the text information to the social media server. Accordingly, the social media server may update the user information. After the user information is updated, the social media server may transmit an update complete message to the device 100. According to an exemplary embodiment, a method of updating the user information registered in the social media is not limited thereto.

Figure 21:
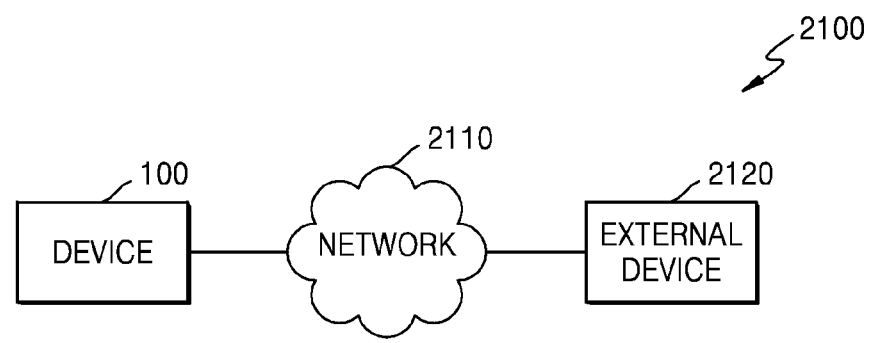
FIG. 21 is a block diagram of a system for managing user information, which includes a device, according to an exemplary embodiment.

FIG. 21 is a block diagram of a system 2100 for managing user information, which includes the device 100, according to an exemplary embodiment.

Referring to FIG. 21, the system 2100 includes the device 100, a network 2110, and an external device 2120.

The device 100 may include, for example, a portable device, a wearable device, a home Internet appliance, or a mobile device, but the device 100 according to an exemplary embodiment is not limited thereto.

The portable device may be a smart phone, a notebook, a smart board, a tablet PC, a handheld device, a handheld computer, a media player, an electronic book device, or a personal digital assistant (PDA), but the portable device according to an exemplary embodiment is not limited thereto.

The wearable device may include a device, such as smart glasses, a smart watch, a smart band (for example, a smart waist band or a smart hair band), a smart clip, a smart accessory (for example, a smart ring, a smart bracelet, a smart anklet, a smart hairpin, or a smart necklace), a smart body guard (for example, a smart knee guard or a smart elbow guard), a smart shoe, a smart glove, smart clothing, a smart hat, a smart artificial leg for a disabled person, or a smart artificial arm for a disabled person, but is not limited thereto.

The home Internet appliance may include a home device forming machine to machine (M2M) or Internet of Things (IoT), such as a smart TV, a PC, a desktop PC, a smart refrigerator, a smart washing machine, a smart lamp, a smart cleaner, a smart fitness equipment, a smart oven, a smart dish washer, a multimedia console, a game console, or a smart water purifier, but the home Internet appliance according to an exemplary embodiment is not limited thereto.

The mobile device may include a device, such as a car, which forms M2M or IoT, but the mobile device according to an exemplary embodiment is not limited thereto.

The network 2110 may include, for example, Intranet, Internetwork, Internet, a personal area network (PAN) (for example, a near field wireless communication network such as Bluetooth or home radio frequency (HomeRF)), a campus area network (CAN), a local area network (LAN), a wide area network (WAN), a game network, a Wi-Fi communication, or a Wi-Fi direct communication, but the network 2110 according to an exemplary embodiment is not limited thereto.

The network 2110 may use at least one transmission medium from among a wired transmission medium and a wireless transmission medium. The wired transmission medium may include, for example, at least one of a coaxial cable, a twisted pair cable, and/or a fiber-optic, but the wired transmission medium according to an exemplary embodiment is not limited thereto. The wireless transmission medium may include, for example, at least one of radio frequency waves, terrestrial microwaves, satellite microwaves, and/or infrared waves, but the wireless transmission medium according to an exemplary embodiment is not limited thereto.

A connection type of the network 2110 may be a star type, a net type, a tree type, a bus type, or a ring type, but is not limited thereto.

The network 2110 may use at least one of network connection devices, such as an LAN card, a hub, a switch, a bridge, a gateway, a repeater, and/or a router, but the network connection devices are not limited thereto.

The external device 2120 is a device disposed outside the device 100 and connectable to the device 100. The external device 2120 may include a cloud server of a user, a user information managing server, a question and answer (QA) server, a service providing server (for example, a game server or an application server), or a social media server, but the external device 2120 according to an exemplary embodiment is not limited thereto.

The external device 2120 may include a server, a medical device, a computing device, an appcessory, a wearable device, an IoT sensor, or an IoT device. The external device 2120 may be the same device as the device 100. A user of the external device 2120 may be the same as a user of the device 100. The user of the external device 2120 may be different from the user of the device 100.

The medical device may have a communication function and a function of sensing (or measuring) health information of a user. The medical device may include a home medical device (for example, a thermometer, a blood pressure gauge, a cholesterol gauge, a blood sugar gauge, a uric acid gauge, or a massager), a hospital medical device (for example, an ultrasonic device, a body fat measurer, a stethoscope, or an electrocardiogram (ECG) measurer), or a rehabilitation medical device (for example, a gait belt, a moving belt, a knee pad, or a paraffin bathtub), but the medical device is not limited thereto.

The appcessory is a device controlled by using an application installed in the device 100. For example, the appcessory includes a smart bulb, a smart printer, a smart wireless blood pressure gauge, a smart recorder, a smart positioning device, a smart microphone, a smart thermostat, a smart alarm device, or a smart toy.

The device 100 may perform a method of managing user information, according to one or more exemplary embodiment. The device 100 may manage user information stored in the device 100 and/or user information stored in the external device 2120 connected through the network 2110. The user information stored in the device 100 may be received from the external device 2120 and stored in the device 100. The user information stored in the external device 2120 may be received from the device 100 and stored in the external device 2120. The user information stored in the device 100 may be the same as the user information stored in the external device 2120. The user information stored in the device 100 may be different from the user information stored in the external device 2120. A part of the user information stored in the device 100 may be the same as the user information stored in the external device 2120.

The device 100 may update the user information stored in the device 100 and/or the external device 2120 by using user information changed via a method of managing user information, according to one or more exemplary embodiment. The device 100 may transmit the user information stored in the device 100 to the external device 2120 and request the external device 2120 to manage the user information.

Figure 22:
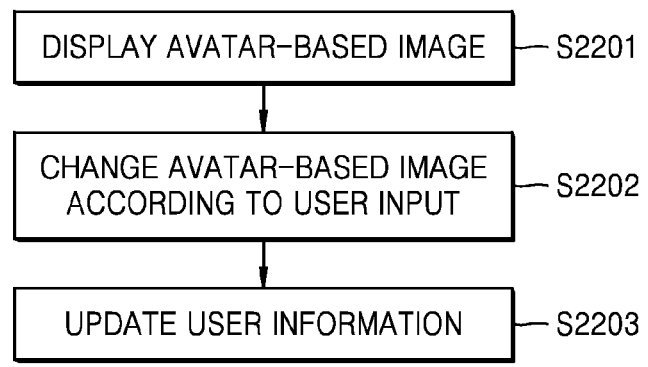
FIG. 22 is a flowchart of a method of managing, by a device, user information, according to an exemplary embodiment.

FIG. 22 is a flowchart of a method of managing, by the device 100, user information, according to an exemplary embodiment. FIGS. 23A through 23F are diagrams for describing avatar-based images displayed by the device 100 based on user information, according to exemplary embodiments.

Referring to FIG. 22, in operation S2201, the device 100 displays an avatar-based image based on user information. For example, the device 100 may generate and display an avatar-based image 2310 based on user information 2300 of FIG. 23A. The avatar-based image 2310 is an image symbolizing a user of the device 100. The avatar-based image 2310 may be represented in a 2D or 3D model avatar, a cyber character, a virtual character of the user, a virtual self-graphic icon of the user, or a user icon. According to an exemplary embodiment, a method of representing the avatar-based image 2310 is not limited thereto.

In operation S2201, the device 100 may display a plurality of avatar-based images based on user information, as shown in FIGS. 23B through 23F. (Operations S2202 and S2203 are described in detail later following the description of FIGS. 31A-31D.)

Figure 23A:
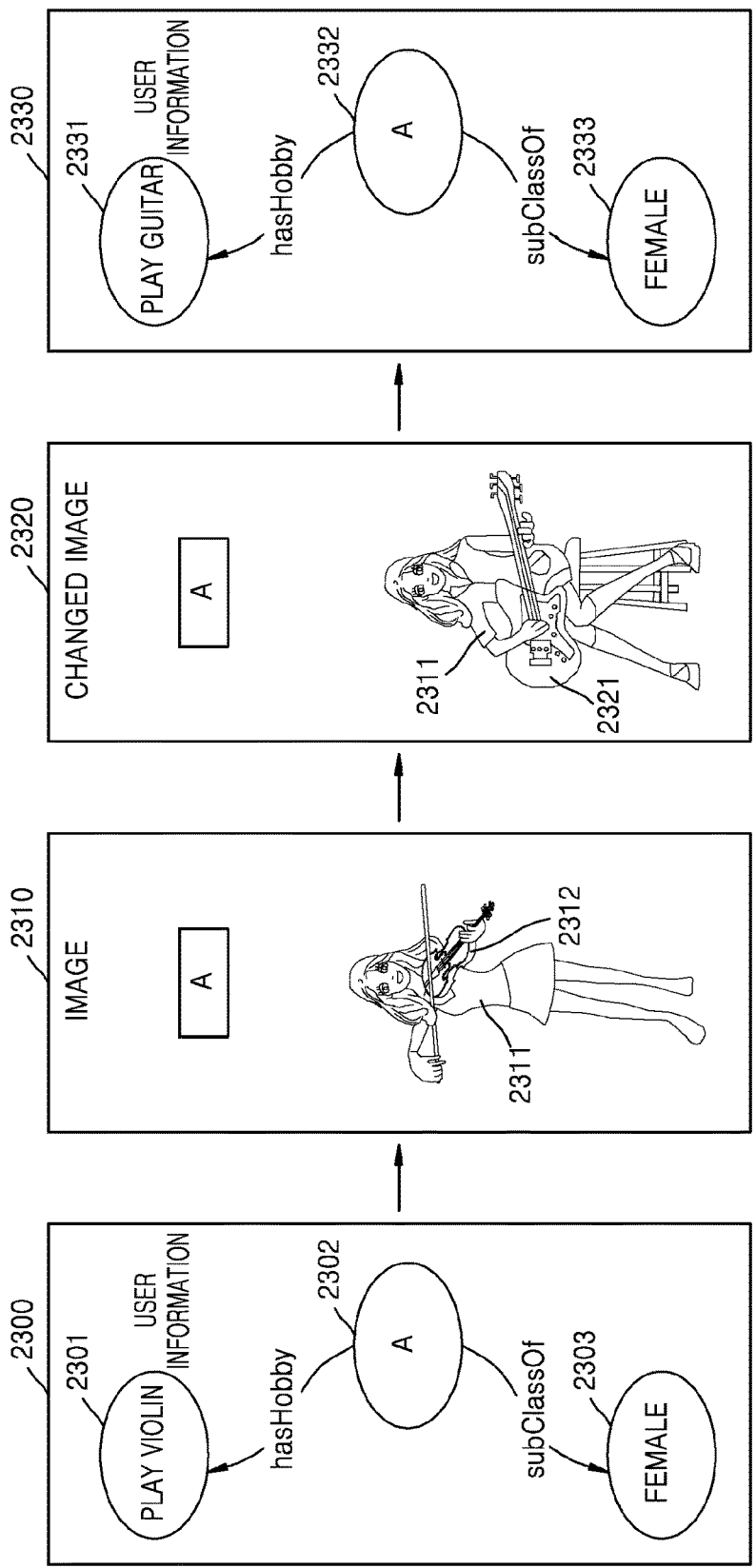
Figure 23B:
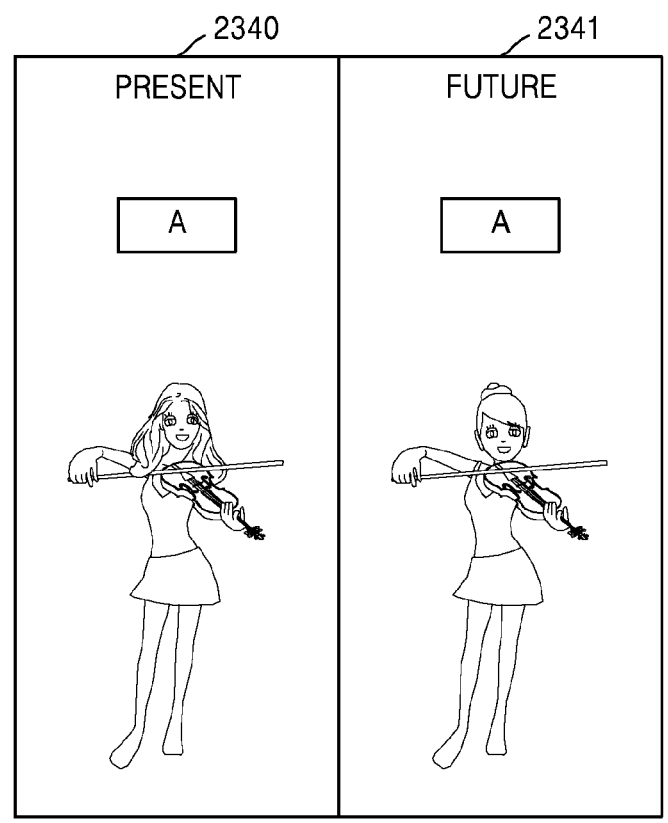

Referring to FIG. 23B, the device 100 displays an avatar-based image 2340 based on current user information (hereinafter, referred to as a current image 2340), and an avatar-based image 2341 based on future user information (hereinafter, referred to as a future image 2341).

The current image 2340 and the future image 2341 have different hair styles. Such different hair styles indicate that hair style information (for example, a hair style of the user is wavy hair) included in the current user information and hair style information (for example, a hair style of the user is short hair) included in the future user information are different.

The hair style information included in the current user information may be based on photo information, but an exemplary embodiment is not limited thereto. For example, the hair style information included in the current user information may be input by the user. The hair style information included in the future user information may be based on beauty parlor appointment information of the user, but an exemplary embodiment is not limited thereto. For example, the hair style information included in the future user information may be input by the user.

The device 100 may display the current image 2340 and the future image 2341 by dividing user information in units of a day, units of several days, units of a week, units of a month, or units of a year.

For example, when the user information is divided in units of a day, the device 100 may generate and display the current image 2340 based on today's user information (for example, today's schedule information of the user), and generate and display the future image 2341 based on tomorrow's user information (for example, tomorrow's schedule information of the user).

For example, when the user information is divided in units of a week, the device 100 may generate and display the current image 2340 based on user information of the past week including that day, and generate and display the future image 2341 based on user information of the next week including the following day.

The current image 2340 and the future image 2341 displayed on the device 100 may be the same. In this case, the current user information and the future user information are the same.

The device 100 may generate the current image 2340 and the future image 2341 in other ways than those described above. For example, the device 100 may generate the current image 2340 in a school uniform and the future image 2341 in a police uniform based on information about a current job (for example, a student) and information about a dream job (for example, a policeman), which are included in the user information.

Alternatively, the device 100 may generate and display the future image 2341 based on a bucket list or a wish list included in the user information. For example, when ten items are included in the bucket list, the device may generate and display ten avatar based images based on the ten items as ten future images. For example, when the ten future images are generated and displayed based on the ten items, the device 100 may divide an area where the future images 2341 are displayed to simultaneously display the ten future images, or may display the ten future images in ten pages, but an exemplary embodiment is not limited thereto.

Figure 23C:
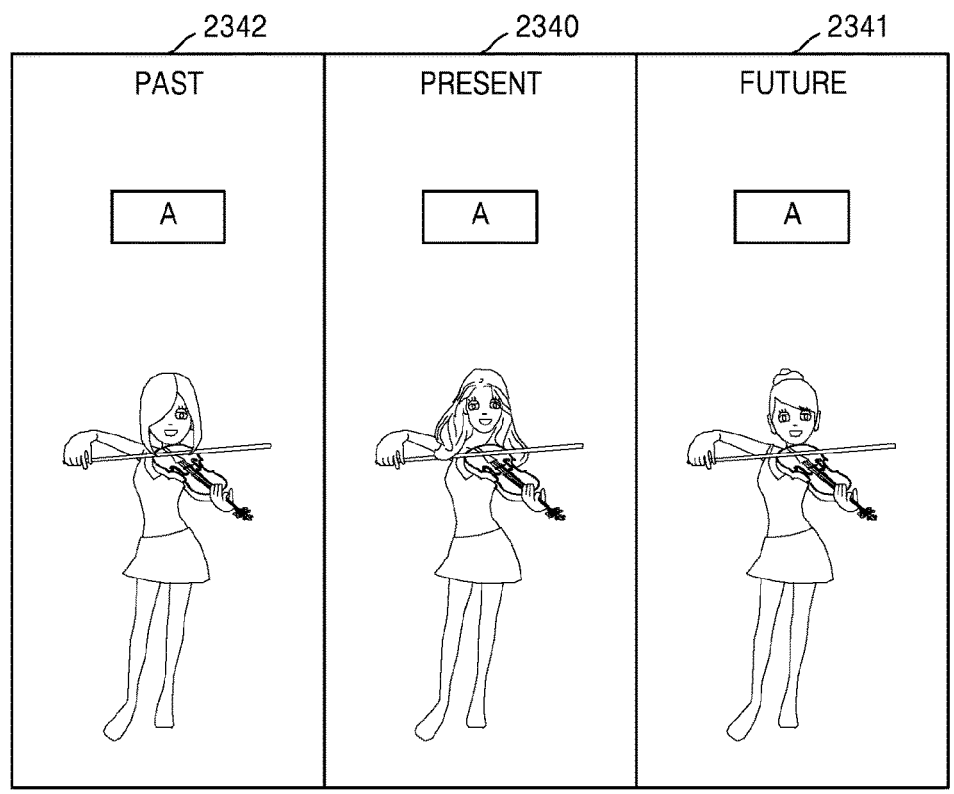

In FIG. 23C, the device 100 according to an exemplary embodiment simultaneously displays an avatar based image 2342 based on past user information (hereinafter, referred to as a past image 2342), the current image 2340, and the future image 2341.

Referring to FIG. 23C, the device 100 simultaneously displays the past image 2342, the current image 2340, and the future image 2341 having different hair styles. Such different hair styles indicate that hair style information included in the past user information, the current user information, and the future user information are different from each other.

As described above with reference to FIG. 23B, the device 100 may simultaneously generate and display the past image 2342, the current image 2340, and the future image 2341 based on user information in units of a day, several days, a week, a month, or a year. For example, the device 100 may generate the current image 2340 based on user information for a past week including user information of current time based on the current time, generate the future image 2341 based on user information for a week after the current time, and generate the past image 2342 based on user information for a past week based on the user information used to provide the current image 2340.

Figure 23D:
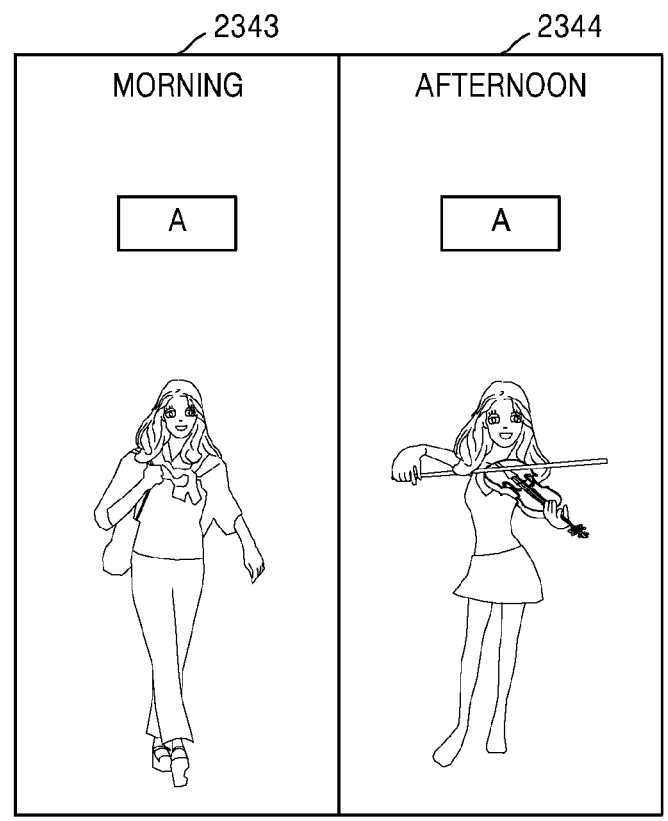

In FIG. 23D, the device 100 according to an exemplary embodiment simultaneously displays an avatar-based image based on morning user information (hereinafter, referred to as a morning image 2343) and an avatar-based image based on afternoon user information (hereinafter, referred to as an afternoon image 2344). The device 100 may generate the morning image 2343 and the afternoon image 2344 based on units of a day, several days, a week, a month, or a year, but the units of generating the morning image 2343 and the afternoon image 2344 are not limited thereto.

Referring to FIG. 23D, the morning image 2343 indicates that the user information includes information "go to work in the morning". The afternoon image 2344 indicates that the user information includes information "have violin lessons after work".

Figure 23E:
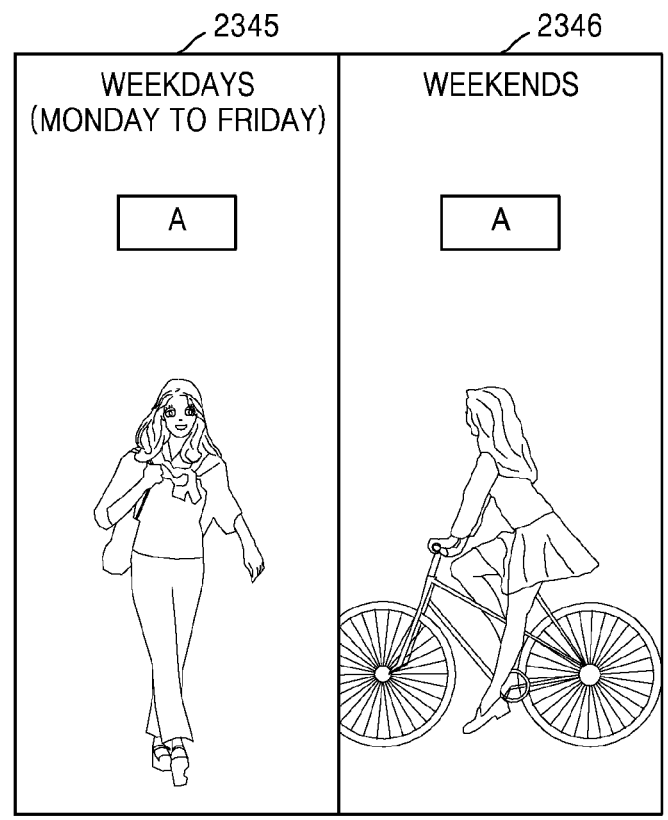

In FIG. 23E, the device 100 according to an exemplary embodiment simultaneously displays an avatar-based image 2345 based on weekday user information (hereinafter, referred to as a weekday image 2345) and an avatar-based image 2346 based on weekend user information (hereinafter, referred to as a weekend image 2346).

Referring to FIG. 23E, the device 100 generates the weekday image 2345 based on user information from Monday to Friday. Also, the device 100 may generate the weekend image 2346 based on user information of Saturday and Sunday. The device 100 may generate the weekday image 2345 and the weekend image 2346 based on units of a week, several weeks, a month, a year, or several years, but the units are not limited thereto.

The weekday image 2345 indicates that the user information includes information "go to work from Monday to Friday". The weekend image 2346 indicates that the user information includes information "cycle on weekends". According to an exemplary embodiment, the weekday image 2345 and the weekend image 2346 displayed on the device 100 are not limited to those shown in FIG. 23E.

In FIG. 23F, the device 100 according to an exemplary embodiment simultaneously displays an avatar-based image 2347 based on user information in spring (hereinafter, referred to as a spring image 2347), an avatar-based image 2348 based on user information in summer (hereinafter, referred to as a summer image 2348), an avatar-based image 2349 based on user information in autumn (hereinafter, referred to as an autumn image 2349), and an avatar-based image 2350 based on user information in winter (hereinafter, referred to as a winter image 2350).

The device 100 may generate the spring image 2347 based on user information, for example, from March to May. The device 100 may generate the summer image 2348 based on user information, for example, from June to August. The device 100 may generate the autumn image 2349 based on user information, for example, from September to November. The device 100 may generate the winter image 2350 based on user information, for example, from December to February.

The spring image 2347 and the autumn image 2349 indicate that the user information includes information "go to work by bicycle". The summer image 2348 and the winter image 2350 indicate that the user information includes information "go to work by car". The device 100 may generate and display the spring image 2347, the summer image 2349, the autumn image 2349, and the winter image 2350, which are different from each other according to the user information.

The device 100 may generate and display the spring image 2347, the summer image 2348, the autumn image 2349, and the winter image 2350 as monthly images or images in units of several months.

The device 100 may generate and display the avatar-based image 2310, the current image 2340, the future image 2341, the past image 2342, the morning image 2343, the afternoon image 2344, the weekday image 2345, the weekend image 2346, the spring image 2347, the summer image 2348, the autumn image 2349, and/or the winter image 2350 of FIGS. 23A through 23F by including various objects thereto according to the user information.

In the one or more exemplary embodiments described above, the device 100 generating and displaying an avatar-based image means that the device 100 provides the avatar-based image.

Hereinafter, for convenience of description, it is assumed that an avatar-based image displayed on the device 100 is the avatar-based image 2310 of FIG. 23A. However, an avatar-based image according to an exemplary embodiment is not limited thereto. For example, the avatar-based image 2310 displayed on the device 100 may be any one of the current image 2340, the future image 2341, the past image 2342, the morning image 2343, the afternoon image 2344, the weekday image 2345, the weekend image 2346, the spring image 2347, the summer image 2348, the autumn image 2349, and/or the winter image 2350 of FIGS. 23A through 23F according to the user information. Also, the avatar-based image 2310 displayed on the device 100 may be an image obtained by adding at least one object to one of the current image 2340, the future image 2341, the past image 2342, the morning image 2343, the afternoon image 2344, the weekday image 2345, the weekend image 2346, the spring image 2347, the summer image 2348, the autumn image 2349, and the winter image 2350 of FIGS. 23A through 23F according to the user information.

The device 100 may represent the avatar-based image 2310 in at least one of a static image and a dynamic image. For example, the device 100 may represent the avatar-based image 2310 in a dynamic image and after a first time, represent the avatar-based image 2310 in a static image. Alternatively, the device 100 may represent the avatar-based image 2310 in a static image and after a second time, represent the avatar-based image 2310 in a dynamic image. The first or second times may be pre-set. The first and second times may be the same or different from each other.

Referring to FIG. 23A, the user information 2300 includes hobby information 2301 of the user, name 2302 of the user, and gender information 2303 of the user. According to an exemplary embodiment, the user information 2300 is not limited to that shown in FIG. 23A.

For example, the user information 2300 may further include at least one piece of the user information described above. The user information 2300 may include fewer information than those shown in FIG. 23A. For example, the user information 2300 may include the hobby information 2301 of the user and the name 2302 of the user.

In order to generate the avatar-based image 2310, the device 100 may generate user modeling information regarding the user information 2300. The user modeling information may be referred to as a user modeling information table.

The device 100 may generate the user modeling information regarding the user information 2300 based on ontology. A method of generating the user modeling information regarding the user information 2300 is not limited to ontology.

FIG. 24A illustrates an example of the user modeling information 2400 regarding the user information 2300, according to an exemplary embodiment, which is based on ontology. The ontology has been described above with reference to FIG. 3

Referring to FIG. 24A, the user modeling information 2400 includes a subject field 2401, a predicate field 2402, and an object field 2403.

The subject field 2401 of FIG. 24A is a field related to a subject of the user information 2300. Referring to FIG. 24A, the subject of the user information 2300 is the first user User_1. In FIG. 24A, a class 2402 and a resource 2405 are used to indicate that the first user User_1 is a person. The resource 2405 defines an instance of the class 2404.

The predicate field 2402 of FIG. 24A is a field indicating a formal language of a relationship between words included in the subject field 2401 and the object field 2403. Accordingly, the predicate field 2402 of FIG. 24A includes a formal language (Name) about a name, a formal language (Gender) about a gender, and a formal language (hasHobby) about a hobby.

According to the formal language about a name, "A" included in the object field 2403 may be represented as a name of the first user User_1. According to the formal language about a gender, "FEMALE" included in the object field 2403 may be represented as a gender of the first user User_1. According to the formal language about a hobby, "Violin" included in the object field 2403 may be represented as a hobby of the first user User_1. Information included in the object field 2403 of FIG. 24A is user information of the first user User_1 corresponding to the formal languages included in the predicate field 2402.

The user modeling information 2400 of FIG. 24A is generated in a RDF language. However, the device 100 may generate ontology-based user modeling information regarding the user information 2300 by using a language, such as OWL or SWRL.

Figure 24B:
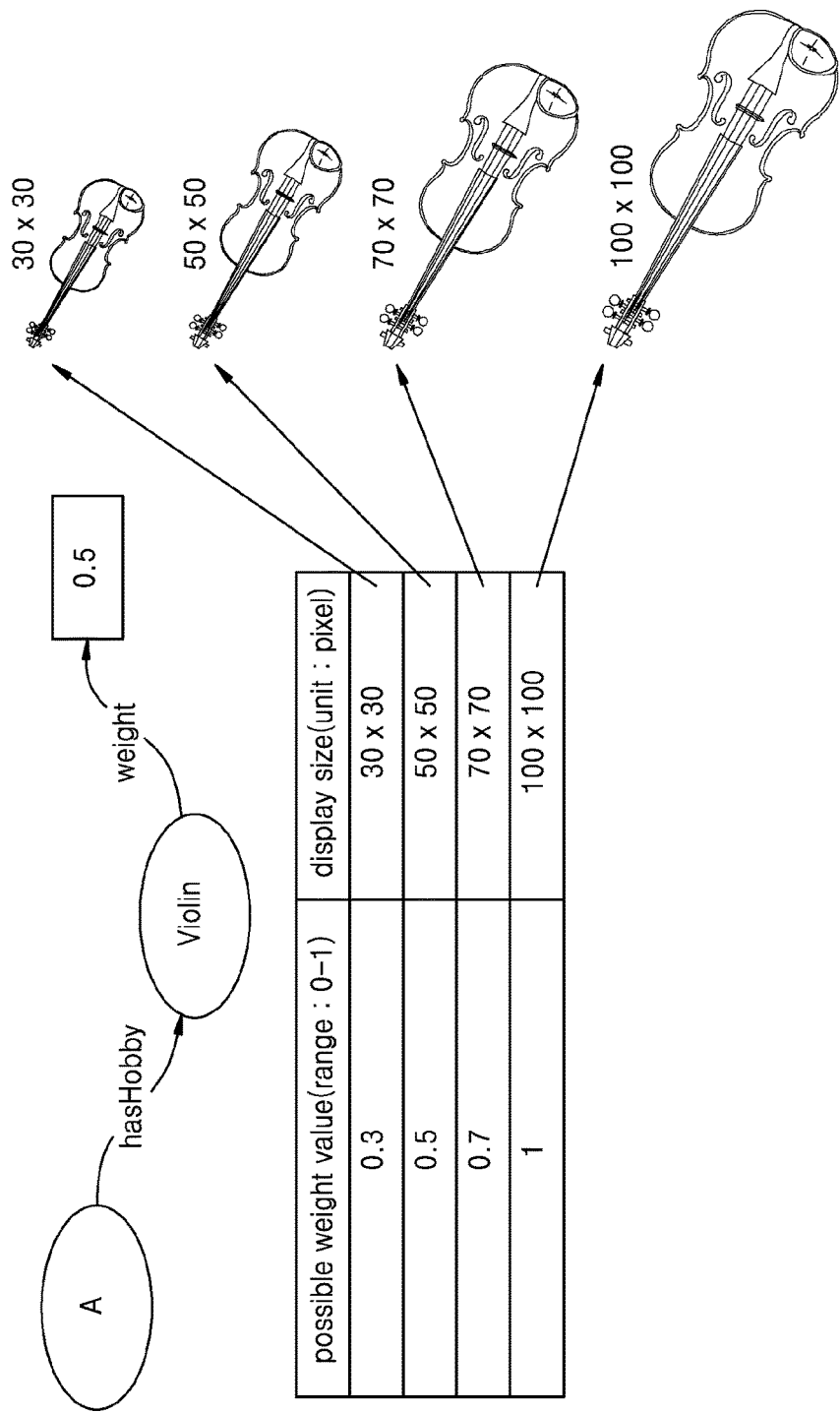
FIG. 24B illustrates an example of display sizes of an object included in an avatar-based image displayed on a device, according to an exemplary embodiment.

FIG. 24B illustrates an example of display sizes of an object included in the avatar-based image 2310 displayed on the device 100, according to an exemplary embodiment. The example of FIG. 24B is about a violin included in the user modeling information 2400 of FIG. 24A.

Referring to FIG. 24B, the device 100 may determine a display size of an object according to a possible weight value assigned to the object. As shown in FIG. 24B, the device 100 may determine a display size of a violin to be included in the avatar-based image 2310 according to a possible weight value assigned to a violin included in the object field 2403. The possible weight value may be determined according to user information. The display size according to the possible weight value may be pre-set.

Referring to FIG. 24B, a range of the possible weight value is from 0 to 1. An interest level of a user regarding a violin is low when the possible weight value is 0.3 compared to when the possible weight value is 1. For example, when it is determined that a hobby of the user is playing a violin and the user plays a violin every other day for one hour based on user information of the device 100, the device 100 may set the possible weight value of the violin to 0.5. Alternatively, when it is determined that the hobby of the user is playing a violin and the user plays a violin every day for one hour based on the user information of the device 100, the device 100 may set the possible weight value of the violin to 1.

When the possible weight value of the violin is 0.5, the device 100 determines the display size of the violin to be 50×50 pixels. Accordingly, the device 100 may generate the avatar-based image 2310 including an image of the violin in 50×50 pixels.

Alternatively, when the possible weight value of the violin is 1, the device 100 determines the display size of the violin to be 100×100 pixels. Accordingly, the device 100 may generate the avatar-based image 2310 including an image of the violin in 100×100 pixels.

FIG. 24C is a diagram for describing a display size of an object included in the avatar-based image 2310, according to an exemplary embodiment. The example of FIG. 24C is about a female included in the user modeling information 2400 of FIG. 24A.

Referring to FIG. 24C, the device 100 may determine a display size of a female avatar 2311 of FIG. 23A to be included in the avatar-based image 2310 according to a weight and a height. The weight and the height are those of a female included in the object field 2403 of the user modeling information 2400. The weight and height are included in the user information. The device 100 may select one of a plurality of display sizes that are pre-set.

Referring to FIG. 24C, the device 100 set a baseline of the weight to 50 kg and a baseline of a height to 170 cm. However, the baselines according to an exemplary embodiment are not limited thereto. When a weight of the user included in the user information satisfies a "(height−100)× 0.9+5>weight" condition, the device 100 may display the female avatar 2311 included in the avatar-based image 2310 in a fat image.

Alternatively, when the weight of the user satisfies a "(height−100)×0.9<weight" condition, the device 100 may display the female avatar 2311 included in the avatar-based image 2310 in a thin image. When the weight of the user satisfies an "else" condition, the device 100 may display the female avatar 2311 included in the avatar-based image 2310 in a normal image.

FIG. 25 illustrates an example of mapping information 2500 between an object image and object ID information, according to an exemplary embodiment. Referring to FIG. 25, the device 100 may generate the avatar-based image 2310 by using mapping information 2500 and the user modeling information 2400 of FIG. 24A. A display size of the object image of FIG. 25 may be adjusted or changed based on information included in user information as described above with reference to FIGS. 24B and 24C.

The mapping information 2500 may be configured by considering all or some of the user information described above. The mapping information 2500 may be referred to as a mapping information table.

According to an exemplary embodiment, the mapping information 2500 may be set differently from that shown in FIG. 25. For example, the mapping information 2500 may be configured to provide an object image in a still image as shown in FIG. 25, or to provide an object image in a moving image. The mapping information 2500 may be stored in the device 100 or in the external device 2120.

An image corresponding to a violin or a guitar may include a standard image of playing a violin or a guitar. The standard image may also be provided in a still image or a moving image. The standard image may include a musical instrument and an avatar image playing the musical instrument.

When the standard image is stored in the mapping information 2500, the device 100 may change the avatar playing the musical instrument to an avatar of the user. The device 100 may change the avatar playing the musical instrument to the avatar of the user by mapping location information of feature points for displaying the avatar playing the musical instrument and location information of feature points for displaying the avatar of the user. Location information of feature points may be represented in (x,y) coordinate values when an avatar is a 2D image. Location information of feature points may be represented in (x,y,z) coordinate values when an avatar is a 3D image.

Figure 26:
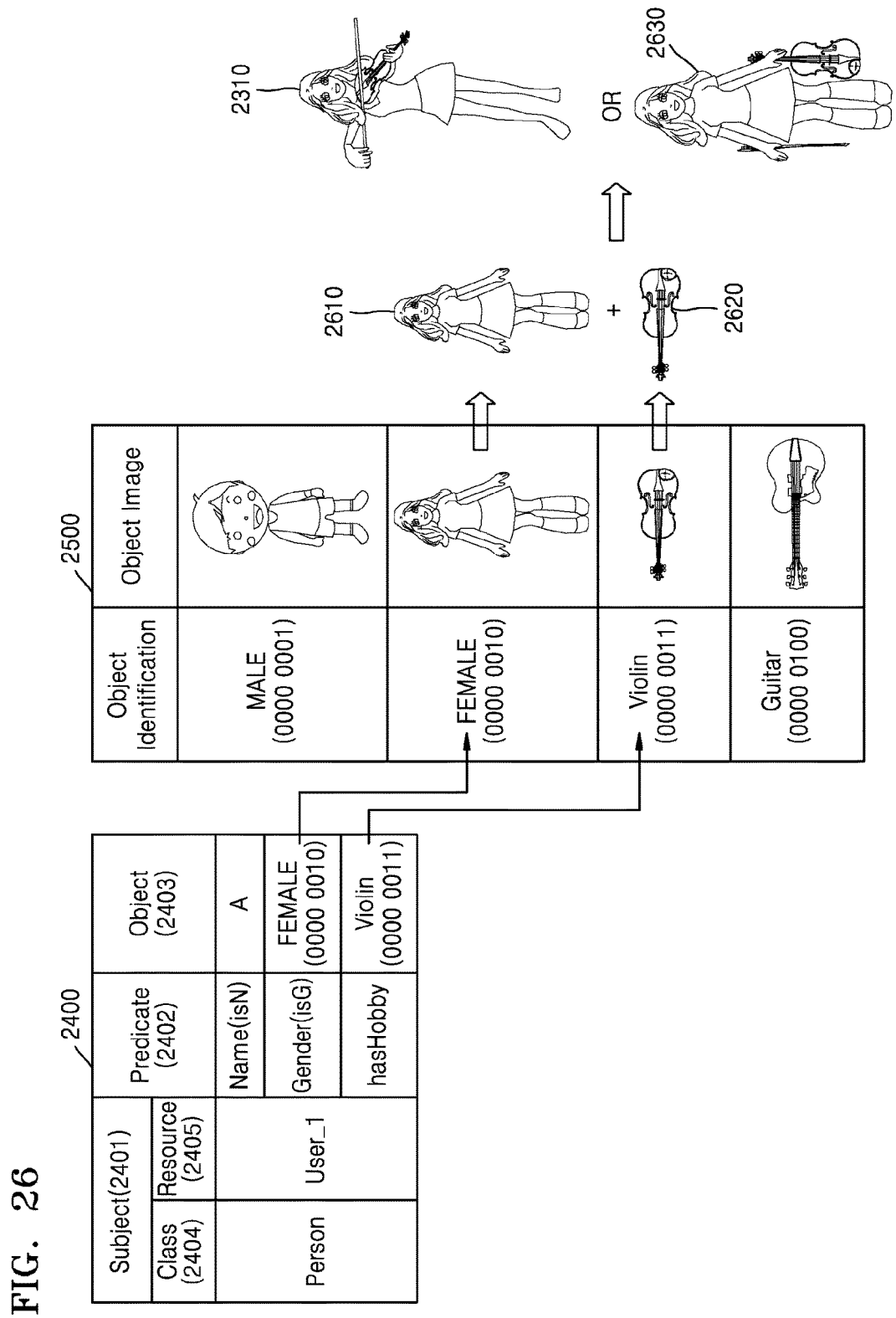
FIG. 26 is a diagram for describing processes of generating an avatar-based image by using user modeling information and mapping information, according to an exemplary embodiment.

FIG. 26 is a diagram for describing processes of generating the avatar-based image 2310 by using the user modeling information 2400 and the mapping information 2500, according to an exemplary embodiment.

Referring to FIG. 26, the device 100 detects information (A, a female, and a violin) included in the object field 2403 of the user modeling information 2400. The device 100 detects object images 2610 and 2620 from the mapping information 2500 by using object ID information (for example, "0000 0010" for the female and "0000 0011" for the violin) assigned to the detected information. The device 100 combines the object images 2610 and 2620.

While combining the object images 2610 and 2620, the device 100 may use coordinate values (2D coordinate values or 3D coordinate values) used to render the object images 2610 and 2620 and pre-set combining condition information.

Coordinate values of object images may be configured in a coordinate value table such that a coordinate value may be detected by using object ID information included in the mapping information 2500. For example, the device 100 may detect a coordinate value used to render the object image 2610 from the coordinate value table by using "0000 0010". The coordinate value table may include location information of feature points for displaying each object image. The coordinate value table may be stored in the device 100 and/or the external device 2120.

The coordinate value table may be a skeleton data table of an object image. For example, when an object image is an avatar, such as the object image 2610, the skeleton data table shows an outline of the avatar. For example, the skeleton data table of the avatar may include information about a face, a head, a neck, a shoulder, a chest, a waist, a hip, a length of an arm, a thickness of an arm, a length of a leg, a thickness of a leg, a right hand and/or a left hand, but is not limited thereto.

For example, when an object image is a violin, such as the object image 2620, the skeleton data table shows an outline of the violin. For example, the skeleton data table of the violin may include information about a scroll, a peg, a peg box, a nut, a neck, a fingerboard, a string, a soundboard, a purfling, a side plate, a waist, a bridge, an f-hole, a tail-piece, a chin rest, and/or a button, but is not limited thereto.

Combining condition information may include location information of object images to be combined. The combining condition information may be configured in a combining condition information table such that the combining condition information is detected by using object ID information of object images to be combined. For example, when the object images 2610 and 2620 are combined as shown in FIG. 26, the device 100 may detect combining condition information between the object images 2610 and 2620 from the combining condition information table by using the object ID information of the object images 2610 and 2620, i.e., "0000 0010" and "0000 0011".

When the combining condition information includes, for example, location information indicating "the object image 2610 holds a bow with a right hand and holds a neck of a violin with a left hand", the device 100 may provide an image 2630 by combining the object image 2610 and the object image 2620. Location information indicates location information of feature points for displaying each object. The combining condition information table may be pre-stored in the device 100 and/or the external device 2120.

In order to generate the avatar-based image 2310, the combining condition information may include location information indicating "hold a bow with a right hand, put a chin on a chin rest, and hold a neck of a violin with a left hand". When the object image 2620 of a violin is a standard image of playing a violin, the device 100 may change coordinate values (or location information of feature points) used to render a violinist playing a violin to coordinate values of the object image 2610.

Referring back to FIG. 22, in operation S2002, the device 100 changes the avatar-based image 2310 according to a user input. The user input may be a user input indicating a change request with respect to the avatar-based image 2310, a user input indicating object selection, or a user input indicating change completion, but is not limited thereto. The user input indicating the change request may be a user input indicating an edit request. The user input indicating the change completion may be a user input indicating edit completion.

The user input may be based on at least one of touch, touch and drag, a gesture, multi-modal, and voice. The user input may be received from the external device 2120.

When the user input indicating the change request is received while the avatar-based image 2310 is displayed, the device 100 may display a changeable object.

FIGS. 27A through 27F illustrate examples of the device 100 displaying a changeable object, according to exemplary embodiments.

Figure 27A:
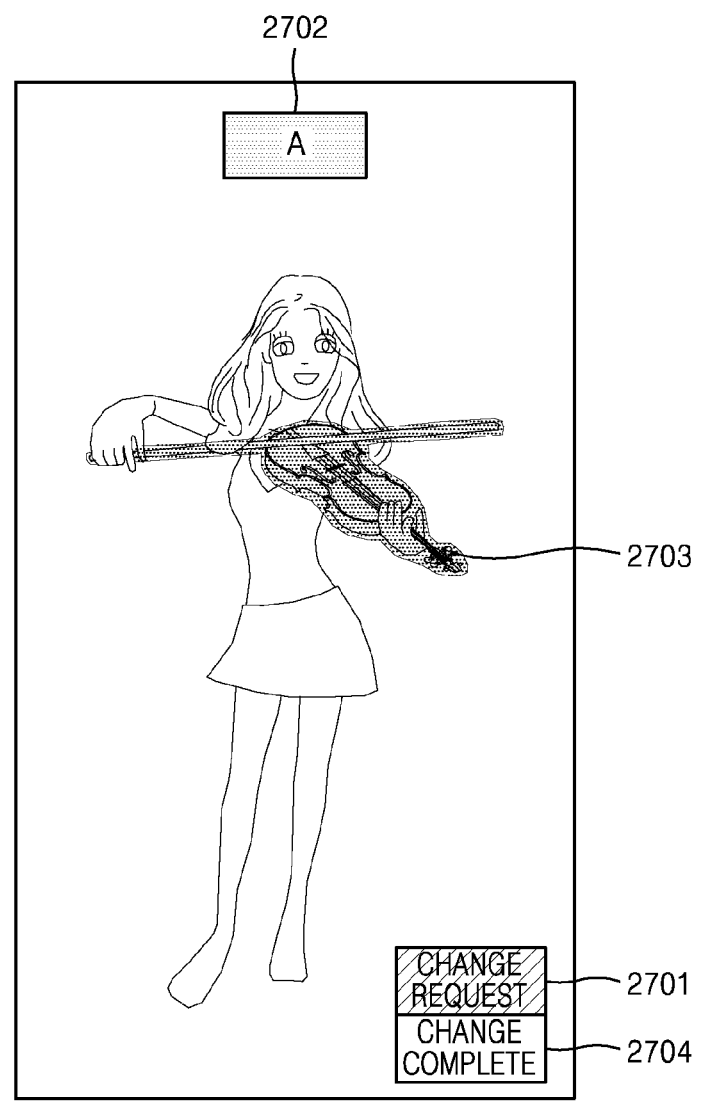
FIGS. 27A through 27F illustrate examples of a device displaying a changeable object, according to exemplary embodiments.

Referring to FIG. 27A, when a user input selecting a change request button 2701 is received, the device 100 highlights a name 2702 of a user and a violin 2703. Accordingly, the user recognizes that the name 2702 and the violin 2703 are changeable objects.

Figure 27B:
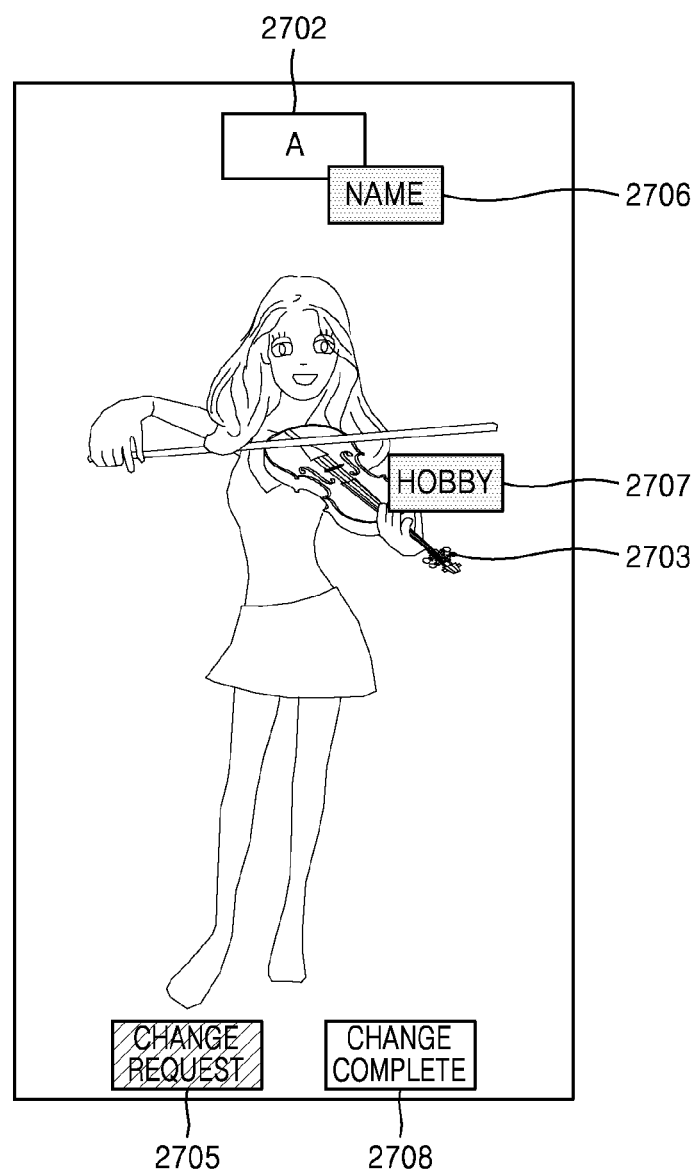

In FIG. 27B, when a user input selecting a change request button 2705 is received, the device 100 may overlap and display a message 2706 indicating a name in a partial region of the name 2702 of the user. Also, the device 100 overlaps and displays a message 2707 indicating a hobby in a partial region of the violin 2703. The message 2707 may include information related to the violin 2703, for example, playing a violin. Accordingly, the user recognizes that the name 2702 and the violin 2703 are changeable objects, or that the message 2706 indicating the name and the message 2707 indicating a hobby are changeable objects.

Figure 27C:
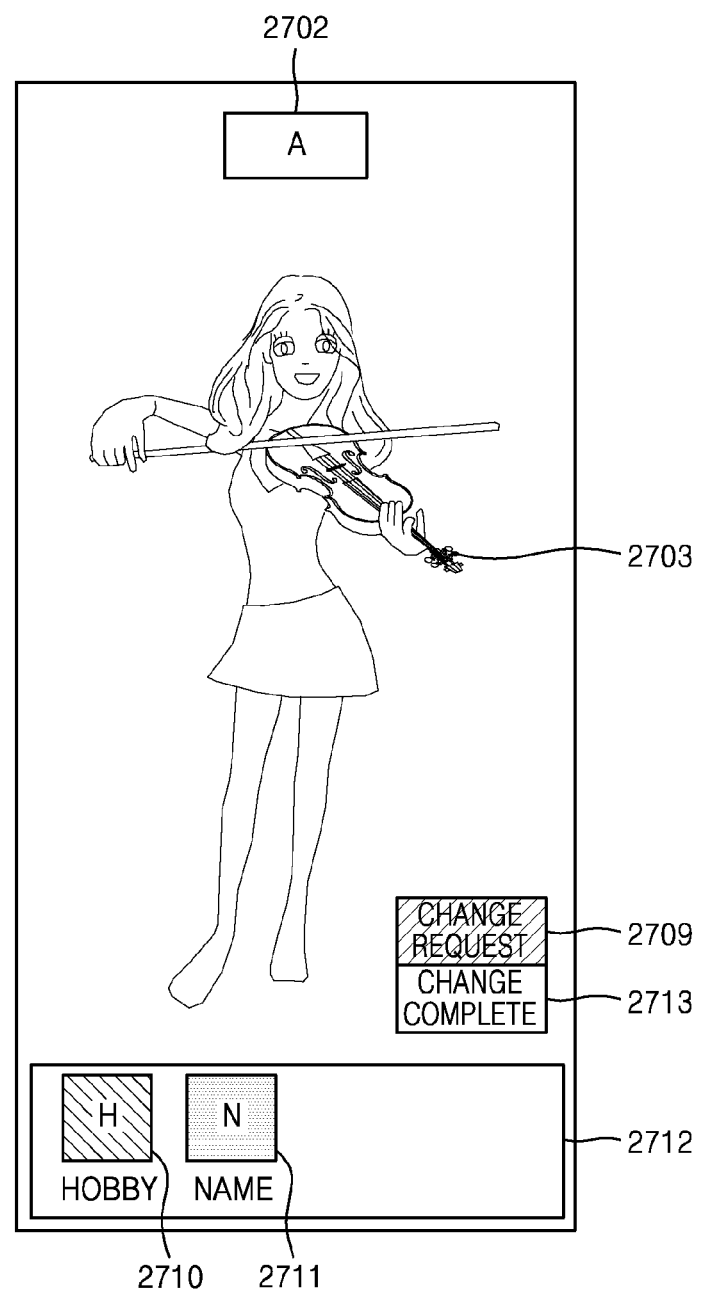

Referring to FIG. 27C, the device 100 may display, together with the avatar-based image 2310, a tray 2712 including icons 2710 and 2711 regarding changeable objects.

In FIG. 27C, when a user input selecting a change request button 2709 is received, the device 100 provides the tray 2712 including the icon 2710 regarding a hobby and the icon 2711 regarding a name. The icon 2710 may include information related to the violin 2703. Accordingly, the user may recognize that the name 2702 and the violin 2703 or the name 2702 and a hobby item are changeable objects. The tray 2712 may further include ID information (hobby and name) of the icons 2710 and 2711.

Referring to FIG. 27C, the device 100 displays the tray 2712 on the bottom of a screen. Alternatively, the tray 2712 may be displayed on at least one of the left, the right, the top, or the bottom of the screen. When the number of icons of changeable objects is greater than the number of icons of objects simultaneously displayable on the tray 2712, the device 100 may display icons of selectable objects while allowing the icons displayed through the tray 2712 to be moved according to a scroll input based on the tray 2712. The scroll input based on the tray 2712 may include a scroll input based on a region of the tray 2712.

When the number of icons of changeable objects is greater than the number of icons of objects simultaneously displayable on the tray 2712, the device 100 may provide a plurality of trays classified according to pre-set categories.

When the device 100 provides the plurality of trays, the device 100 may arrange one of the plurality of trays on at least one of the left, the right, the top, or the bottom of the screen, or arrange the plurality of trays in a hierarchical structure on at least one of the left, the right, the top, or the bottom of the screen. A category may be set according to a type of a changeable object, but is not limited thereto.

In FIG. 27C, when an icon of an object included in the tray 2712 is selected, the device 100 may highlight the object of the selected icon.

Figure 27D:
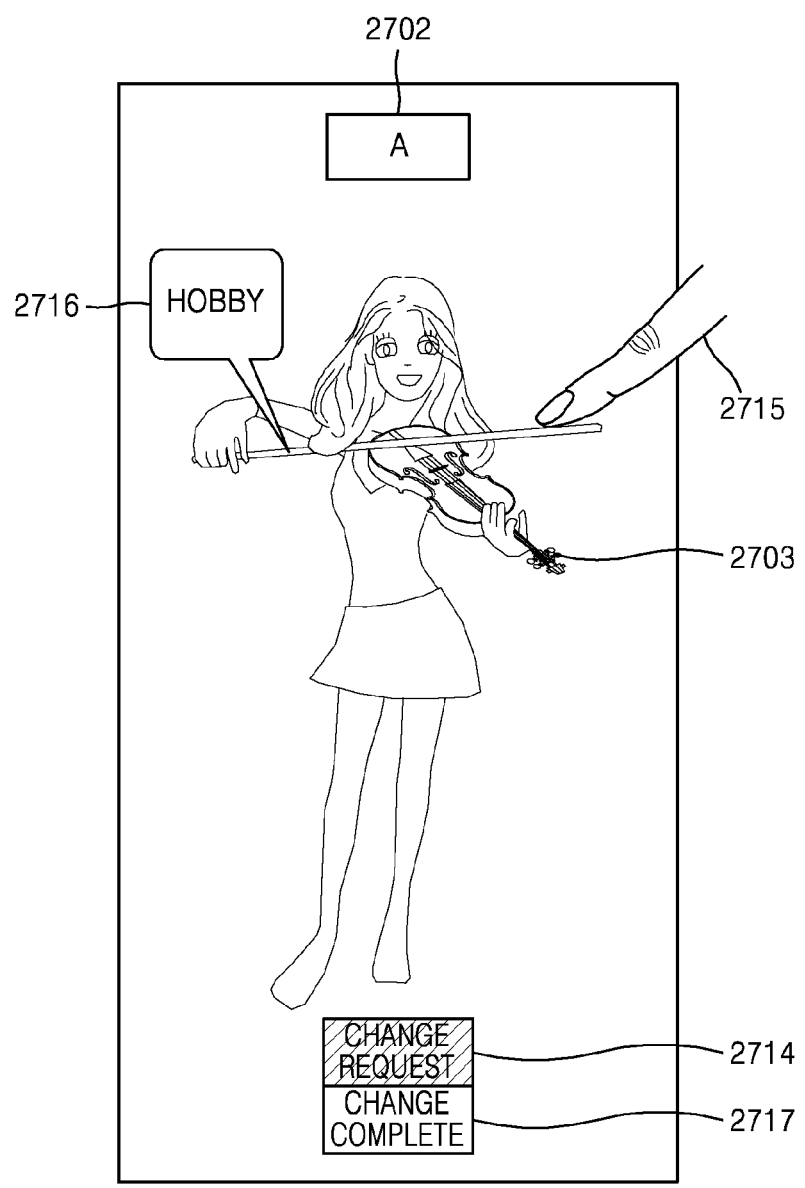

In FIG. 27D, the device 100 according to an exemplary embodiment provides information about a changeable object through a speech bubble according to a touch-based input.

In FIG. 27D, when a user input selecting a change request button 2714 is received, the device 100 may activate a changeable image from among displayed images.

When a touch-based input 2715 indicating selection on the changeable object (for example, the violin 2703) from among the displayed images is received, the device 100 displays a speech bubble 2716 including changeable information (for example, a hobby) regarding the changeable object (the violin 2703). The device 100 may display the speech bubble 2716 near the violin 2703 to indicate that the speech bubble 2716 is related to the violin 2703. Accordingly, the user may recognize that the violin 2703 is the changeable object and user information about the hobby is changeable.

Figure 27E:
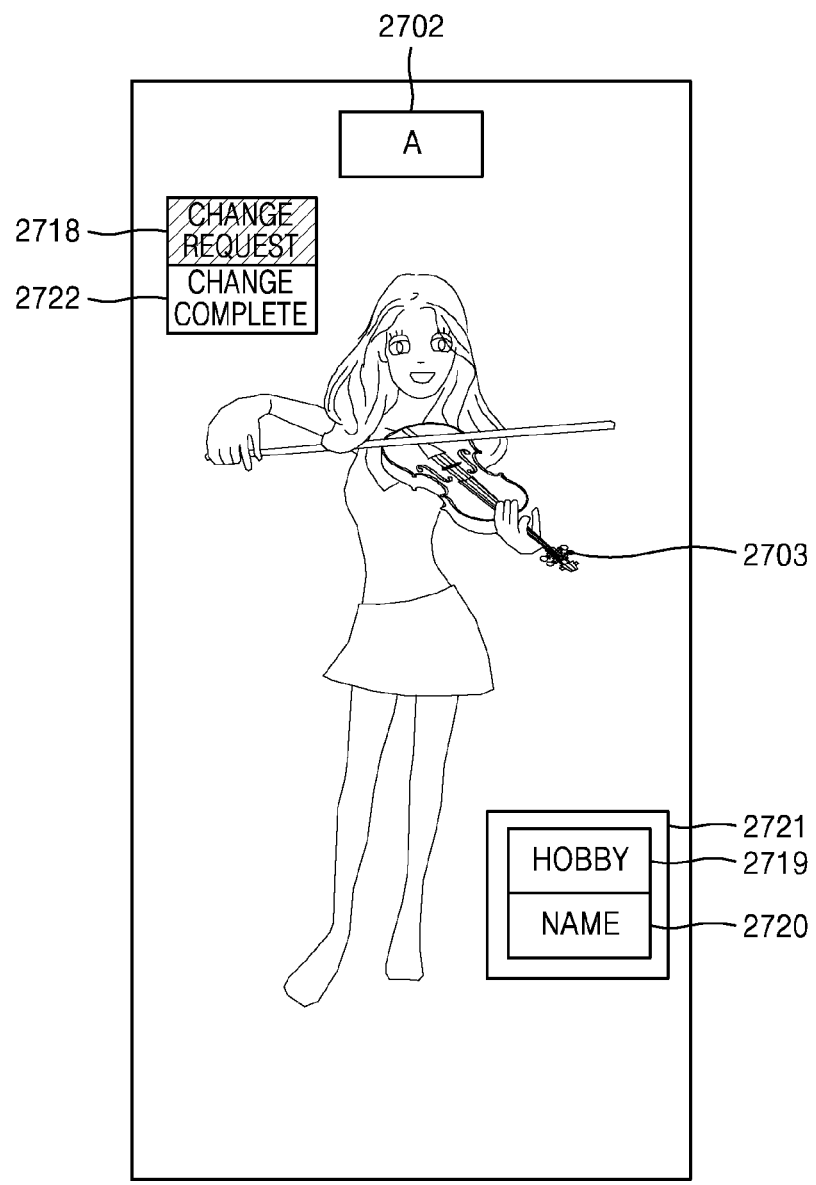

Referring to FIG. 27E, the device 100 provides the changeable object in a form of a popup window 2721. In FIG. 27E, when a user input indicating selection on a change request button 2718 is received, the device 100 displays the popup window 2721 including information 2719 and 2720 about changeable objects. The popup window 2721 may include information about at least one object.

Accordingly, the user recognizes the information 2719 and 2720 about the changeable objects. When information about one object included in the popup window 2721 is selected, the device 100 may highlight the object corresponding to the selected information.

Figure 27F:
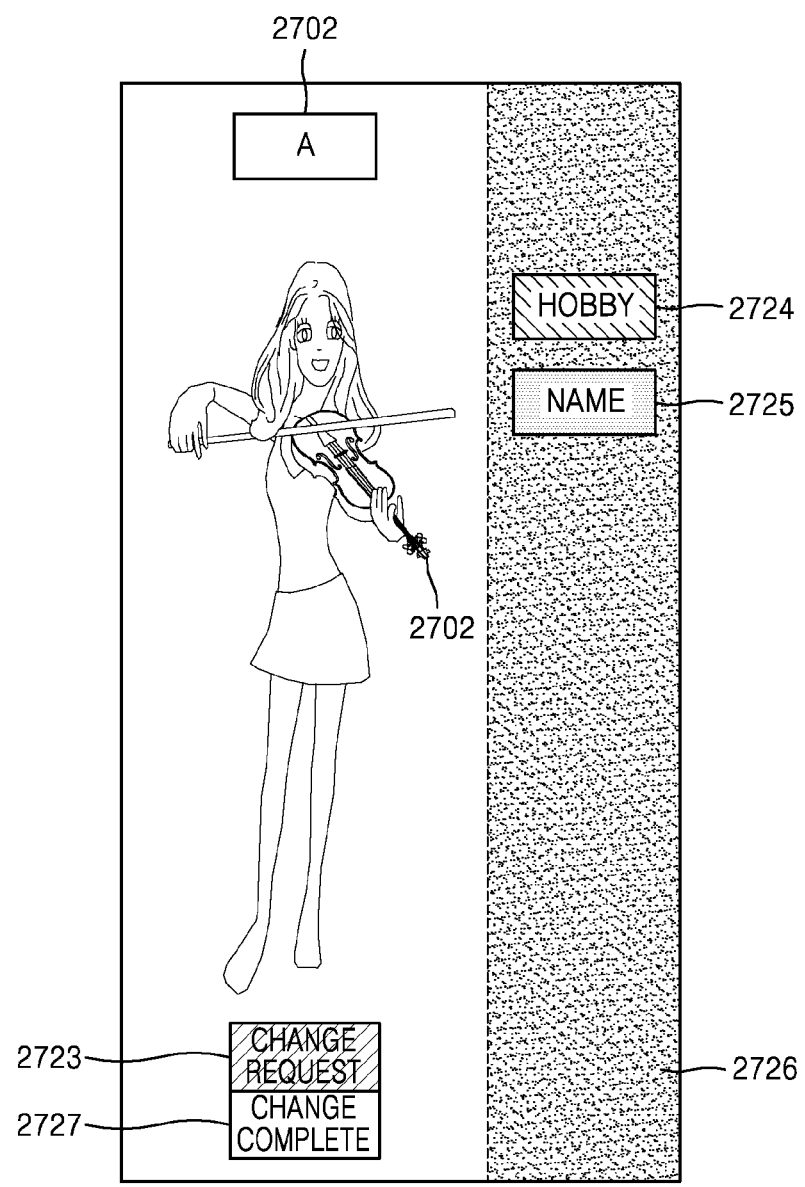

Referring to FIG. 27F, the device 100 may display a changeable object by using an independent page. In FIG. 27F, when a user input selecting a change request button 2723 is received, the device 100 opens a page 2726 including information 2724 and 2725 about changeable objects. Accordingly, the user recognizes the changeable objects. The device 100 may display information about at least one changeable object through the page 2726.

When a changeable object is selected in FIG. 27E or 27F, the device 100 may highlight the selected changeable object.

In FIGS. 27A through 27F, the user input indicating the selection on the change request button 2701, 2705, 2709, 2714, 2718, or 2723 are received, but the user input indicating the change request are not limited thereto according to an exemplary embodiment. For example, the device 100 may receive the user input by using another button or based on a user gesture.

Figure 28:
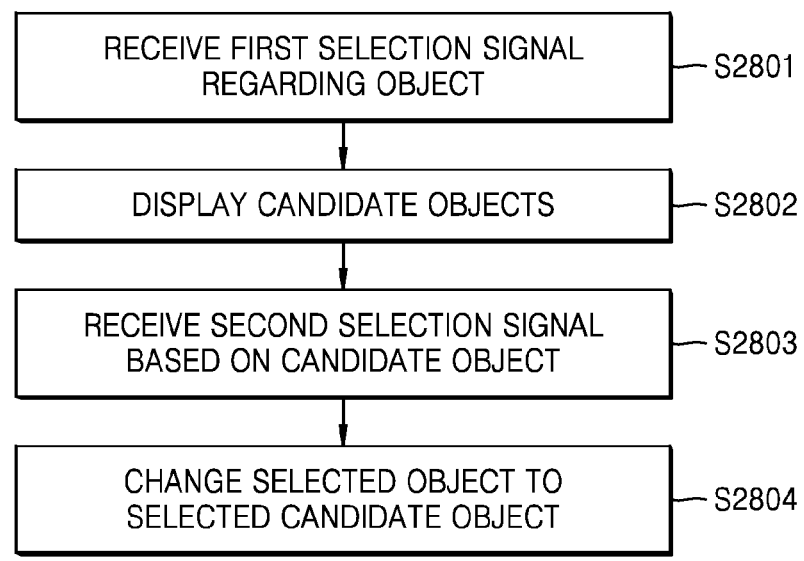
FIG. 28 is a flowchart of a method of changing, by a device, an avatar-based image according to a user input, according to an exemplary embodiment.

FIG. 28 is a flowchart of a method of changing, by the device 100, the avatar-based image 2310 according to a user input, according to an exemplary embodiment.

Referring to FIG. 28, in operation S2801, the device 100 receives a first selection signal regarding one object from among changeable objects. In operation S2802, the device 100 displays candidate objects of the selected object.

FIGS. 29A through 29F illustrate examples of changing an object based on candidate objects provided by the device 100, according to exemplary embodiments.

When the device 100 receives the touch-based input 2715 as the first selection signal indicating selection on the violin 2703 as shown in a screen 2920 while highlighting a changeable object as shown in a screen 2910 of FIG. 29A, the device 100 displays candidate objects related to the violin 2703.

Referring to the screen 2920 of FIG. 29A, the device 100 provides a guitar item 2912, a baseball item 2913, and a badminton item 2914 as the candidate objects related to the violin 2703, but the candidate objects according to an exemplary embodiment are not limited thereto.

Referring to the screen 2920 of FIG. 29A, the device 100 displays information about candidate objects in a form of a popup window 2921. Referring to the screen 2920 of FIG. 29A, the device 100 provides the information about the candidate objects in text.

However, a method of providing the information about the candidate object, according to an exemplary embodiment is not limited thereto. For example, as shown in a screen 2930 of FIG. 29B, the device 100 may provide the information about the candidate objects in a form of a rectangular popup window 2931. The rectangular popup window 2931 arranges images respectively corresponding to the candidate objects horizontally. The rectangular popup window 2931 may provide the information about the candidate objects in symbols, icons, or representative images, but the information about the candidate objects is not limited thereto.

Figure 29B:
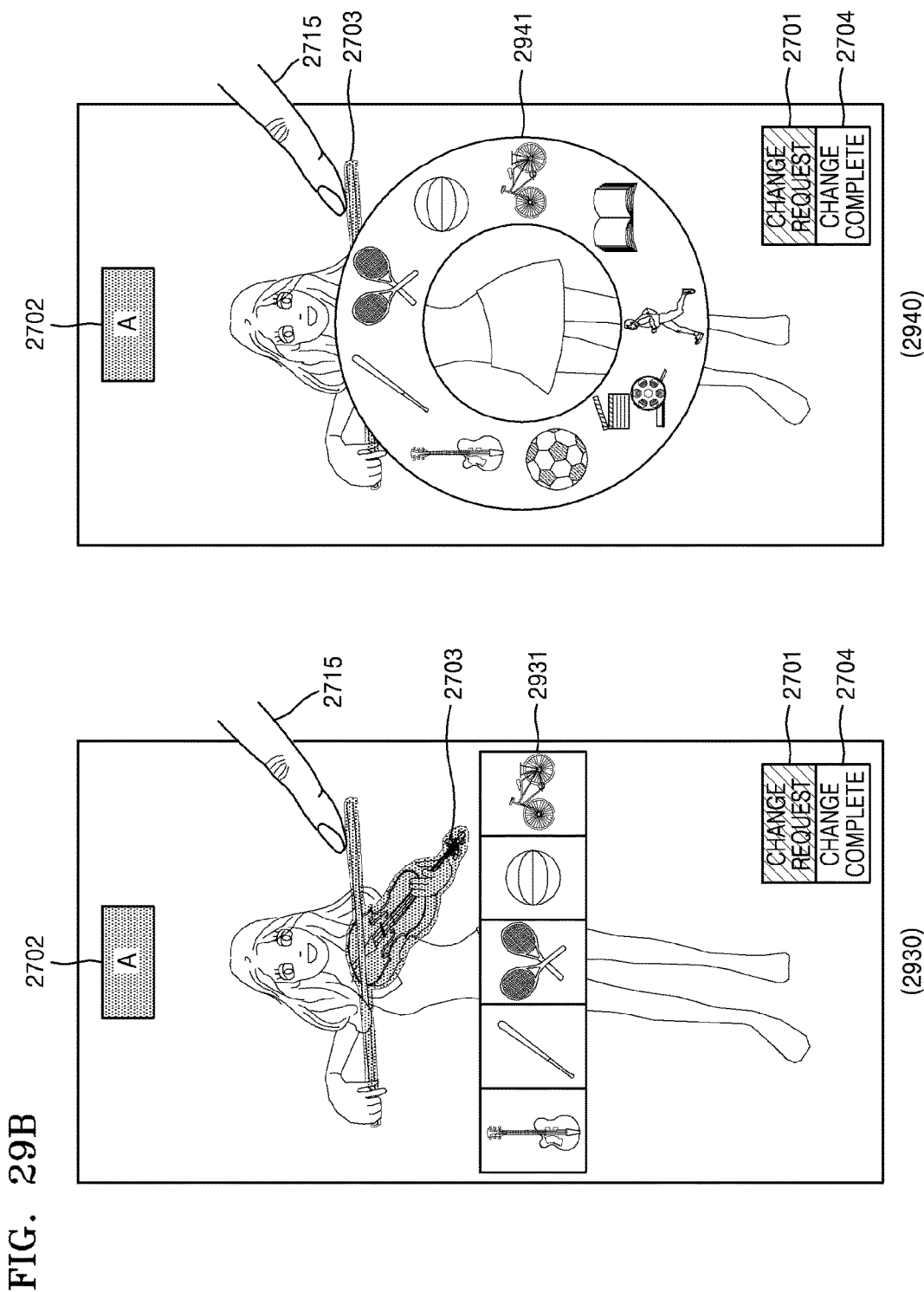

As shown in a screen 2940 of FIG. 29B, the device 100 may provide the information about the candidate objects in a form of a ring type popup window 2941. The ring type popup window 2941 may include the information about the candidate objects in symbols or text.

When the number of candidate objects is higher than the number of objects simultaneously displayable on the popup window 2921, 2931, or 2941, the device 100 may provide the information about the candidate objects while moving the information about the candidate objects displayed on the popup window 2921, 2931, or 2941 according to a scroll input based on the popup window 291, 2931 or 2941. The device 100 may move the information about the candidate objects according to a pre-set arrangement order.

When the number of candidate objects is higher than the number of objects simultaneously displayable on the popup window 2921, 2931, or 2941, the device 100 may provide the information about the candidate objects by expanding a display area of the popup windows 2921, 2931, or 2941 according to an input (for example, touch and drag) based on the popup window 2921, 2931, or 2941.

Figure 29C:
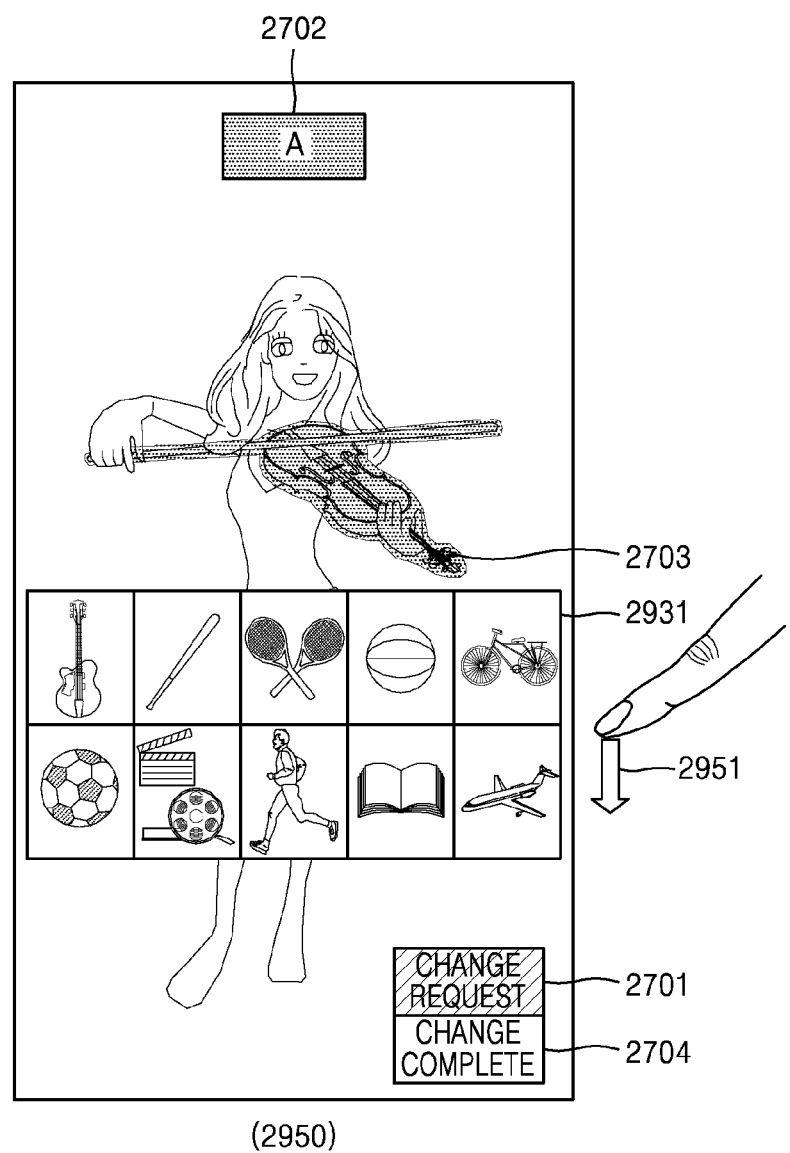
Figure 29D:
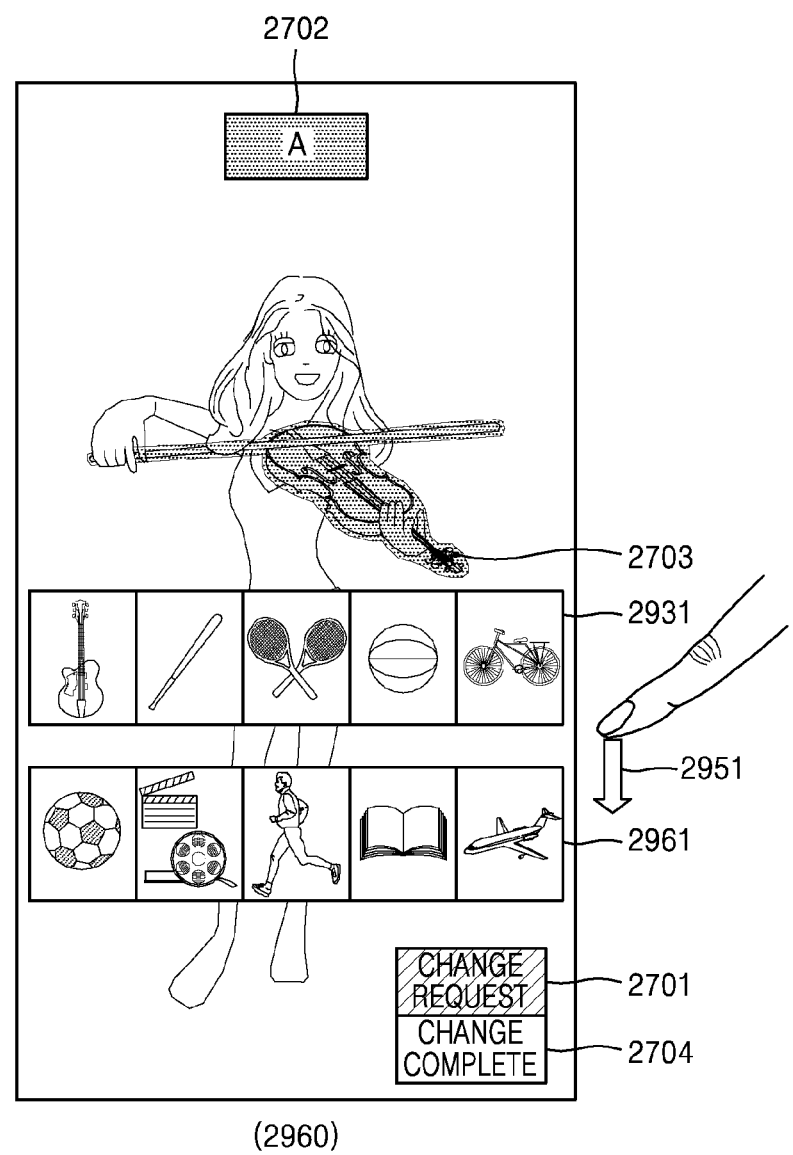

For example, when the user executes a touch and drag input on screen 2930 shown in FIG. 29B, the screen 2950 of FIG. 29C is displayed. That is, when the user executes the touch and drag input on screen 2930, the device 100 may provide the information about the candidate objects by expanding the rectangular popup window 2931 according to a touch and drag input 2951. Alternatively, as shown in a screen 2960 of FIG. 29D, the device 100 may further provide a popup window 2961 separately from the rectangular popup window 2931 according to the touch and drag input 2951.

Returning to FIG. 28, in operation S2803 of FIG. 28, the device 100 receives a second selection signal based on information about the candidate objects. In operation S2804, the device 100 changes a selected object to the candidate object selected according to the second selection signal.

When the second selection signal of selecting the baseball item 2913 is received in a screen 2970 of FIG. 29E, the device 100 changes an avatar-based image of playing the violin 2703 to an avatar-based image with a baseball glove on a left hand and a ball on a right hand as shown in a screen 2980.

The avatar-based image of playing the baseball shown in the screen 2980 according to an exemplary embodiment is not limited thereto. For example, when a user input selecting the baseball item 2913 is received while displaying an avatar-based image holding the violin 2703 with a left hand as shown in a screen 2990 of FIG. 29F, the device may display an avatar-based image holding a baseball bat 2996 with a left hand. Alternatively, when a user input selecting a movie item 2915 is received through a popup window 2911', the device 100 may display an avatar-based image holding a movie CD or a video tape with a left hand.

Figure 29F:
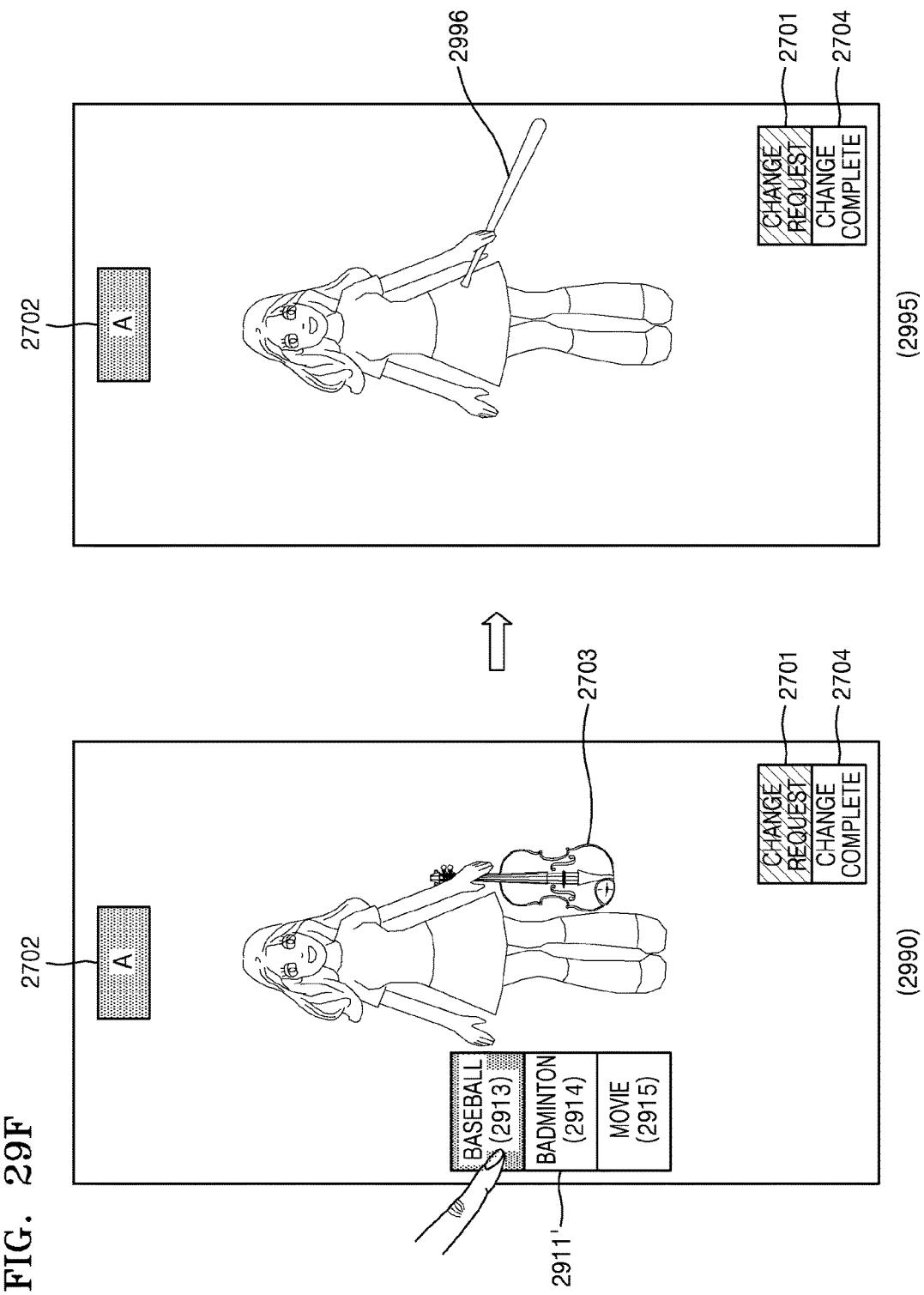

When a user input selecting a change complete button 2704 is received in the screen 2980 of FIG. 29E or a screen 2995 of FIG. 29F, the device 100 may generate and display a changed image 2320 similar to that shown in FIG. 23A. The changed image 2320 of FIG. 23A is an avatar-based image playing baseball.

Figure 30:
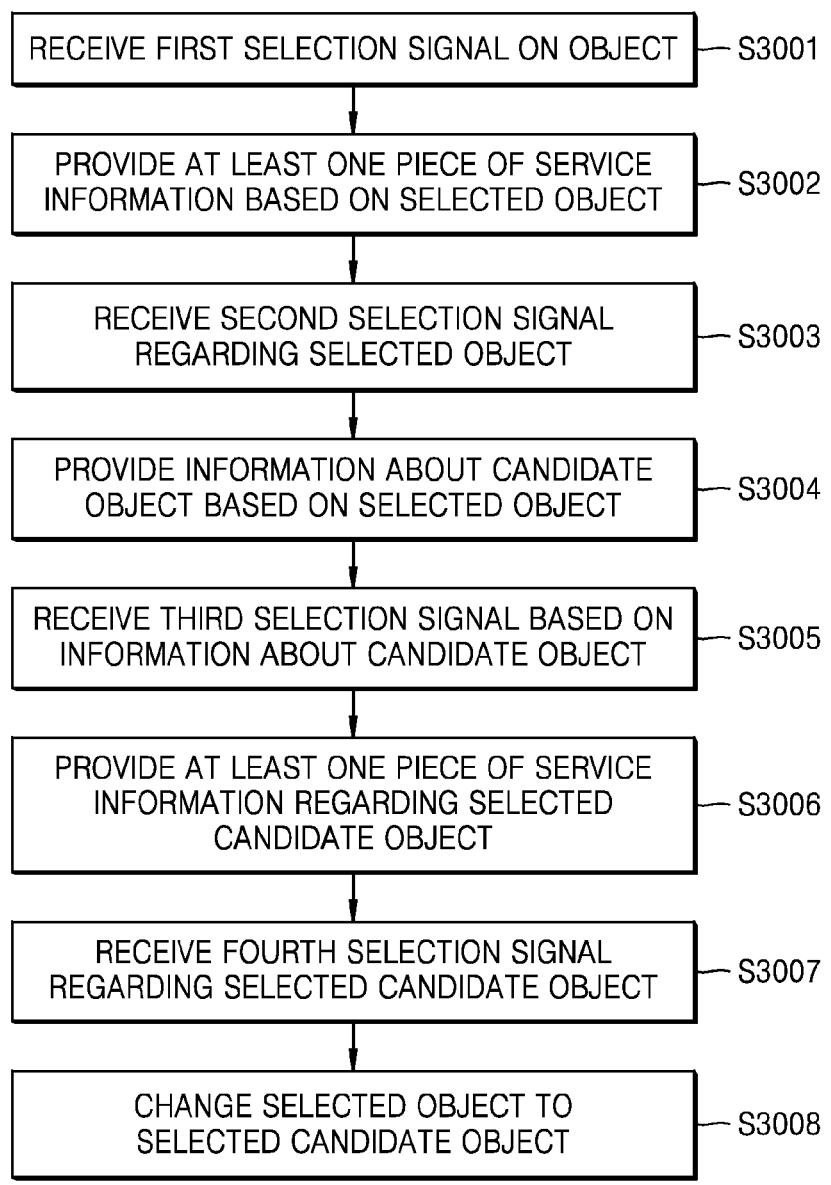
FIG. 30 is a flowchart of a method of providing, by a device, service information providable according to objects included in an avatar-based image, according to an exemplary embodiment.

FIG. 30 is a flowchart of a method of providing, by the device 100, service information providable according to objects included in the avatar-based image 2310, according to an exemplary embodiment.

Referring to FIG. 30, in operation S3001, the device 100 receives a first selection signal indicating selection on an object. In operation S3002, the device 100 provides at least one piece of service information based on the selected object.

FIGS. 31A through 31D illustrate examples of a screen for describing the method of FIG. 30. When a user input selecting the change request button 2701 is received while an avatar-based image is displayed as shown in a screen 3110 of FIG. 31A, the device 100 highlights a changeable object as shown in a screen 3120 of FIG. 31A.

Figure 31A:
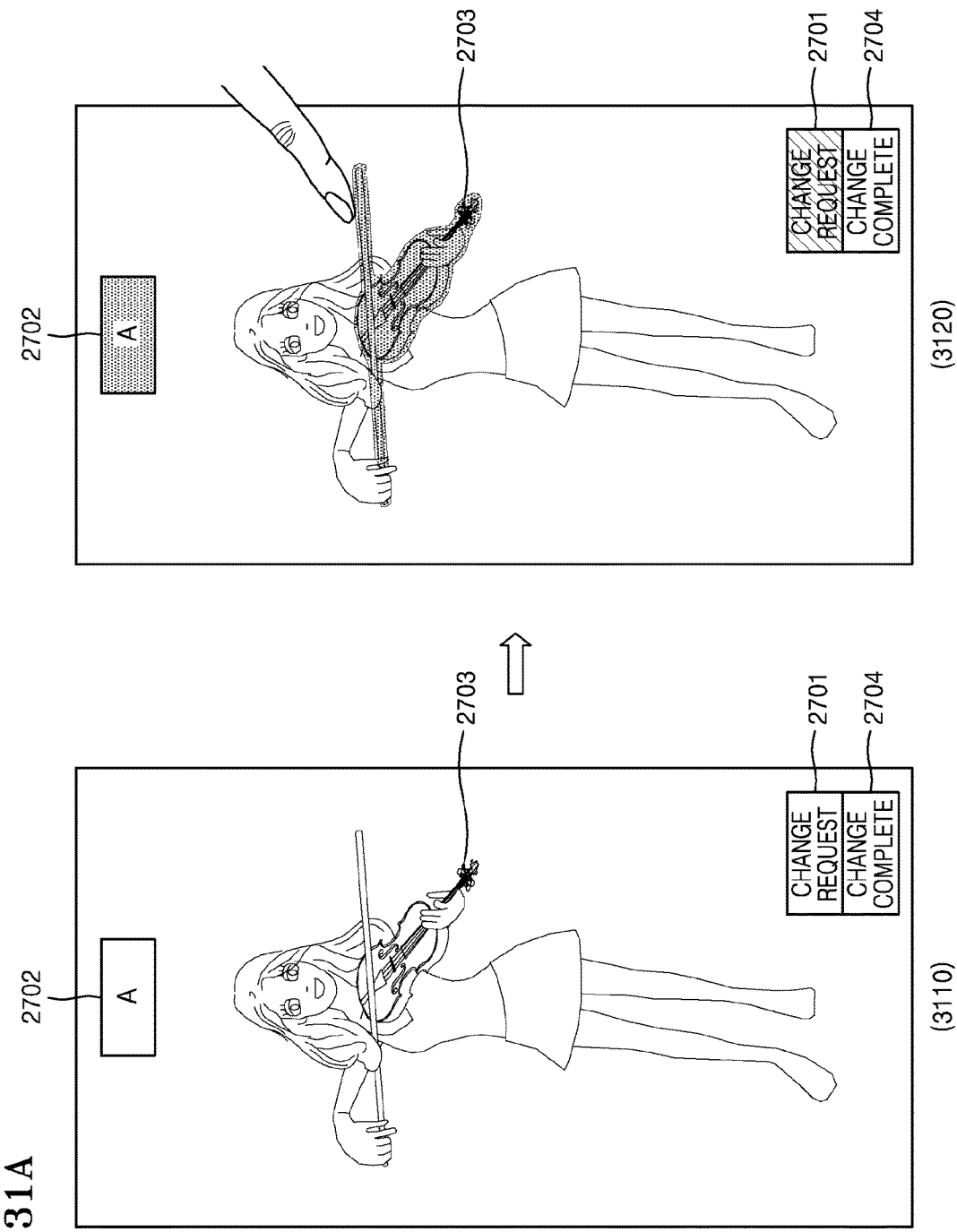
FIGS. 31A through 31D illustrate examples of a screen for describing the method of FIG. 30.
Figure 31B:
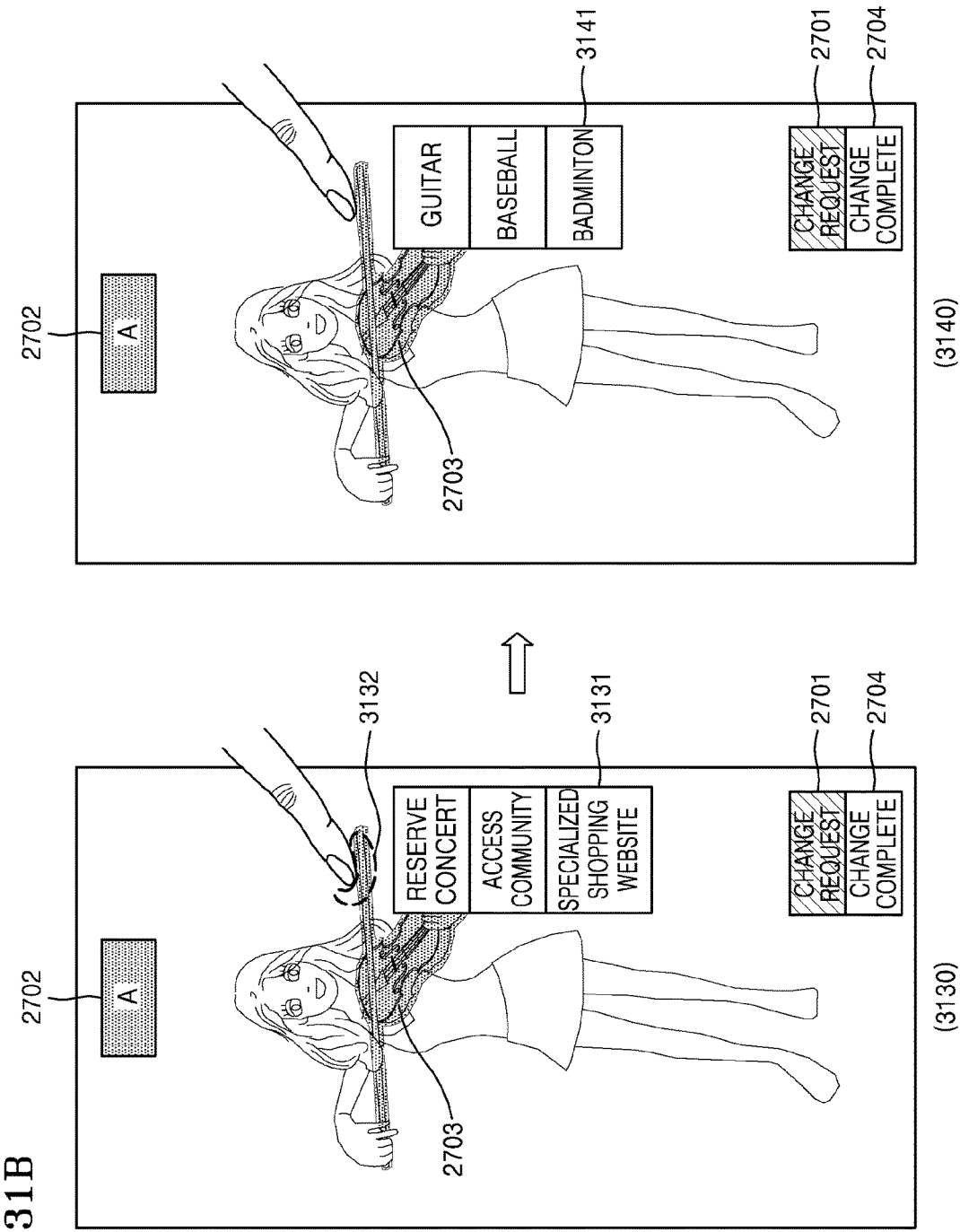

When a first selection signal is received with respect to the violin 2703 in the screen 3120 of FIG. 31A, the device 100 provides providable service information based on the violin 2703 through a popup window 3131 as shown in a screen 3130 of FIG. 31B. Referring to the popup window 3131, the providable service information may include a concert reservation item, a community access item and/or a specialized shopping website item, but the providable service information according to an exemplary embodiment is not limited thereto.

With reference to FIG. 30 and FIGS. 31A through 31D, when a second selection signal 3132 indicating selection on the selected object (the violin 2703 of screen 3130 of FIG. 13B) is received in operation S3003, the device 100 provides information about at least one candidate object regarding the selected object (the violin 2703) in operation S3004. The information about the at least one candidate object may be provided in a form of a popup window 3141 as shown in a screen 3140 of FIG. 31B.

Accordingly, the device 100 determines the first selection signal received in operation S3001 as preliminary selection regarding an object the user wishes to change, and the second selection signal received in operation S3003 as completion selection regarding the object the user wishes to change. The preliminary selection indicates a selection standby state regarding the object, and the completion selection indicates a selection completion state regarding the object.

In operation S3005, the device 100 receives a third selection signal based on the information about the at least one candidate object. Accordingly, in operation S3006, the device 100 provides at least one piece of service information regarding the selected candidate object.

Figure 31C:
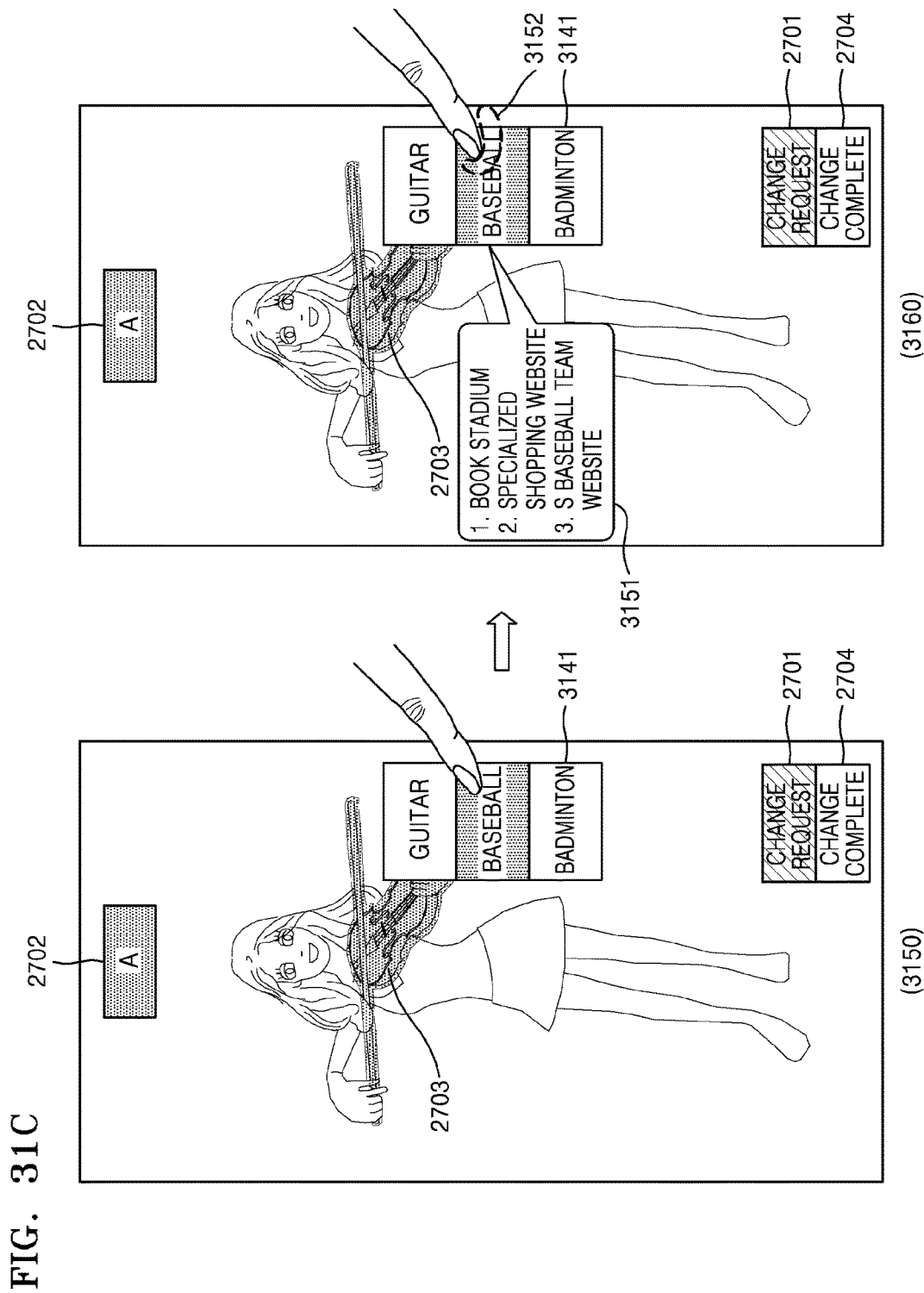
Figure 31D:
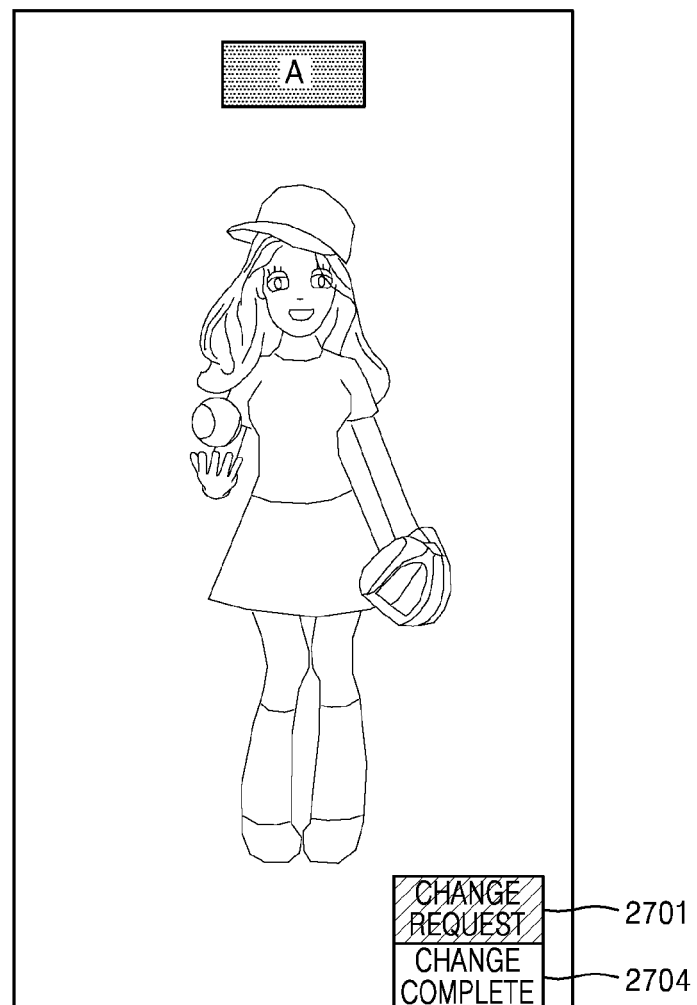

Referring to FIG. 31C, when a baseball item is selected from the information about the at least one candidate object displayed on the popup window 3141 of a screen 3150, the device 100 provides providable service information based on the baseball item through a speech bubble 3151 as shown in a screen 3160.

In operation S3007, the device 100 receives a fourth selection signal regarding the selected candidate object (the baseball item). For example, double touches 3152 of the screen 3160 of FIG. 31C may be received as the fourth selection signal.

The device 100 may determine the third selection signal regarding the selected candidate object received in operation S3005 as preliminary selection regarding the selected candidate object and the fourth selection signal regarding the selected candidate object received in operation S3007 as completion selection regarding the selected candidate object. The preliminary selection indicates a selection standby state and the completion selection indicates a selection completion state.

In operation S3008, the device 100 changes the selected object to the selected candidate object. Accordingly, the device 100 may display an avatar-based image based on the baseball item as shown in a screen 3170 of FIG. 31D. When a user input selecting the change complete button 2704 is received in the screen 3170 of FIG. 31D, the device 100 completes an image change.

According to the method of FIG. 30, the user of the device 100 may check providable service information based on a candidate object before changing an avatar-based image.

Returning again to FIG. 22, when the avatar-based image 2310 is changed according to the user input in operation S2202 of FIG. 22, the device 100 updates the user information 2300 to user information 2330 based on the changed image 2320 of FIG. 23A in operation S2203. The user information 2330 includes hobby information 2331 (playing a guitar) of the user, a name 2332 of the user, and gender information 2333 (female) of the user.

By updating the user information 2300 to the user information 2330, the user modeling information of FIG. 24A may be updated to user modeling information 3200 of FIG. 32. FIG. 32 illustrates an example of the user modeling information 3200 updated by the device 100, according to an exemplary embodiment.

When a display size of the female avatar 2311 included in the avatar-based image 2310 is changed, the device 100 may change user information according to the changed display size. For example, when the display size of the female avatar 2311 included in the avatar-based image 2310 is changed from normal to thin according to a user input, the device 100 may update a weight and a height of the user included in the user information to values that express thinness.

While the avatar-based image 2310 is displayed by the device 100 in operation S2201 of FIG. 22, the device 100 may also provide sound based on the user information 2300. The sound may be provided as background music of the avatar-based image 2310 or voice of the female avatar 2311. The voice of the female avatar 2311 may provide, for example, guide information related to the user information 2300 (for example, "I am A, female, and my hobby is playing a violin".)

The device 100 may provide the voice of the female avatar 2311 in any one of various modes based on a female voice. Examples of the various modes may include a speech mode, a musical mode, and/or a play mode, but are not limited thereto. Such a mode may be set as a default in the device 100, or may be set or changed by the user.

When the sound is provided as background music, the device 100 may provide violin music based on the hobby information 2301 (playing a violin) included in the user information 2300. The violin music may be determined by the device 100 or the external device 2120 based on user information other than the user information 2300 of FIG. 23A.

The device 100 may further provide, together with the avatar-based image 2310, a background image of the female avatar 2311 based on the user information 2300. The background image may be a stage image of playing a violin based on the hobby information 2301 or a single color image (for example, pink) based on the gender information 2303, but is not limited thereto. For example, when it is determined that the user usually plays a violin 2312 at night based on user information, the device 100 may display a night image as the background image. The device 100 may determine that the user usually plays the violin 2312 at night based on a violin play time included in user information.

As described above, when at least one of the background image and the sound are further provided together with the avatar-based image 2310, the device 100 may provide the background image and the sound as changeable objects.

When the background image and the sound are provided by user information other than the user information 2300, and the background image and/or the sound are changed, the device 100 may update the user information based on the changed background image and/or the changed sound.

Figure 33:
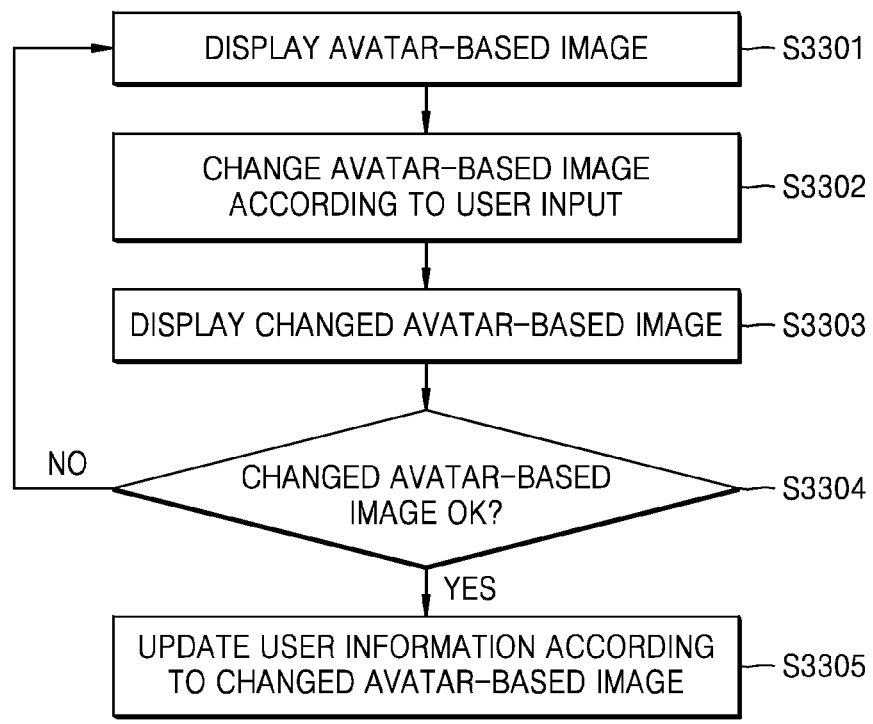
FIG. 33 is a flowchart of a method of managing, by a device, user information by changing an avatar-based image, according to an exemplary embodiment.

FIG. 33 is a flowchart of a method of managing, by the device 100, user information by changing avatar-based image, according to an exemplary embodiment. In FIG. 33, the user information is updated according to a user input accepting the changed avatar-based image.

In operation S3301 of FIG. 33, the device 100 displays the avatar-based image 2310 based on user information as in operation S2201 described above. In operation S3302, the device 100 changes the avatar-based image 2310 according to a user input as in operation S2202 described above.

In operation S3303, the device 100 displays the changed image 2320. It is then determined whether the changed image is acceptable in operation S3304. When a user input accepting the changed image 2320 is received (S3304, YES), operation S3305 is performed. The user input accepting the changed image 2320 may be input through the device 100, or by using the external device 2120. In order to receive the user input accepting the changed image 2320, the device 100 may display a message asking the user to accept the changed image 2320.

When the user input accepting the changed image 2320 is not received (S3304, NO), operation S3301 is performed and the device 100 may display the avatar-based image 2310.

Alternatively, when the user input accepting the changed image 2320 is not received (S3304, NO), operation S3303 is performed and the device 100 may display the changed image 2320 while maintaining a standby state regarding a user input requesting to additionally change the changed image 2320.

When a user input is not received for a pre-set period of time in operation S3304, the device 100 may determine that the user input accepting the changed image 2320 is not received.

When the user input accepting the changed image 2320 is received (S3304, YES), the device 100 updates the user information based on the changed image 2320 in operation S3305.

Figure 34:
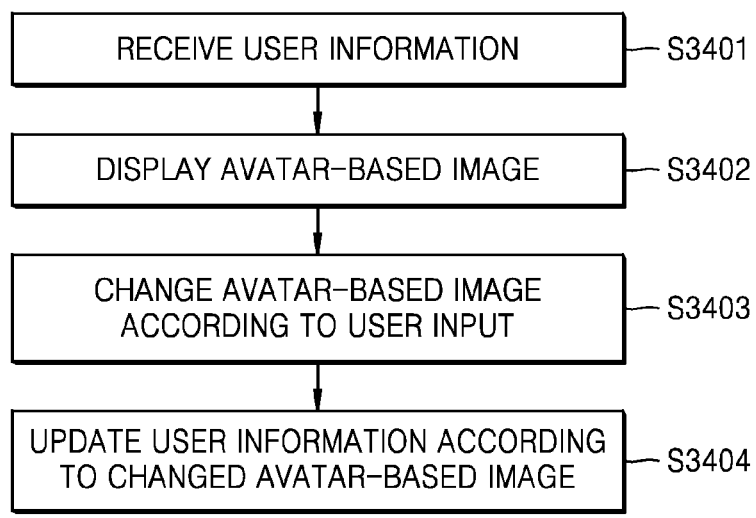
FIG. 34 is a flowchart of a method of managing, by a device, user information by changing an avatar-based image, according to another exemplary embodiment.

FIG. 34 is a flowchart of a method of managing, by the device 100, user information by changing avatar-based image, according to another exemplary embodiment.

Referring to FIG. 34, in operation S3401, the device 100 receives user information from the external device 2120. The device 100 may receive the user information from the external device 2120 according to a user input requesting the user information. For example, the device 100 may request the external device 2120 for the user information according to an input of requesting user information registered in a social media server, and accordingly, receive the user information from the external device 2120.

Alternatively, the device 100 may request the user information from the external device 2120 without any request. For example, when the device 100 is in a sleep mode or executing an application A, health information of the user may be received from the external device 2120. The user information received in operation S3401 may include at least one piece of user information described above. The received user information may be stored in the device 100.

In operation S3402, the device 100 may generate and display an avatar-based image based on the user information. The avatar-based image may be generated based on the user information as described above with reference to operation S2201 of FIG. 22.

In operation S3403, the device 100 changes the avatar-based image according to a user input indicating a change request. The avatar-based image may be changed according to the user input as described above with reference to operation S2202 of FIG. 22

In operation S3404, the device 100 updates the user information according to the changed avatar-based image. The device 100 changes the user information received in operation S3401 according to the changed avatar-based image, and request the external device 2120 to update the user information while transmitting the changed user information to the external device 2120. Accordingly, the external device 2120 may update the user information. After requesting the external device 2120 to update the user information, the device 100 may automatically delete the stored user information upon.

Figure 35:
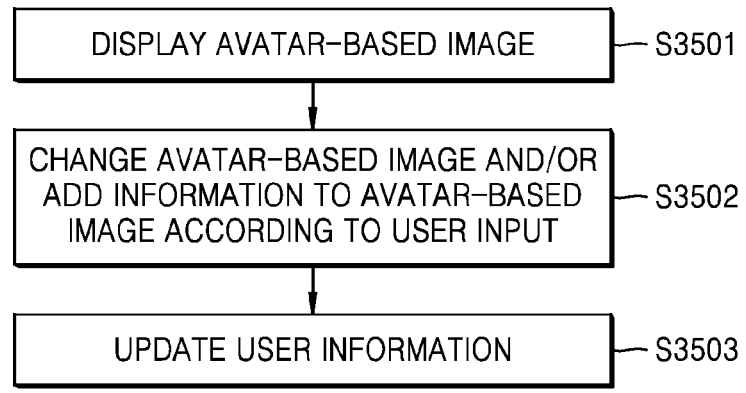
FIG. 35 is a flowchart of a method of managing user information, wherein a device changes and/or adds information by using an avatar-based image, according to an exemplary embodiment.

FIG. 35 is a flowchart of a method of managing user information, wherein the device 100 changes and/or adds information by using an avatar-based image, according to an exemplary embodiment.

In operation S3501, the device 100 displays the avatar-based image 2310 according to user information. Operation S3501 may be performed in the similar manner as operation S2201 of FIG. 22 described above.

In operation S3502, the device 100 may change the avatar-based image 2301 according to a user input. The avatar-based image 2310 may be changed in operation S3502 in the similar manner as operation S2202 of FIG. 22.

Also, in operation S3502, the device 100 may add new information (or a new object) to the avatar-based image 2310 according to a user input. The new information may be added based on image information corresponding to addable information provided by the device 100. The image information may include at least one of an image, a symbol, and an icon symbolizing the addable information.

When the image information corresponding to the addable information is selected, the device 100 may provide the changed image 2320 to which the selected image information is added. However, a process of adding new information is not limited thereto.

For example, when image information corresponding to addable information (for example, an appcessory) is selected, the device 100 may provide an input window for receiving information related to the selected image information, for example, an earring. Upon receiving the information related to the selected image information through the input window, the device 100 may generate an image of the received information (for example, the earring), and provide the changed image 2320 including the generated image.

In operation S3503, the device 100 updates user information based on the changed image 2320. For example, when the fifth preparation is added as described above with reference to FIGS. 8A through 8C, the device 100 may update user information such that information about the fifth preparation is included in the user information.

Figure 36:
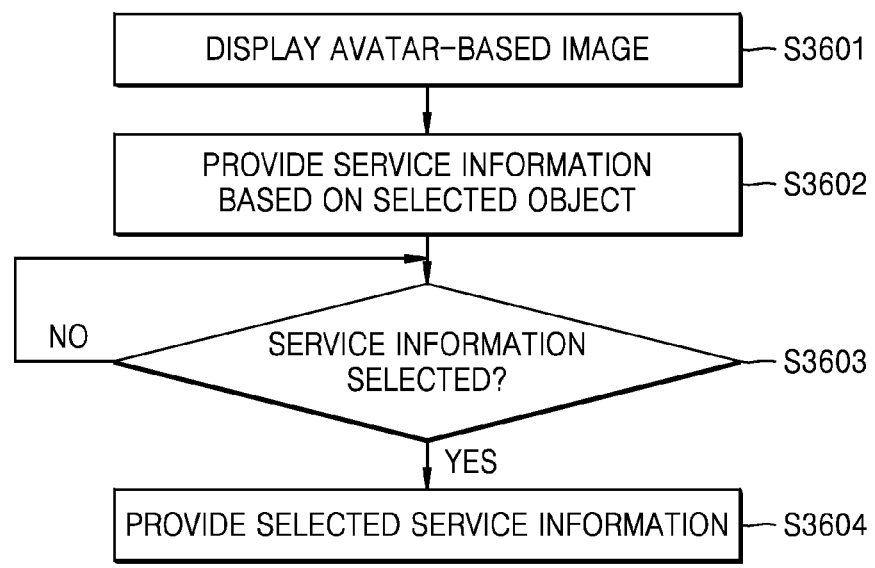
FIG. 36 is a flowchart of a method of managing user information such that a device is able to provide a service based on an object selected from an avatar-based image, according to an exemplary embodiment.

FIG. 36 is a flowchart of a method of managing user information such that the device 100 is able to provide a service based on an object selected from an avatar-based image, according to an exemplary embodiment. In FIG. 36, the object is an image and/or text corresponding to changeable user information included in the avatar-based image.

In operation S3601, the device 100 displays avatar-based image according to user information. The device 100 may display the avatar-based image in the same manner as in operation S2201 of FIG. 22 described above. For example, the device 100 may display the avatar-based image of FIG. 31A. At this time, the device 100 may display the avatar-based image that does not include the change request button 2701 and the change complete button 2704 of FIG. 31A.

In operation S3602, the device 100 provides service information based on an object, for example, the violin 2703 upon receiving a user input selecting the violin 2703 from the screen 3110. For example, when the user input selecting the violin 2703 is received as in the screen 3120 of FIG. 31A, the device 100 opens the popup window 3131 including at least one piece of service information based on the violin 2703 as shown in the screen 3130 of FIG. 31B.

Referring to FIG. 31B, the service information included in the popup window 3131 includes the concert reservation item, the community access item, and the specialized shopping website item. However, the service information included in the popup window 3131 is not limited thereto. Also, the service information based on the violin 2703 according to an exemplary embodiment may be provided in a form of the tray 2712 of FIG. 27C. The service information based on the violin 2703 may referred to as a service information based on an object selected by a user input.

It is then determined whether service information is selected in operation S3603. When a user input selecting one piece of service information is received (S3603, YES), the device 100 provides the selected service information in operation S3604. For example, when a user input selecting the concert reservation item included in the popup window 3131 is received, the device 100 may execute an application providing a violin concert reservation service.

Figure 37:
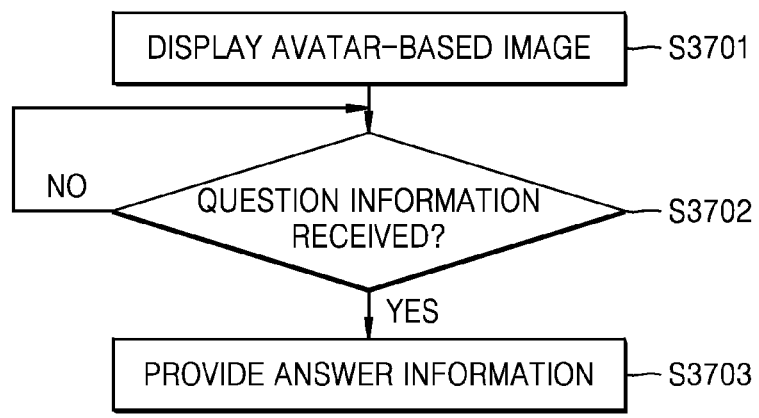
FIG. 37 is a flowchart of a method of managing user information, wherein a device provides a question and answer (QA) service based on an avatar-based image being displayed, according to an exemplary embodiment.

FIG. 37 is a flowchart of a method of managing user information, wherein the device 100 provides a question and answer (QA) service based on an avatar-based image being displayed, according to an exemplary embodiment.

In operation S3701 of FIG. 37, the device 100 displays an avatar-based image according to user information. For example, the device 100 may display the avatar-based image 2310 of FIG. 23A according to user information.

It is then determined whether question information is received in operation S3702. When question information is received (S3702, YES), the device 100 provides answer information regarding the question information in operation S3703.

The question information received in operation S3702 is question information related to the avatar-based image. For example, the question information may be "tell me information about the violin concert I reserved", "tell me if I have a violin lesson tomorrow", "what time was the violin lesson yesterday?", or "what is my schedule immediately before a violin lesson tomorrow?".

The question information received in operation S3702 may use a voice signal of the user. If the device 100 is unable to process (or recognize) the question information received in operation S3702, the device 100 may display an error message or output a voice signal indicating an error message.

Also, if the device 100 fails to recognize the question information, the device 100 may provide guide information regarding inputtable question information. The device 100 may provide the guide information regarding the inputtable question information in a form of a list. The guide information may provide information about a form of the inputtable question information.

While recognizing the question information, the device 100 may consider the user information. For example, when the question information is "give me information about Lincoln", the device 100 may determine whether "Lincoln" is a person or a car based on the user information. If the device 100 determines that the user is highly interested in cars based on the user information, the device 100 may recognize "Lincoln" included in the question information as a car "Lincoln".

Meanwhile, if the question information received in operation S3702 is "tell me information about the violin concert I reserved", the device 100 may provide a screen 3810 or 3820 of FIG. 38 in operation S3703. For example, if the question information received in operation S3702 is "tell me information about the concert I recently updated", the device 100 may provide the screen 3810 before an update and the screen 3820 after the update of FIG. 38 together. Accordingly the user may easily check information about concerts before and after an update.

FIG. 38 illustrates an example of the device 100 providing answer information according to received question information, according to an exemplary embodiment. Referring to FIG. 38, answer information based on user information before an update and answer information based on the user information after the update are displayed at the same time.

The device 100 may partially overlap and display the screens 3810 and 3820. The device 100 may provide the screens 3810 and 3820 in a similar manner to an electronic book being opened. When the screens 3810 and 3820 are provided in such a manner, and a user input touching and dragging a corner or a side of the screen 3810 or 3820 is received, the device 100 may close the screens 3810 and 3820 in a dragging direction. For example, when a user input touching and dragging, in a leftward direction, a rightmost side of the screen 3820 is received, the device 100 may close the screens 3810 and 3820 in such a manner that the screen 3820 is turned over to cover the screen 3810.

Figure 39:
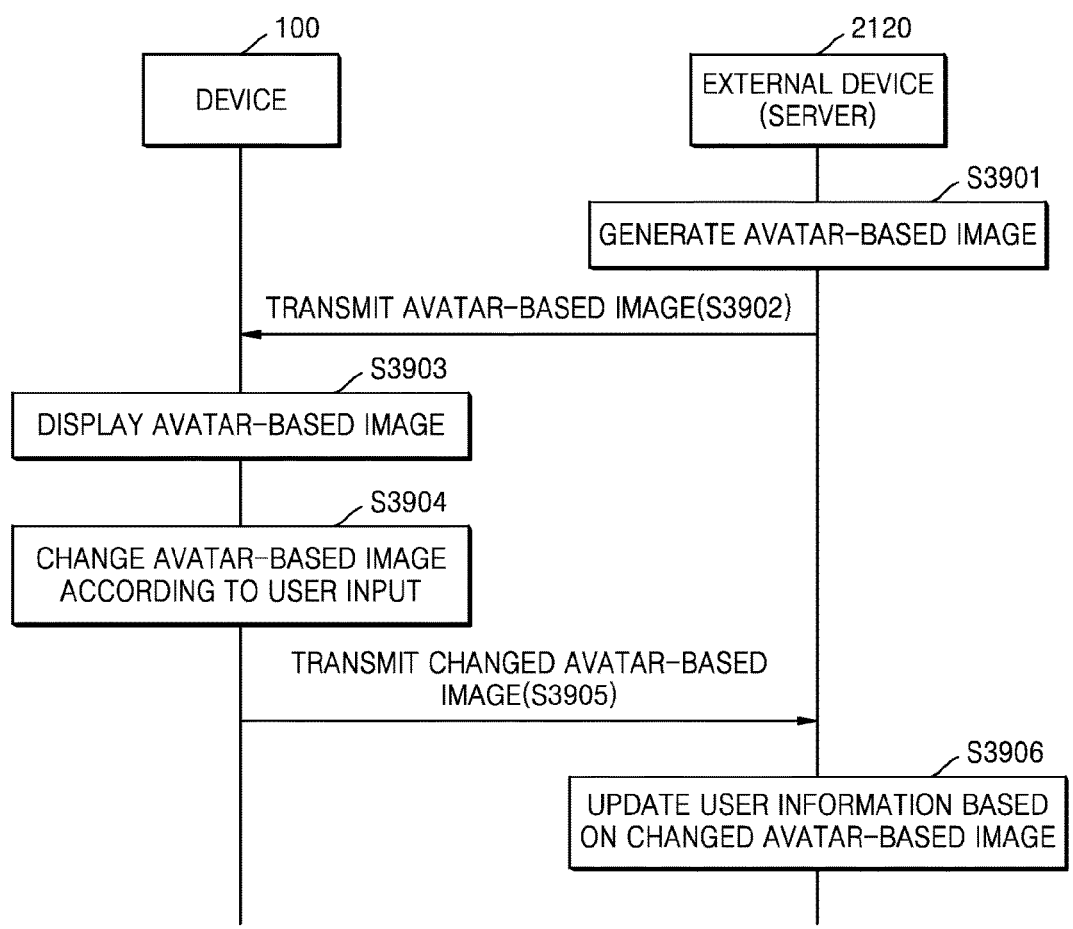
FIG. 39 is a flowchart of a method of managing user information based on a device and an external device, according to an exemplary embodiment.

FIG. 39 is a flowchart of a method of managing user information based on the device 100 and the external device 2120, according to an exemplary embodiment. In FIG. 39, the external device 2120 generates an avatar-based image.

In operation S3901, the external device 2120 generates an avatar-based image based on user information. The external device 2120 may generate the avatar-based image based on the user information in the same manner as in operation S2201 of FIG. 22 described above. For example, when the external device 2120 is a social media server, the external device 2120 may generate an avatar-based image based on user profile information registered in the social media server.

In operation S3902, the external device 2120 transmits the avatar-based image to the device 100. Operation S3902 may be performed according to a request of the device 100 for user information.

In operation S3903, the device 100 displays the avatar-based image. In operation S3904, the device 100 changes the avatar-based image. Operation S3904 may be performed by receiving a user input indicating a request to change the avatar-based image. The avatar-based image may be changed in the same manner as in operation S2202 of FIG. 22 described above.

When the avatar-based image is changed, the device 100 transmits the changed avatar-based image to the external device 2120 in operation S3905. In operation S3906, the external device 2120 updates the user information based on the changed avatar-based image. Operation S3906 may be performed in the same manner as in operation S2203 of FIG. 22.

Figure 40:
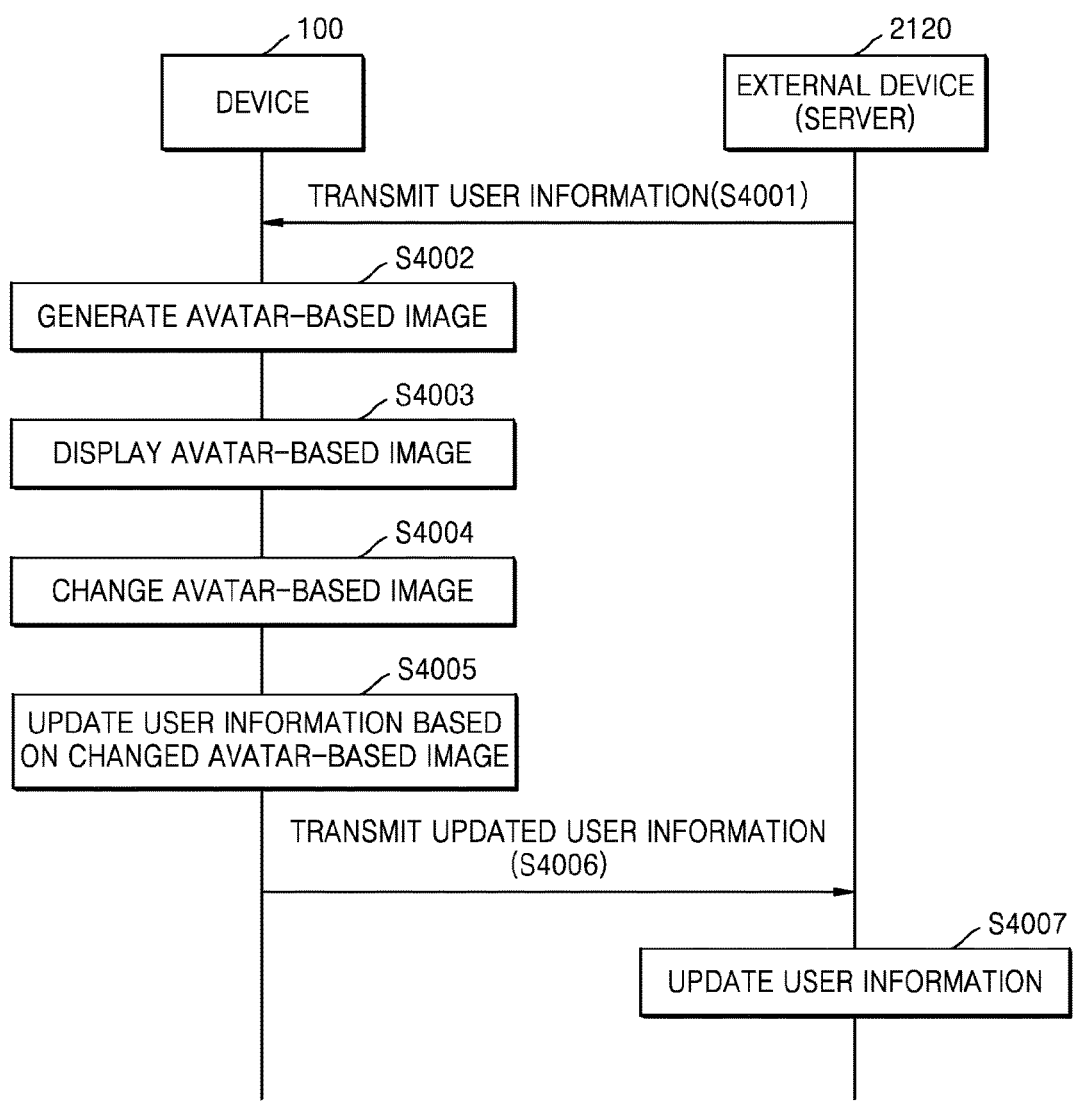
FIG. 40 is a flowchart of a method of managing user information based on a device and an external device, according to another exemplary embodiment.

FIG. 40 is a flowchart of a method of managing user information based on the device 100 and the external device 2120, according to another exemplary embodiment. In FIG. 40, the device 100 generates an avatar-based image.

When user information is transmitted from the external device 2120 to the device 100 in operation S4001, the device 100 generates an avatar-based image based on the user information in operation S4002.

The device 100 displays the avatar-based image in operation S4003. The device 100 changes the avatar-based image according to a user input in operation S4004.

In operation S4005, the device 100 updates the user information based on the changed avatar-based image. In operation S4006, the device 100 transmits the updated user information to the external device 2120. In operation S4007, the external device 2120 may update the user information stored in the external device 2120 based on the received updated user information.

Figure 41:
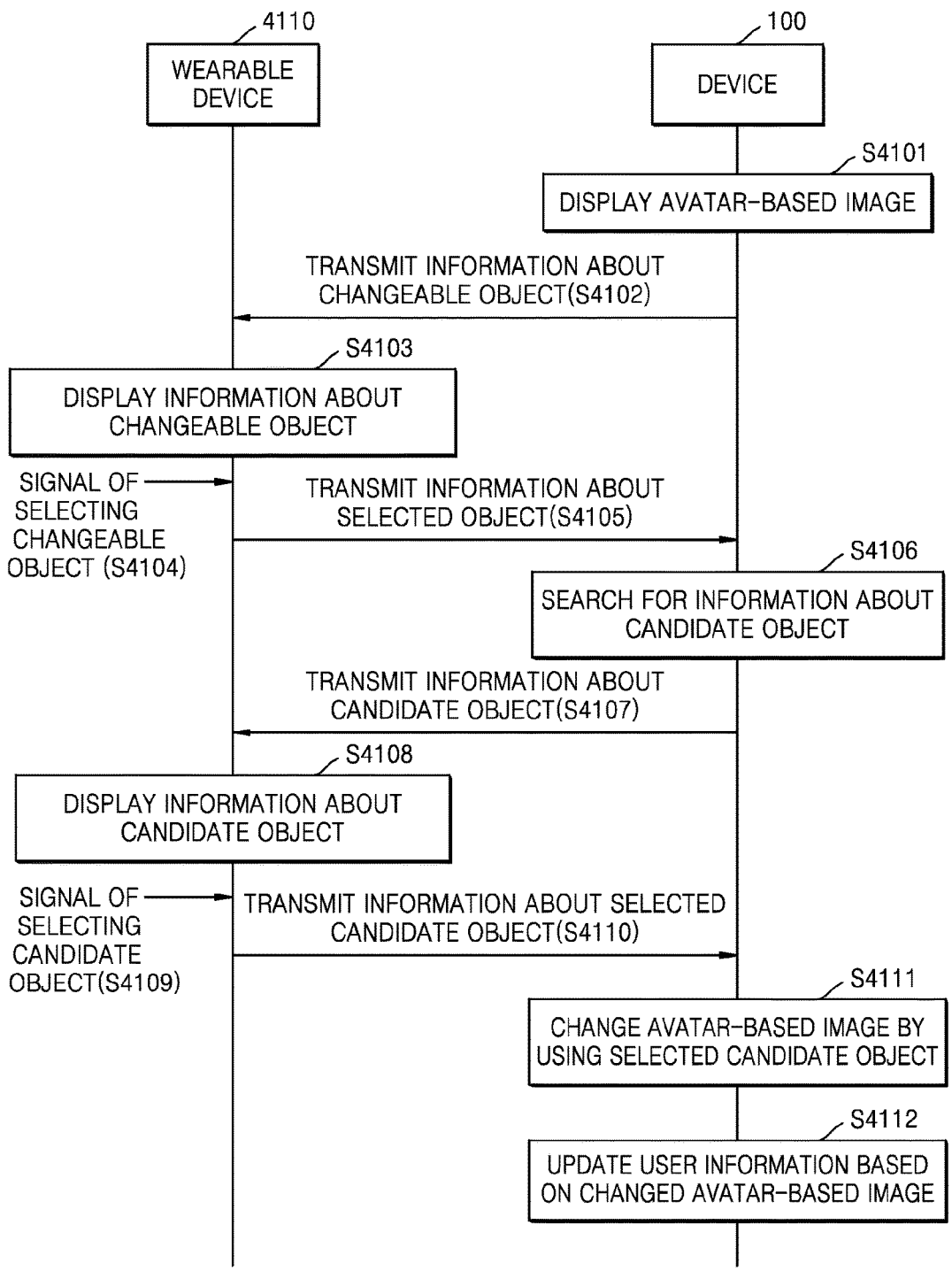
FIG. 41 is a flowchart of a method of managing user information based on a device and a wearable device, according to an exemplary embodiment.

FIG. 41 is a flowchart of a method of managing user information based on the device 100 and a wearable device 4110, according to an exemplary embodiment. In FIG. 41, information about an object included in an avatar-based image is displayed through the wearable device 4110.

The device 100 displays an avatar-based image according to user information in operation S4101, and transmits information about a changeable object included in the avatar-based image to the wearable device 4110 in operation S4102.

In operation S4103, the wearable device 4100 displays the information about the changeable object. According to an exemplary embodiment, the information about the changeable object may be displayed in a form of an image, but is not limited thereto. For example, the wearable device 4110 may display the information about the changeable object in a form of text. When a signal of selecting an object based on the information about the changeable object is received in operation S4104, the wearable device 4110 transmits information about the selected object to the device 100 in operation S4105.

In operation S4106, the device 100 searches stored information for information about a candidate object of the selected object. The information about the candidate object may be searched for from an external storage apparatus of the device 100. The information about the candidate object may be searched for from the external device 2120 connected to the device 100. The device 100 may search for the information about the candidate object by using ID information of the selected object as a keyword.

In operation S4107, the device 100 transmits the information about the candidate object to the wearable device 4110. In operation S4108, the wearable device 4110 displays the information about the candidate object.

For example, when the object selected in operation S4104 is the violin 2703 of FIG. 29A, the information about the candidate object, which may be displayed in operation S4108, may include items included in the popup window 2921 of the screen 2920 of FIG. 29A.

For example, when the object selected in operation S4104 is the icon 2710 regarding a hobby of FIG. 27C, the information about the candidate object, which may be displayed in operation S4108, may include items (for example, swimming, bike riding, and photographing) related to a hobby.

The information about the candidate object may be displayed in a form of an image and/or text, but is not limited thereto.

When a signal of selecting a candidate object is received in operation S4109, the wearable device 4110 transmits information about the selected candidate object to the device 100 in operation S4110.

In operation S4111, the device 100 changes the avatar-based image by using the selected candidate object. In operation S4112, the device 100 updates the user information based on the changed avatar-based image. The user information may be updated in operation S4112 in the same manner as in operation S2203 of FIG. 22 described above.

Figure 42:
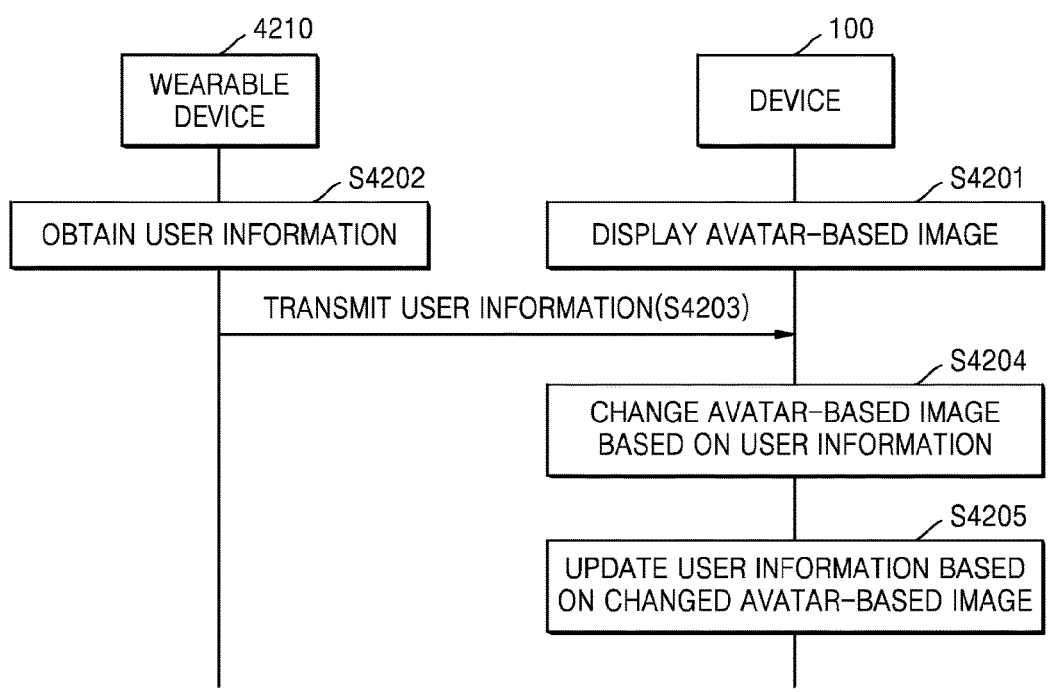
FIG. 42 is a flowchart of a method of managing user information based on a device and a wearable device, according to another exemplary embodiment.

FIG. 42 is a flowchart of a method of managing user information based on the device 100 and a wearable device 4210, according to another exemplary embodiment. In FIG. 42, an avatar-based image is changed based on user information obtained by the wearable device 4210.

In operation S4201, the device 100 displays an avatar-based image according to user information. In operation S4201, the device 100 may display the avatar-based image in the same manner as in operation S2201 of FIG. 22 described above.

In operation S4202, the wearable device 4210 obtains the user information. The user information obtained by the wearable device 4210 may include, for example, health information of a user or location information of the wearable device 4210, but the user information obtained by the wearable device 4210 is not limited thereto.

Operations S4201 and S4202 may be simultaneously performed. Alternatively, operation S4202 may be performed before operation S4201, or operation S4201 may be performed before operation S4202.

In operation S4203, the wearable device 4210 transmits the user information to the device 100. The device 100 changes the avatar-based image displayed in operation S4201 based on the received user information, in operation S4204.

For example, when the received user information is information about a temperature of the user and the temperature is determined to be higher than a reference temperature, the device 100 may change a face of the avatar-based image displayed in operation S4201 to be partially red. Accordingly, the user may check that the user has a fever through the changed avatar-based image displayed through the device 100.

For example, when the received user information is information about a happy feeling of the user, the device 100 may change a face of the avatar-based image displayed in operation S4201 to a smiling face. Accordingly, the user may check that the user is in a good mood through the changed avatar-based image displayed through the device 100.

As described above, the device 100 may variously change the avatar-based image displayed in operation S4201 according to the user information obtained and transmitted by the wearable device 4210. While changing the avatar-based image, not only the face of the avatar-based image, but also at least one changeable object from among objects included in the avatar-based image may be changed. The changeable object may further include at least one of a background image and sound, but is not limited thereto. In operation S4205, the device 100 may update the user information based on the changed avatar-based image.

Figure 43:
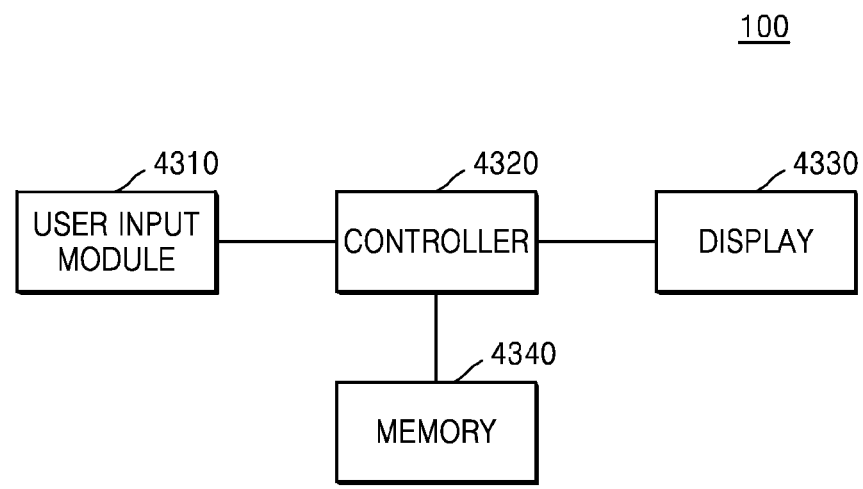
FIGS. 43 and 44 are functional block diagrams of a device according to exemplary embodiments.

FIG. 43 is functional block diagrams of the device 100 according to exemplary embodiments. Referring to FIG. 43, the device 100 may include a user input module 4310, a controller 4320, a display 4330, and a memory 4340.

The user input module 4310 may receive a user input requesting user information, a user input requesting to change user information, user input requesting to add user information, a user input completing changing of user information, a user input selecting an object, a user input requesting service information, a user input selecting service information, a user input accepting a changed avatar-based image, or a user input controlling the device 100, but a user input according to an exemplary embodiment is not limited thereto.

The user input module 4310 may be mounted on the device 100. The user input module 4310 mounted on the device 100 may include, for example, at least one of a keypad, a dome switch, a touch pad (a contact capacitance type, a pressure resistance film type, an infrared detection type, a surface ultrasound conducting type, an integral tension measuring type, or a piezo-effect type), a jog wheel, and/or a jog switch, but the user input module 4310 according to an exemplary embodiment is not limited thereto.

A user input received through the user input module 4310 may be a touch-based user input, a movement-based user input, a vision-based user input and/or voice-based user input, but the user input is not limited thereto.

Example of the touch-based user input may include tap (or touch), long tap (or long touch), touch and hold, touch and drag, double tap, drag, panning, flick, drag and drop, sweep, or swipe, but the touch-based user input is not limited thereto.

Example of the movement-based user input may include user input based on movement-based user gesture of the device 100 (for example, shaking the device 100, rotating the device 100, or lifting the device 100), but the movement-based user input is not limited thereto.

Example of the vision-based user input may include user input recognized by analyzing input images obtained by a camera included in the device 100 without a contact between the device 100 and the user, but the vision-based user input is not limited thereto.

The controller 4320 is one or more processors controlling operations of the device 100. The controller 4320 may load and operate a program for executing a method of managing user information, according to one or more exemplary embodiments, which is stored in the memory 4340. The controller 4320 may store the program for executing the method in the memory 4340. The controller 4320 may update the program stored in the memory 4340.

The controller 4320 may generate an avatar-based image based on user information according to the method, and display the avatar-based image on the display 4330. Upon receiving a user input requesting to change the avatar-based image from the user input unit 4310, the controller 4320 changes the avatar-based image according to the user input. The controller 4320 may update the user information based on the changed avatar-based image.

The controller 4320 may control the operations of the device 100 based on the method of any one of FIGS. 2, 7, 9, 11, 13, 14, 16, 18, 20, 22, 28, 30, 33 through 37, 39, and 40 through 42.

Also, when a user input requesting user information of a certain period is received through the user input module 4310, the controller 4320 controls the display 4330 to display a plurality of avatar-based images according to the user information of the certain period, in response to the user input. The plurality of avatar-based images displayed on the display 4330 may be determined based on standards of dividing the certain period.

Also, when a user input requesting user information of a certain period is received through the user input module 4310, the controller 4320 controls the display 4330 to display a plurality of avatar-based images according to the user information of the certain period, in response to the user input. The plurality of avatar-based images displayed on the display 4330 may be determined based on theme items included in the user information of the certain period.

Also, when a user input requesting to display changeable information is received through the user input module 4310, the controller 4320 may distinguishably display a changeable region and an unchangeable region of the avatar-based image displayed on the display 4330.

Also, when an offering period is set with respect to the avatar-based image, the controller 4320 checks the offering period. When the offering period is expired, the controller 4320 may remove the avatar-based image. Information about the offering period and the avatar-based image may be stored in the memory 4340, but an exemplary embodiment is not limited thereto. For example, the information about the offering period and the avatar-based image may be stored in the external device 2120.

Also, when a user input indicating a medical information request is received through the user input module 4310 while the avatar-based image is displayed on the display 4330 based on health information of a user, the controller 4320 displays medical information related to the health information on the display 4330 in response to the user input.

When a user input selecting medical information from among the medical information provided through the display 4330 is received through the user input module 4310, the controller 4320 may update user schedule information according to the selected medical information.

Also, when a user input adding information to the avatar-based image is received through the user input module 4310, the controller 4320 may display an input window for adding information on the display 4330. When information is received through the input window, the controller 4320 adds an image corresponding to the received information to the avatar-based image displayed on the display 4330. The controller 4320 may update the user schedule information according to the avatar-based image to which the image is added. The user schedule information may be stored in the memory 4340 and/or the external device 2120.

Also, the controller 4320 may control the display 4330 to display the avatar-based image according to future hope information of the user. When a user input requesting information related to the future hope information is received through the user input module 4310 while the avatar-based image according to the future hope information is displayed on the display 4330, the controller 4320 provides the information related to the future hope information through the display 4330 in response to the user input. When a user input selecting at least one piece of the information related to the future hope information provided through the display 4330 is received through the user input module 4310, the controller 4320 may update the user schedule information according to the selected information related to the future hope information.

Also, when a user input requesting usage history information per usage period of the device 100 is received through the user input module 4310, the controller 4320 may display a plurality of avatar-based images according to the usage history information on the display 4330 in response to the user input.

Also, the controller 4320 may control the display 4330 to display an avatar-based image according to user information registered in social media. Here, when a user input requesting to change is received through the user input module 4310, the controller 4320 may change the avatar-based image displayed on the display 4330 in response to the user input, and update the user information registered in the social media according to the changed avatar-based image. The user information registered in the social media may include user profile information registered in a social media server as described above. The user information registered in the social media, according to an exemplary embodiment, is not limited thereto.

The display 4330 may display information processed by the device 100. The display 4330 may display a graphical user interface (GUI) screen as described above. For example, the display 4330 may display a GUI screen as described above with reference to FIGS. 1, 5A through 5E, 6A through 6E, 8A through 8C, 10, 12A through 12C, 15A through 15E, 17A through 17D, 19A and 19B, 23A through 23F, 27A through 27F, 29A through 29F, 31A through 31D, or 38.

When the display 4330 and a touch pad form a layer structure to be configured as a touch screen, the display 4330 may be used as an input device and an output device. The display 4330 may include at least one of a liquid crystal display (LCD), a thin-film transistor-liquid crystal display (TFT-LCD), an organic light-emitting diode (OLED), a flexible display, a 3D display, and an electrophoretic display (EPD). But, the display 4330 is not particularly limited.

According to an exemplary embodiment of the device 100, the device 100 may include at least two displays. Here, the at least two displays may be disposed to face each other by using a hinge. The display may be a transparent display unit.

The memory 4340 may store programs for processes and controls of the controller 4320. The programs stored in the memory 4340 may include an operating system (OS) program and various application programs. Various application programs may include an application for executing at least one of a method of managing user information and a method of providing a service according to an avatar-based image, according to one or more exemplary embodiments, but the application is not limited thereto.

The memory 4340 stores information managed by an application program. For example, the memory 4340 may store user information according to one or more exemplary embodiments, user modeling information based on user information, coordinate values of each object, and/or combining condition information of each object, but the information stored in the memory 4340 is not limited thereto.

The memory 4340 may include at least one storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. But, the memory 4340 is not particularly limited.

The device 100 may be configured to use web storage or a cloud server (not shown), which performs a storage function of the memory 4340 on the Internet. At this time, information about a GUI displayed on the display 4330 may be provided from the web storage or the cloud server.

Not all components of the device 100 illustrated in FIG. 43 are essential. The device 100 may include greater or fewer components than those shown in FIG. 43. For example, the device 100 may be configured as shown in FIG. 44.

Figure 44:
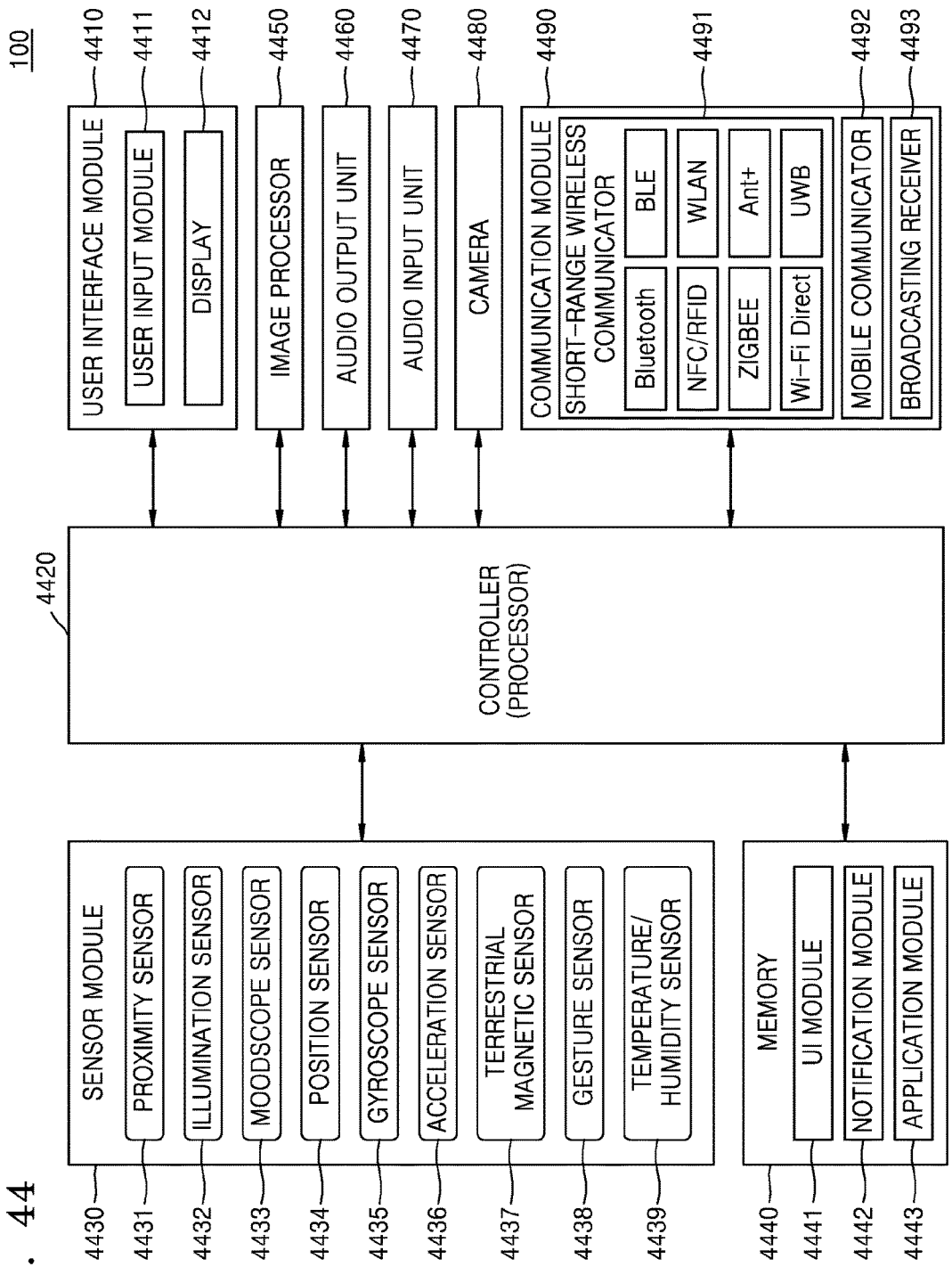

Referring to FIG. 44, the device 100 may include a user interface module 4410, a controller 4420, a sensor module 4430, a memory 4440, an image processor 4450, an audio output unit 4460, an audio input unit 4470, a camera 4480, and a communication module 4490.

The device 100 may further include a battery (not shown). The battery may be embedded in the device 100 or detachably included in the device 100. The battery may supply power to all components included in the device 100. The device 100 may receive power from an external power supply device. The external power supply device may be a battery embedded in the external device 2120.

A user input module 4411 and the display 4412 included in the user interface module 4410, the controller 4420, and the memory 4440 of FIG. 44 are similar to or same as the user input module 4310, the controller 4320, the display 4330, and the memory 4340 of FIG. 43.

The sensor module 4430 may include a proximity sensor 4431 detecting proximity of the user to the device 100, an illumination sensor 4432 (or an optical sensor) detecting lighting around the device 100, a Moodscope sensor 4433 detecting a mood of the user of the device 100, a position sensor 4434 (for example, a GPS receiver) detecting a position of the device 100, a gyroscope sensor 4435 measuring an azimuth of the device 100, an acceleration sensor 4436 (accelerometer) measuring a tilt and acceleration of the device 100 based on the ground surface, a terrestrial magnetic sensor 4437 detecting azimuth orientation based on the device 100, a gesture sensor 4438 recognizing a hand gesture by detecting infrared light reflected from a hand, and/or a temperature/humidity sensor 4439 recognizing ambient temperature and humidity. When the position sensor 4434 is configured as a GPS receiver, the position sensor 4434 may be included in the communication module 4490. The gesture sensor 4438 may be a movement detecting sensor detecting activity.

The sensor module 4430 is not limited to that shown in FIG. 44. For example, the sensor module 4430 may further include a gravity sensor, an altitude sensor, a chemical sensor (for example, an odorant sensor), an atmospheric sensor, a fine dust measuring sensor, an infrared light sensor, an ozone level sensor, a carbon dioxide ($CO_2$) sensor, and/or a network sensor (for example, a Wi-Fi, Wi-Fi direct, Bluetooth, 3G, long term evolution (LTE), or near field communication (NFC)-based network sensor).

The sensor module 4430 may include a pressure sensor (for example, a touch sensor, a piezoelectric sensor, or a physical button), a status sensor (for example, an earphone terminal, a digital multimedia broadcasting (DMB) antenna, or a standard terminal (for example, a terminal for recognizing a charging level, a terminal for recognizing personal computer (PC) connection, or a terminal for recognizing dock connection)), a time sensor, and/or a health sensor (for example, a bio-sensor, a heart rate sensor, a blood flow rate sensor, a diabetic sensor, a blood pressure sensor, or a stress sensor), but a sensor included in the sensor module 4430 according to an exemplary embodiment is not limited thereto.

A result (or a sensing value or a sensing signal) detected by the sensor module 4430 is transmitted to the controller 4420.

The controller 4420 may generate and display, on the display 4412, an avatar-based image based on a sensing value received from the sensor module 4430. The controller 4420 may change the avatar-based image displayed on the display 4412 according to a user input requesting to change the avatar-based image, which is received through the user input module 4411. The controller 4420 may update user information stored in the memory 4440 based on the changed avatar-based image. The controller 4420 may update user information stored in the external device 2120 connected through the communication module 4490, according to the changed avatar-based image. As such, the controller 4420 may operate in the same manner as the controller 4320 of FIG. 43, according to an exemplary embodiment.

The controller 4420 controls overall operations of the device 100. For example, the controller 4420 may execute programs stored in the memory 4440 to control the user interface module 4410, the sensor module 4430, the memory 4440, the image processor 4450, the audio output unit 4460, the audio input unit 4470, the camera 4480, and/or the communication module 4490.

The controller 4420 may control operations of the device 100 based on the method described above. For example, the controller 4420 may control operations of the device 100 based on the method described in any one of FIGS. 2, 7, 9, 11, 13, 14, 16, 18, 20, 22, 28, 30, 33, 34 through 37, and 39 through 42, as the controller 4320 of FIG. 43.

The device 100 may include a plurality of the controllers 4420 according to an operation environment. For example, the controller 4420 may include a processor that operates in a low power mode and a processor that operates in a normal mode of the device 100. The controller 4420 may include a plurality of processors according to components included in the device 100.

Programs stored in the memory 4440 may be classified into a plurality of modules according to functions. For example, the programs stored in the memory 4440 may be classified into a UI module 4441, a notification module 4442, and/or an application module 4443, but the programs stored in the memory 4440 according to an exemplary embodiment are not limited thereto. For example, when the display 4412 is combined with a touch panel, the plurality of modules may include a touch screen module.

The UI module 4441 may provide GUI information for changing user information described above according to an exemplary embodiment to the controller 4420. The UI module 4441 may provide a UI or GUI specialized with respect to each application installed in the device 100 to the controller 4200.

The notification module 4442 may generate a signal notifying a request for a change, a request for addition, completion of a change, object selection, request for service information, or service selection of the device 100, but a notification generated by the notification module 4442 is not limited thereto.

The notification module 4442 may output a notification signal in a form of a video signal through the display 4412, or in a form of an audio signal through the audio output unit 4460, but is not limited thereto.

The application module 4443 may include at least one of a user information managing application set in the device 100 and a service providing application based on an avatar-based image.

The user information managing application according to an exemplary embodiment may operate by being connected to another application set in the device 100. For example, when the question information is received in operation S3702 of FIG. 37, the user information managing application may be connected to a QA application set in the device 100 so as to provide answer information (for example, a search result) based on the question information, in operation S3703.

The image processor 4450 processes image data received from the communication module 4490 or stored in the memory 4440 such as to be displayed on the display 4412. For example, the image processor 4450 may perform a signal process regarding image data such that a GUI screen described above with reference to FIGS. 1, 5A through 5E, 6A through 6E, 8A through 8C, 10, 12A through 12C, 15A through 15E, 17A through 17D, 19A and 19B, 23A through 23F, 27A through 27F, 29A through 29F, 31A through 31D, and 38 is displayed on the display 4412.

The audio output unit 4460 may output sound according to user information, according to an exemplary embodiment. The audio output unit 4460 may output audio data received from the communication module 4490 or stored in the memory 4440. The audio output unit 4460 may output a sound signal (for example, notification sound) related to a function performed by the device 100. The audio output unit 4460 may include a speaker or a buzzer, but is not limited thereto.

The audio input unit 4470 may be configured as a microphone. The audio input unit 4470 may receive an audio signal input from an external device of the device 100, convert the audio signal to an electric audio signal, and transmit the electric audio signal to the controller 4420. The audio input unit 4470 may be configured to perform an operation based on any one of various noise removing algorithms for removing noise generated while receiving an external sound signal.

The camera 4480 may obtain an image frame of a still image or a moving image through an image sensor, when the device 100 is in a video call mode or a photographing mode. The camera 4480 may obtain and transmit, to the controller 4420, a finger gesture image of the user of the device 100. The controller 4420 may determine, based on a finger gesture image of the user, whether a user input requesting to change an avatar-based image, a user input requesting to add information to an avatar-based image, a user input completing changing of an avatar-based image, a user input selecting an object from an avatar-based image, a user input requesting to provide service information based on an avatar-based image, or a user input requesting to execute a service based on an avatar-based image is received. According to an exemplary embodiment, the finger gesture image is not limitedly used to determine whether the user input is received. An image captured by an image sensor may be processed through the controller 4420 or a separate image processor (not shown).

An image frame processed by the camera 4480 may be stored in the memory 4440 or externally transmitted through the communication module 4490. The device 100 may include at least two cameras 4480 according to an exemplary embodiment.

The communication module 4490 may include at least one component for communication between the device 100 and at least one external device 2120. For example, the communication module 4490 may include at least one of a short-range wireless communicator 4491, a mobile communicator 4492, and a broadcasting receiver 4493. According to an exemplary embodiment, components included in the communication module 4490 are not limited thereto. For example, the communication module 4490 may include a component for performing at least one communication described above with reference to the network 2110 of FIG. 21.

The short-range wireless communicator 4491 may include a module capable of performing at least one communication from among Bluetooth communication, Bluetooth low energy (BLE) communication, near field communication (radio frequency identification (RFID), wireless local area network (WLAN) communication (Wi-Fi), Zigbee communication, Ant+ communication, Wi-Fi direction (WFD) communication, and ultra wideband (UWB) communication. A communication module included in the short-range wireless communicator 4491 according to an exemplary embodiment is not limited thereto. For example, the short-range wireless communicator 4491 may include an infrared data association (IrDA) communication module. The short-range wireless communicator 4491 may use lower power Bluetooth communication when receiving a beacon signal.

The mobile communicator 4492 transmits and receives a wireless signal to and from at least one of a base station, an external device, and/or a server on a mobile communication network. Here, the wireless signal may include any one of various types of data according to transmission and reception of a voice call signal, an image call signal, or a text/multimedia message.

The broadcasting receiver 4493 receives a broadcasting signal and/or broadcast-related information from an external source through a broadcasting channel. The broadcasting channel may include at least one of a satellite channel, a terrestrial wave channel, and a radio channel, but is not limited thereto.

The communication module 4490 may transmit an avatar-based image generated and/or changed by the device 100 according to an exemplary embodiment to the external device 2120. The communication module 4490 may receive at least one of user information, user modeling information, an avatar-based image, service information, coordinate information per object, and combining condition information of objects from the external device 2120, according to an exemplary embodiment. Information, data, and a signal transferred through the communication module 4490 is not limited thereto.

Figure 45:
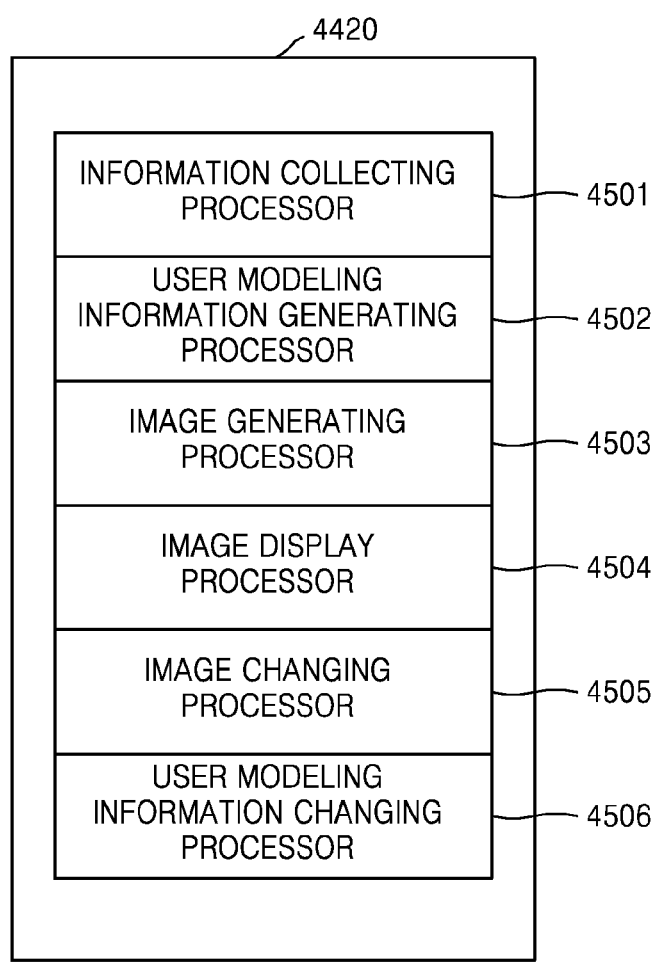
FIG. 45 is a detailed functional block diagram of a controller according to an exemplary embodiment.

FIG. 45 is a detailed functional block diagram of the controller 4320 or 4420 according to an exemplary embodiment. For convenience of description, FIG. 45 is described based on the controller 4420 of FIG. 44, and description thereof may also be applied to the controller 4320 of FIG. 43.

Referring to FIG. 45, the controller 4420 includes an information collecting processor 4501, a user modeling information generating processor 4502, an image generating processor 4503, an image display processor 4504, an image changing processor 4505, and a user modeling information changing processor 4506.

The information collecting processor 4501 may collect user information. The information collecting processor 4501 may collect the user information based on information received through the user input unit 4411, the sensor module 4430, or the communication module 4490. The user information has been described above. A user input received through the user input unit 4411 may be based on selecting an object in a form of an image provided by the information collecting processor 4501, but the user input according to an exemplary embodiment is not limited thereto. The information collecting processor 4501 may store the collected user information in the memory 4440 or transmit the collected user information to the external device 2120 through the communication module 4490.

The user modeling information generating processor 4502 generates user modeling information by using the user information collected by the information collecting processor 4501. The user modeling information may be configured as described above with reference to FIG. 3 or 24A. The user modeling information according to an exemplary embodiment is not limited thereto. The user modeling information generating processor 4502 may store the generated user modeling information in the memory 4440 or transmit the generated user modeling information to the external device 2120 through the communication module 4490.

The image generating processor 4503 generates an avatar-based image according to an exemplary embodiment based on the user modeling information generated by the user modeling information generating processor 4502. The avatar-based image is an image symbolizing a user. The image generating processor 4503 may store the generated avatar-based image in the memory 4440 or transmit the generated avatar-based image to the external device 2120 through the communication module 4490. An image stored in the memory 4440 or the external device 2120 may be temporarily stored therein.

The image display processor 4504 displays the avatar-based image generated by the image generating processor 4503 through the display 4412.

The image changing processor 4505 changes the avatar-based image displayed through the display 4412, according to an exemplary embodiment. After the avatar-based image is changed, the image changing processor 4505 may update the avatar-based image stored in the memory 4440 or the external device 2120.

The user modeling information changing processor 4506 updates the user information stored in the memory 4440 or the external device 2120 based on the avatar-based image changed by the image changing processor 4505.

The controllers 4320 and 4420 of FIGS. 43 and 44 may include greater or fewer components than those shown in FIG. 45. For example, when user information is received from the external device 2120, the controller 4320 or 4420 may not include the information collecting processor 4501.

When user modeling information is received from the external device 2120, the controller 4320 or 4420 may include a user modeling information receiving processor instead of the information collecting processor 4501 and the user modeling information generating processor 4502, and a user modeling information transmitting processor instead of the user modeling information changing processor 4506. For example, when an avatar-based image based on user information is received from the external device 2120, the controller 4320 or 4420 may include an image receiving processor instead of the information collecting processor 4501, the user modeling information generating processor 4502, and the image generating processor 4503.

As described above, the detailed functional block diagram of the controller 4320 or 4420 of FIG. 43 or 44 is not limited to that of FIG. 45. Also, functions of the external device 2120 may be determined based on the detailed functional block diagram of the controller 4320 or 4420.

Methods according to one or more exemplary embodiments may be realized via a computer program. For example, the methods may be executed by an application for easily changing, adding, and/or checking user information based on an image indicating the user information, the application installed in the device 100. The computer program may be operated under an operation system environment provided in the device 100. The device 100 may write the computer program on a storage medium, and read the computer program from the storage medium to use the computer program.

At least one program including commands for performing, by a computer, a method according to an exemplary embodiment may be written as computer-readable codes on a non-transitory computer-readable recording medium. The non-transitory computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium may also be distributed over network coupled computer systems so that the computer readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the scope as defined by the following claims.

What is claimed is:

1. A device for managing user information, the device comprising:
   a display configured to display an avatar-based image; and
   a controller configured to control the display such that the display displays the avatar-based image according to user schedule information, change an appearance of the displayed avatar-based image according to a user input indicating a request to change the avatar-based image, and update the user schedule information according to the changed appearance of the displayed avatar-based image.

2. The device of claim 1, further comprising a user input module configured to receive a user input requesting user information of a certain period,
   wherein the controller controls the display to display a plurality of avatar-based images according to the user information of the certain period in response to receiving the user input, and
   the plurality of avatar-based images are determined for and correspond respectively to a plurality of different periods that comprise the certain period.

3. The device of claim 1, wherein the controller controls the display to display a plurality of avatar-based images,
   the device further comprises a user input module configured to receive a user input requesting user information of a certain period,
   the controller controls the display to display the plurality of avatar-based images according to the user information of the certain period in response to receiving the user input, and
   the plurality of avatar-based images are determined per theme item included in the user information of the certain period.

4. The device of claim 1, further comprising a user input module configured to receive a user input requesting to display changeable information related to the avatar-based image,
   wherein, in response to receiving the user input, the controller controls the display to distinguishably display a changeable region and an unchangeable region in the avatar-based image.

5. The device of claim 1, wherein the controller checks an offering period that is set for the avatar-based image, and controls the display to not display the avatar-based image when the offering period has expired.

6. The device of claim 1, wherein the controller controls the display to display the avatar-based image according to health information of a user,
   the device further comprises a user input module configured to receive a user input indicating a medical information request, and
   the controller controls the display to display medical information related to the health information in response to receiving the user input, and upon receiving, through the user input module, a user input about medical information selected based on the displayed medical information, updates the user schedule information according to the selected medical information.

7. The device of claim 1, further comprising a user input module configured to receive a user input indicating information to be added to the avatar-based image,
   wherein the controller controls the display to display an input window for receiving an input of the information to be added, and
   the controller adds an image corresponding to the information received through the input window to the avatar-based image, and updates the user schedule information according to the avatar-based image including the added image.

8. The device of claim 1, wherein the controller controls the display to display the avatar-based image according to future hope information of the user,
   the device further includes a user input module configured to receive a user input requesting information related to the future hope information, and
   the controller controls the display to display the information related to the future hope information according to the user input, and updates the user schedule information according to information selected from the information related to the future hope information.

9. The device of claim 1, wherein the controller controls the display to display a plurality of avatar-based images according to usage history information of the device,
   the device further includes a user input module configured to receive a user input requesting usage history information per usage period of the device, and
   the controller controls the display to display the plurality of avatar-based images in response to receiving the user input.

10. The device of claim 1, wherein the controller controls the display to display the avatar-based image according to user information registered in social media,
    the device further comprises a user input module for receiving a user input requesting to change the appearance of the avatar-based image, and
    the controller changes the appearance of the avatar-based image in response to receiving the user input, and updates the user information registered in the social media according to the changed appearance of the avatar-based image.

11. A method of managing user information, wherein the method is performed by a device, the method comprising:
    displaying, on a display of the device, an avatar-based image according to user schedule information;
    changing an appearance of the avatar-based image according to a user input indicating a request to change the appearance of the avatar-based image; and
    updating the user schedule information according to the changed appearance of the avatar-based image.

12. The method of claim 11, wherein the displaying comprises displaying a plurality of avatar-based images according to user information of a certain period,
    wherein the plurality of avatar-based images are determined for and correspond respectively to a plurality of different periods that comprise the certain period.

13. The method of claim 11, wherein the displaying comprises displaying a plurality of avatar-based images according to user information of a certain period,
    wherein the plurality of avatar-based images are determined per theme item included in the user information of the certain period.

14. The method of claim 11, further comprising, in response to receiving a user input requesting to display changeable information, distinguishably displaying a changeable region and an unchangeable region in the avatar-based image.

15. The method of claim 11, further comprising:
    checking an offering period that is set for the avatar-based image; and
    when the offering period has expired, controlling the display to not display the avatar-based image.

16. The method of claim 11, further comprising:
    displaying, on the display, the avatar-based image according to health information of a user;
    providing medical information related to the health information according to a user input indicating a medical information request; and
    updating the user schedule information according to medical information selected based on the provided medical information.

17. The method of claim 11, further comprising:
    displaying, on the display, an input window for receiving information to be added to the avatar-based image upon receiving a user input indicating the information to be added;
    adding an image corresponding to information received through the input window to the avatar-based image; and
    updating the user schedule information according to the avatar-based image including the added image.

18. The method of claim 11, further comprising:
    displaying the avatar-based image according to future hope information of a user;
    providing information related to the future hope information according to a user input requesting the information related to the future hope information; and
    updating the user schedule information according to information selected from the information related to the future hope information.

19. The method of claim 11, further comprising displaying a plurality of avatar-based images according to usage history per usage period of the device according to a user input requesting the usage history information.

20. The method of claim 11, further comprising:
    displaying the avatar-based image according to user information registered in social media;
    changing the appearance of the avatar-based image according to a user input requesting to change the appearance of the avatar-based image; and
    updating the user information registered in the social media according to the changed appearance of the avatar-based image.

21. A non-transitory computer-readable recording medium having recorded thereon at least one program which includes commands for executing the method of claim 11.

22. A method of visually managing and displaying user information, the method comprising:
    displaying, on a display of a device, an avatar-based image that is modified according to user information;
    monitoring the device for a user input requesting a change of appearance of the avatar-based image;
    receiving the user input requesting the change of the appearance of the avatar-based image;
    displaying the changed appearance of the avatar-based image; and
    updating the user information according to the changed appearance of the avatar-based image.

23. The method of claim 22, wherein the user information is user schedule information.

24. The method of claim 23, wherein the avatar-based image that is displayed comprises a plurality of images, each depicting a different type of user schedule information.

25. The method of claim 23, wherein the displaying the avatar-based image comprises displaying a plurality of avatar-based images, each avatar-based image being modified according to user schedule information corresponding to a different time period.

26. The method of claim 25, wherein the different time periods comprise weekend and weekdays.

27. The method of claim 25, wherein the different time periods comprise different days of a workweek.

28. The method of claim 22, wherein the user information comprises user health information.

29. The method of claim 28, wherein the user health information is received from an external device.

30. The method of claim 22, wherein the user information comprises usage information of the device.

31. A non-transitory computer-readable recording medium having recorded thereon at least one program which includes commands for executing the method of claim 22.

* * * * *